US008816203B2

(12) United States Patent
Coles et al.

(10) Patent No.: US 8,816,203 B2
(45) Date of Patent: Aug. 26, 2014

(54) COMPACTED COUPLING JOINT FOR COUPLING INSULATED CONDUCTORS

(75) Inventors: John Matthew Coles, Katy, TX (US); Francis Marion Stone, Jr., Marquez, TX (US); Charles D'Angelo, III, Houston, TX (US); Stephen Taylor Thompson, Houston, TX (US)

(73) Assignee: Shell Oil Company, Houston, TX (US)

( * ) Notice: Subject to any disclaimer, the term of this patent is extended or adjusted under 35 U.S.C. 154(b) by 224 days.

(21) Appl. No.: 12/901,231

(22) Filed: Oct. 8, 2010

(65) Prior Publication Data

US 2011/0124228 A1 May 26, 2011

Related U.S. Application Data

(60) Provisional application No. 61/250,218, filed on Oct. 9, 2009, provisional application No. 61/250,337, filed on Oct. 9, 2009, provisional application No. 61/322,664, filed on Apr. 9, 2010, provisional application No. 61/322,513, filed on Apr. 9, 2010.

(51) Int. Cl.
*H02G 15/02* (2006.01)
*H01R 4/70* (2006.01)

(52) U.S. Cl.
CPC .................................... *H01R 4/70* (2013.01)
USPC .......................... 174/84 R; 174/88 C; 174/92

(58) Field of Classification Search
USPC ..................... 174/74 R, 78, 84 R, 88 C, 73 R
See application file for complete search history.

(56) References Cited

U.S. PATENT DOCUMENTS

| | | | | |
|---|---|---|---|---|
| 1,457,690 | A | 6/1923 | Brine | |
| 1,477,802 | A | 12/1923 | Beck | |
| 2,011,710 | A | 8/1935 | Davis | |
| 2,078,051 | A * | 4/1937 | Berndt | 439/788 |
| 2,244,255 | A | 6/1941 | Looman | |
| 2,595,728 | A | 5/1952 | Swiss | |
| 2,680,086 | A | 6/1954 | Hollingsworth et al. | |
| 2,757,739 | A | 8/1956 | Douglas et al. | |

(Continued)

FOREIGN PATENT DOCUMENTS

| | | |
|---|---|---|
| CA | 899987 | 5/1972 |
| CA | 1253555 | 5/1989 |

(Continued)

OTHER PUBLICATIONS

U.S. Patent and Trademark Office, Office Communication for U.S. Appl. No. 12/106,139; mailed Jul. 21, 2010.

(Continued)

*Primary Examiner* — William H Mayo, III

(57) ABSTRACT

A fitting for coupling an end of a first insulated conductor to an end of a second insulated conductor is described. The fitting includes a first splice housing placed over the end of the first insulated conductor and coupled to the first insulated conductor. The fitting also includes a second splice housing placed over the end of the second insulated conductor and coupled to the second insulated conductor. A sleeve is located over the end of the second insulated conductor and adjacent to the second splice housing. An interior volume of the fitting is substantially filled with electrically insulating material. The interior volume of the fitting is reduced such that the electrically insulating material substantially filling the interior volume is compacted.

27 Claims, 23 Drawing Sheets

(56) References Cited

U.S. PATENT DOCUMENTS

| | | | | |
|---|---|---|---|---|
| 2,781,851 | A | | 2/1957 | Smith |
| 2,794,504 | A | | 6/1957 | Carpenter |
| 2,937,228 | A | | 5/1960 | Robinson |
| 2,942,223 | A | | 6/1960 | Lennox et al. |
| 3,026,940 | A | | 3/1962 | Spitz |
| 3,114,417 | A | | 12/1963 | McCarthy |
| 3,131,763 | A | | 5/1964 | Kunetka et al. |
| 3,141,924 | A | | 7/1964 | Forney, Jr. |
| 3,149,672 | A | | 9/1964 | Orkiszewski et al. |
| 3,207,220 | A | | 9/1965 | Williams |
| 3,299,202 | A | | 1/1967 | Brown |
| 3,316,344 | A | | 4/1967 | Kidd et al. |
| 3,342,267 | A | | 9/1967 | Cotter et al. |
| 3,384,704 | A | * | 5/1968 | Vockroth ........................ 174/90 |
| 3,410,977 | A | | 11/1968 | Ando |
| 3,477,058 | A | | 11/1969 | Vedder et al. |
| 3,487,753 | A | | 1/1970 | Reed et al. |
| 3,492,463 | A | | 1/1970 | Wringer et al. |
| 3,515,837 | A | | 6/1970 | Ando |
| 3,547,192 | A | | 12/1970 | Claridge et al. |
| 3,562,401 | A | | 2/1971 | Long |
| 3,580,987 | A | | 5/1971 | Priaroggia |
| 3,614,387 | A | | 10/1971 | Wrob et al. |
| 3,629,551 | A | | 12/1971 | Ando |
| 3,657,520 | A | | 4/1972 | Ragault |
| 3,672,196 | A | | 6/1972 | Levacher et al. |
| 3,679,812 | A | | 7/1972 | Owens |
| 3,685,148 | A | | 8/1972 | Garfinkel |
| 3,743,854 | A | | 7/1973 | Bell et al. |
| 3,757,860 | A | | 9/1973 | Pritchett |
| 3,761,599 | A | | 9/1973 | Beatty |
| 3,798,349 | A | | 3/1974 | Thompson et al. |
| 3,844,352 | A | | 10/1974 | Garrett |
| 3,859,503 | A | | 1/1975 | Palone |
| 3,893,961 | A | | 7/1975 | Walton et al. |
| 3,895,180 | A | | 7/1975 | Plummer |
| 3,896,260 | A | | 7/1975 | Plummer |
| 3,955,043 | A | | 5/1976 | Palmer et al. |
| 4,110,550 | A | * | 8/1978 | Di Pietro ........................ 174/19 |
| 4,234,755 | A | * | 11/1980 | Simons ........................... 174/19 |
| 4,256,945 | A | | 3/1981 | Carter et al. |
| 4,266,992 | A | | 5/1981 | Agaisse |
| 4,280,046 | A | | 7/1981 | Shimotori et al. |
| 4,317,003 | A | | 2/1982 | Gray |
| 4,317,485 | A | | 3/1982 | Ross |
| 4,344,483 | A | | 8/1982 | Fisher et al. |
| 4,354,053 | A | | 10/1982 | Gold |
| 4,365,947 | A | * | 12/1982 | Bahder et al. ................. 425/384 |
| 4,368,452 | A | | 1/1983 | Kerr, Jr. |
| 4,370,518 | A | | 1/1983 | Guzy |
| 4,403,110 | A | | 9/1983 | Morrisette |
| 4,470,459 | A | | 9/1984 | Copeland et al. |
| 4,477,376 | A | | 10/1984 | Gold |
| 4,484,022 | A | * | 11/1984 | Eilentropp .................. 174/84 R |
| 4,496,795 | A | | 1/1985 | Konnik |
| 4,520,229 | A | | 5/1985 | Luzzi et al. |
| 4,524,827 | A | | 6/1985 | Bridges et al. |
| 4,538,682 | A | | 9/1985 | McManus et al. |
| 4,549,073 | A | | 10/1985 | Tamura et al. |
| 4,570,715 | A | | 2/1986 | Van Meurs et al. |
| 4,572,299 | A | | 2/1986 | Van Egmond et al. |
| 4,585,066 | A | | 4/1986 | Moore et al. |
| 4,614,392 | A | | 9/1986 | Moore |
| 4,623,401 | A | | 11/1986 | Derbyshire et al. |
| 4,626,665 | A | | 12/1986 | Fort, III |
| 4,639,712 | A | | 1/1987 | Kobayashi et al. |
| 4,645,906 | A | | 2/1987 | Yagnik et al. |
| 4,662,437 | A | | 5/1987 | Renfro et al. |
| 4,694,907 | A | | 9/1987 | Stahl et al. |
| 4,695,713 | A | | 9/1987 | Krumme |
| 4,698,583 | A | | 10/1987 | Sandberg |
| 4,701,587 | A | | 10/1987 | Carter et al. |
| 4,704,514 | A | | 11/1987 | Van Egmond et al. |
| 4,716,960 | A | | 1/1988 | Eastlund et al. |
| 4,717,814 | A | | 1/1988 | Krumme |
| 4,733,057 | A | | 3/1988 | Stanzel et al. |
| 4,752,673 | A | | 6/1988 | Krumme |
| 4,785,163 | A | | 11/1988 | Sandberg |
| 4,786,760 | A | * | 11/1988 | Friedhelm ................... 174/84 R |
| 4,794,226 | A | | 12/1988 | Derbyshire |
| 4,814,587 | A | | 3/1989 | Carter |
| 4,821,798 | A | | 4/1989 | Bridges et al. |
| 4,834,825 | A | | 5/1989 | Adams et al. |
| 4,837,409 | A | | 6/1989 | Klosin |
| 4,849,611 | A | | 7/1989 | Whitney et al. |
| 4,859,200 | A | | 8/1989 | McIntosh et al. |
| 4,886,118 | A | | 12/1989 | Van Meurs et al. |
| 4,947,672 | A | | 8/1990 | Pecora et al. |
| 4,950,034 | A | | 8/1990 | Reid |
| 4,979,296 | A | | 12/1990 | Langner et al. |
| 4,985,313 | A | | 1/1991 | Penneck et al. |
| 5,040,601 | A | | 8/1991 | Karlsson et al. |
| 5,060,287 | A | | 10/1991 | Van Egmond |
| 5,065,501 | A | | 11/1991 | Henschen et al. |
| 5,065,818 | A | | 11/1991 | Van Egmond |
| 5,066,852 | A | | 11/1991 | Willbanks |
| 5,070,533 | A | | 12/1991 | Bridges et al. |
| 5,073,625 | A | | 12/1991 | Derbyshire |
| 5,082,494 | A | | 1/1992 | Crompton |
| 5,117,912 | A | | 6/1992 | Young |
| 5,152,341 | A | | 10/1992 | Kaservich |
| 5,182,427 | A | | 1/1993 | McGaffigan |
| 5,189,283 | A | | 2/1993 | Carl, Jr. et al. |
| 5,207,273 | A | | 5/1993 | Cates et al. |
| 5,209,987 | A | | 5/1993 | Penneck et al. |
| 5,226,961 | A | | 7/1993 | Nahm et al. |
| 5,231,249 | A | | 7/1993 | Kimura et al. |
| 5,245,161 | A | | 9/1993 | Okamoto |
| 5,278,353 | A | * | 1/1994 | Buchholz et al. ........... 174/84 R |
| 5,289,882 | A | | 3/1994 | Moore |
| 5,315,065 | A | | 5/1994 | O'Donovan |
| 5,316,492 | A | | 5/1994 | Schaareman |
| 5,336,851 | A | | 8/1994 | Sawada et al. |
| 5,403,977 | A | | 4/1995 | Steptoe et al. |
| 5,406,030 | A | * | 4/1995 | Boggs .......................... 174/73.1 |
| 5,408,047 | A | | 4/1995 | Wentzel |
| 5,429,194 | A | | 7/1995 | Nice |
| 5,453,599 | A | | 9/1995 | Hall, Jr. |
| 5,463,187 | A | | 10/1995 | Battle et al. |
| 5,483,414 | A | | 1/1996 | Turtiainen |
| 5,512,732 | A | | 4/1996 | Yagnik et al. |
| 5,528,824 | A | | 6/1996 | Anthony et al. |
| 5,553,478 | A | | 9/1996 | Di Troia |
| 5,579,575 | A | | 12/1996 | Lamome et al. |
| 5,594,211 | A | | 1/1997 | Di Troia et al. |
| 5,606,148 | A | | 2/1997 | Escherich et al. |
| 5,619,611 | A | | 4/1997 | Loschen et al. |
| 5,621,844 | A | | 4/1997 | Bridges |
| 5,667,009 | A | | 9/1997 | Moore |
| 5,669,275 | A | | 9/1997 | Mills |
| 5,683,273 | A | * | 11/1997 | Garver et al. ................. 439/784 |
| 5,713,415 | A | | 2/1998 | Bridges |
| 5,782,301 | A | | 7/1998 | Neuroth et al. |
| 5,784,530 | A | | 7/1998 | Bridges |
| 5,788,376 | A | | 8/1998 | Sultan et al. |
| 5,801,332 | A | | 9/1998 | Berger et al. |
| 5,854,472 | A | | 12/1998 | Wildi |
| 5,875,283 | A | | 2/1999 | Yane et al. |
| 5,911,898 | A | | 6/1999 | Jacobs et al. |
| 5,987,745 | A | | 11/1999 | Hoglund et al. |
| 6,015,015 | A | | 1/2000 | Luft et al. |
| 6,023,554 | A | | 2/2000 | Vinegar et al. |
| 6,056,057 | A | | 5/2000 | Vinegar et al. |
| 6,079,499 | A | | 6/2000 | Mikus et al. |
| 6,102,122 | A | | 8/2000 | de Rouffignac |
| 6,288,372 | B1 | | 9/2001 | Sandberg et al. |
| 6,313,431 | B1 | | 11/2001 | Schneider et al. |
| 6,326,546 | B1 | | 12/2001 | Karlsson |
| 6,355,318 | B1 | | 3/2002 | Tailor et al. |
| 6,364,721 | B2 | * | 4/2002 | Stewart, III ................... 439/784 |
| 6,423,952 | B1 | | 7/2002 | Meisiek |
| 6,452,105 | B2 | | 9/2002 | Badii et al. |
| 6,472,600 | B1 | * | 10/2002 | Osmani et al. .............. 174/75 R |
| 6,581,684 | B2 | | 6/2003 | Wellington et al. |

(56) References Cited

U.S. PATENT DOCUMENTS 6,583,351 B1 6/2003 Artman
6,585,046 B2 7/2003 Neuroth et al.
6,588,503 B2 7/2003 Karanikas et al.
6,588,504 B2 7/2003 Wellington et al.
6,591,906 B2 7/2003 Wellington et al.
6,591,907 B2 7/2003 Zhang et al.
6,607,033 B2 8/2003 Wellington et al.
6,609,570 B2 8/2003 Wellington et al.
6,688,387 B1 2/2004 Wellington et al.
6,698,515 B2 3/2004 Karanikas et al.
6,702,016 B2 3/2004 de Rouffignac et al.
6,712,135 B2 3/2004 Wellington et al.
6,712,136 B2 3/2004 de Rouffignac et al.
6,712,137 B2 3/2004 Vinegar et al.
6,715,546 B2 4/2004 Vinegar et al.
6,715,547 B2 4/2004 Vinegar et al.
6,715,548 B2 4/2004 Stegemeier et al.
6,715,549 B2 4/2004 Wellington et al.
6,719,047 B2 4/2004 Fowler et al.
6,722,429 B2 4/2004 de Rouffignac et al.
6,722,430 B2 4/2004 Vinegar et al.
6,722,431 B2 4/2004 Karanikas et al.
6,725,920 B2 4/2004 Zhang et al.
6,725,928 B2 4/2004 Vinegar et al.
6,729,395 B2 5/2004 Shahin, Jr. et al.
6,729,396 B2 5/2004 Vinegar et al.
6,729,397 B2 5/2004 Zhang et al.
6,729,401 B2 5/2004 Vinegar et al.
6,732,794 B2 5/2004 Wellington et al.
6,732,795 B2 5/2004 de Rouffignac et al.
6,732,796 B2 5/2004 Vinegar et al.
6,736,215 B2 5/2004 Maher et al.
6,739,393 B2 5/2004 Vinegar et al.
6,739,394 B2 5/2004 Vinegar et al.
6,742,587 B2 6/2004 Vinegar et al.
6,742,588 B2 6/2004 Wellington et al.
6,742,589 B2 6/2004 Berchenko et al.
6,742,593 B2 6/2004 Vinegar et al.
6,745,831 B2 6/2004 de Rouffignac et al.
6,745,832 B2 6/2004 Wellington et al.
6,745,837 B2 6/2004 Wellington et al.
6,749,021 B2 6/2004 Vinegar et al.
6,752,210 B2 6/2004 de Rouffignac et al.
6,758,268 B2 7/2004 Vinegar et al.
6,761,216 B2 7/2004 Vinegar et al.
6,769,483 B2 8/2004 de Rouffignac et al.
6,769,485 B2 8/2004 Vinegar et al.
6,773,311 B2 * 8/2004 Mello et al. .................. 439/783
6,782,947 B2 8/2004 de Rouffignac et al.
6,789,625 B2 9/2004 de Rouffinac et al.
6,805,195 B2 10/2004 Vinegar et al.
6,820,688 B2 11/2004 Vinegar et al.
6,849,800 B2 2/2005 Mazurkiewicz
6,866,097 B2 3/2005 Ryan et al.
6,871,707 B2 3/2005 Karanikas et al.
6,877,554 B2 4/2005 Stegemeier et al.
6,877,555 B2 4/2005 Karanikas et al.
6,880,633 B2 4/2005 Wellington et al.
6,880,635 B2 4/2005 Vinegar et al.
6,886,638 B2 5/2005 Ahmed et al.
6,889,769 B2 5/2005 Wellington et al.
6,896,053 B2 5/2005 Berchenko et al.
6,902,003 B2 6/2005 Maher et al.
6,902,004 B2 6/2005 de Rouffignac et al.
6,910,536 B2 6/2005 Wellington et al.
6,913,078 B2 7/2005 Shahin, Jr. et al.
6,915,850 B2 7/2005 Vinegar et al.
6,918,442 B2 7/2005 Wellington et al.
6,918,443 B2 7/2005 Wellington et al.
6,923,257 B2 8/2005 Wellington et al.
6,923,258 B2 8/2005 Wellington et al.
6,929,067 B2 8/2005 Vinegar et al.
6,932,155 B2 8/2005 Vinegar et al.
6,942,032 B2 9/2005 La Rovere et al.
6,948,562 B2 9/2005 Wellington et al.
6,948,563 B2 9/2005 Wellington et al.
6,951,247 B2 10/2005 de Rouffignac et al.
6,953,087 B2 10/2005 de Rouffignac et al.
6,958,704 B2 10/2005 Vinegar et al.
6,959,761 B2 11/2005 Berchenko et al.
6,964,300 B2 11/2005 Vinegar et al.
6,966,372 B2 11/2005 Wellington et al.
6,966,374 B2 11/2005 Vinegar et al.
6,969,123 B2 11/2005 Vinegar et al.
6,973,967 B2 12/2005 Stegemeier et al.
6,981,548 B2 1/2006 Wellington et al.
6,991,032 B2 1/2006 Berchenko et al.
6,991,033 B2 1/2006 Wellington et al.
6,991,036 B2 1/2006 Sumnu-Dindoruk et al.
6,991,045 B2 1/2006 Vinegar et al.
6,994,160 B2 2/2006 Wellington et al.
6,994,168 B2 2/2006 Wellington et al.
6,994,169 B2 2/2006 Zhang et al.
6,997,255 B2 2/2006 Wellington et al.
6,997,518 B2 2/2006 Vinegar et al.
7,004,247 B2 2/2006 Cole et al.
7,004,251 B2 2/2006 Ward et al.
7,011,154 B2 3/2006 Maher et al.
7,013,972 B2 3/2006 Vinegar et al.
7,036,583 B2 5/2006 de Rouffignac et al.
7,040,397 B2 5/2006 de Rouffignac et al.
7,040,398 B2 5/2006 Wellington et al.
7,040,399 B2 5/2006 Wellington et al.
7,040,400 B2 5/2006 de Rouffignac et al.
7,051,807 B2 5/2006 Vinegar et al.
7,051,808 B1 5/2006 Vinegar et al.
7,051,811 B2 5/2006 de Rouffignac et al.
7,055,600 B2 6/2006 Messier et al.
7,063,145 B2 6/2006 Veenstra et al.
7,066,254 B2 6/2006 Vinegar et al.
7,066,257 B2 6/2006 Wellington et al.
7,073,578 B2 7/2006 Vinegar et al.
7,077,198 B2 7/2006 Vinegar et al.
7,077,199 B2 7/2006 Vinegar et al.
7,086,465 B2 8/2006 Wellington et al.
7,086,468 B2 8/2006 de Rouffignac et al.
7,090,013 B2 8/2006 Wellington
7,096,941 B2 8/2006 de Rouffignac et al.
7,096,942 B1 8/2006 de Rouffignac et al.
7,096,953 B2 8/2006 de Rouffignac et al.
7,100,994 B2 9/2006 Vinegar et al.
7,104,319 B2 9/2006 Vinegar et al.
7,114,566 B2 10/2006 Vinegar et al.
7,121,341 B2 10/2006 Vinegar et al.
7,121,342 B2 10/2006 Vinegar et al.
7,128,153 B2 10/2006 Vinegar et al.
7,153,373 B2 12/2006 Maziasz et al.
7,156,176 B2 1/2007 Vinegar et al.
7,165,615 B2 1/2007 Vinegar et al.
7,172,038 B2 2/2007 Terry et al.
7,219,734 B2 5/2007 Bai et al.
7,225,866 B2 6/2007 Berchenko et al.
7,258,752 B2 8/2007 Maziasz et al.
7,320,364 B2 1/2008 Fairbanks
7,337,841 B2 3/2008 Ravi
7,353,872 B2 4/2008 Sandberg et al.
7,357,180 B2 4/2008 Vinegar et al.
7,360,588 B2 4/2008 Vinegar et al.
7,370,704 B2 5/2008 Harris
7,383,877 B2 6/2008 Vinegar et al.
7,398,823 B2 7/2008 Montgomery et al.
7,405,358 B2 7/2008 Emerson
7,424,915 B2 9/2008 Vinegar et al.
7,431,076 B2 10/2008 Sandberg et al.
7,435,037 B2 10/2008 McKinzie, II
7,461,691 B2 12/2008 Vinegar et al.
7,481,274 B2 1/2009 Vinegar et al.
7,490,665 B2 2/2009 Sandberg et al.
7,500,528 B2 3/2009 McKinzie et al.
7,510,000 B2 3/2009 Pastor-Sanz et al.
7,527,094 B2 5/2009 McKinzie et al.
7,533,719 B2 5/2009 Hinson et al.
7,540,324 B2 6/2009 de Rouffignac et al.
7,546,873 B2 6/2009 Kim

(56) References Cited

U.S. PATENT DOCUMENTS 7,549,470 B2 6/2009 Vinegar et al.
7,556,095 B2 7/2009 Vinegar
7,556,096 B2 7/2009 Vinegar et al.
7,559,367 B2 7/2009 Vinegar et al.
7,559,368 B2 7/2009 Vinegar et al.
7,562,706 B2 7/2009 Li et al.
7,562,707 B2 7/2009 Miller
7,563,983 B2 * 7/2009 Bryant ........................ 174/74 R
7,575,052 B2 8/2009 Sandberg et al.
7,575,053 B2 8/2009 Vinegar et al.
7,581,589 B2 9/2009 Roes et al.
7,584,789 B2 9/2009 Mo et al.
7,591,310 B2 9/2009 Minderhoud et al.
7,597,147 B2 10/2009 Vitek et al.
7,604,052 B2 10/2009 Roes et al.
7,610,962 B2 11/2009 Fowler
7,631,689 B2 12/2009 Vinegar et al.
7,631,690 B2 12/2009 Vinegar et al.
7,635,023 B2 12/2009 Goldberg et al.
7,635,024 B2 12/2009 Karanikas et al.
7,635,025 B2 12/2009 Vinegar et al.
7,640,980 B2 1/2010 Vinegar et al.
7,644,765 B2 1/2010 Stegemeier et al.
7,673,681 B2 3/2010 Vinegar et al.
7,673,786 B2 3/2010 Menotti
7,677,310 B2 3/2010 Vinegar et al.
7,677,314 B2 3/2010 Hsu
7,681,647 B2 3/2010 Mudunuri et al.
7,683,296 B2 3/2010 Brady et al.
7,703,513 B2 4/2010 Vinegar et al.
7,717,171 B2 5/2010 Stegemeier et al.
7,730,936 B2 6/2010 Hernandez-Solis et al.
7,730,945 B2 6/2010 Pieterson et al.
7,730,946 B2 6/2010 Vinegar et al.
7,730,947 B2 6/2010 Stegemeier et al.
7,735,935 B2 6/2010 Vinegar et al.
7,743,826 B2 6/2010 Harris et al.
7,764,871 B2 7/2010 Rodegher
7,785,427 B2 8/2010 Maziasz et al.
7,793,722 B2 9/2010 Vinegar et al.
7,798,220 B2 9/2010 Vinegar et al.
7,798,221 B2 9/2010 Vinegar et al.
7,831,133 B2 11/2010 Vinegar et al.
7,831,134 B2 11/2010 Vinegar et al.
7,832,484 B2 11/2010 Nguyen et al.
7,841,401 B2 11/2010 Kuhlman et al.
7,841,408 B2 11/2010 Vinegar
7,841,425 B2 11/2010 Mansure et al.
7,845,411 B2 12/2010 Vinegar et al.
7,849,922 B2 12/2010 Vinegar et al.
7,860,377 B2 12/2010 Vinegar et al.
7,866,385 B2 1/2011 Lambirth
7,866,386 B2 1/2011 Beer
7,866,388 B2 1/2011 Bravo
7,912,358 B2 3/2011 Stone et al.
7,931,086 B2 4/2011 Nguyen et al.
7,942,197 B2 5/2011 Fairbanks et al.
7,942,203 B2 5/2011 Vinegar et al.
7,950,453 B2 5/2011 Farmayan et al.
7,986,869 B2 7/2011 Vinegar et al.
8,011,451 B2 9/2011 McDonald
8,027,571 B2 9/2011 Vinegar et al.
8,042,610 B2 10/2011 Harris et al.
8,070,840 B2 12/2011 Diaz et al.
8,083,813 B2 12/2011 Nair et al.
8,113,272 B2 2/2012 Vinegar
8,122,957 B2 2/2012 Stephenson et al.
8,146,661 B2 4/2012 Bravo et al.
8,146,669 B2 4/2012 Mason
8,151,880 B2 4/2012 Roes et al.
8,151,907 B2 4/2012 MacDonald
8,162,059 B2 4/2012 Nguyen et al.
8,162,405 B2 4/2012 Burns et al.
8,172,335 B2 5/2012 Burns et al.
8,177,305 B2 5/2012 Burns et al.
8,191,630 B2 6/2012 Stegemeier et al.
8,192,682 B2 6/2012 Maziasz et al.
8,196,658 B2 6/2012 Miller et al.
8,200,072 B2 6/2012 Vinegar et al.
8,220,539 B2 7/2012 Vinegar et al.
8,224,164 B2 7/2012 Sandberg et al.
8,224,165 B2 7/2012 Vinegar et al.
8,225,866 B2 7/2012 de Rouffignac
8,230,927 B2 7/2012 Fairbanks et al.
8,233,782 B2 7/2012 Vinegar et al.
8,238,730 B2 8/2012 Sandberg et al.
8,240,774 B2 8/2012 Vinegar
8,256,512 B2 9/2012 Stanecki
8,257,112 B2 * 9/2012 Tilley ............................ 439/586
8,261,832 B2 9/2012 Ryan
8,267,170 B2 9/2012 Fowler et al.
8,267,185 B2 9/2012 Ocampos et al.
8,272,455 B2 9/2012 Guimerans et al.
8,276,661 B2 10/2012 Costello et al.
8,281,861 B2 10/2012 Nguyen et al.
8,327,932 B2 12/2012 Karanikas et al.
8,353,347 B2 1/2013 Mason
8,355,623 B2 1/2013 Vinegar et al.
8,356,935 B2 1/2013 Drora et al.
8,381,806 B2 2/2013 Menotti
8,381,815 B2 2/2013 Karanikas et al.
8,450,540 B2 5/2013 Roes et al.
8,459,359 B2 6/2013 Vinegar
8,485,252 B2 7/2013 de Rouffignac
8,485,847 B2 7/2013 Tilley
2002/0027001 A1 3/2002 Wellington et al.
2002/0028070 A1 3/2002 Holen
2002/0033253 A1 3/2002 Rouffignac et al.
2002/0036089 A1 3/2002 Vinegar et al.
2002/0038069 A1 3/2002 Wellington et al.
2002/0040779 A1 4/2002 Wellington et al.
2002/0040780 A1 4/2002 Wellington et al.
2002/0053431 A1 5/2002 Wellington et al.
2002/0076212 A1 6/2002 Zhang et al.
2003/0066642 A1 4/2003 Wellington et al.
2003/0079877 A1 5/2003 Wellington et al.
2003/0085034 A1 5/2003 Wellington et al.
2003/0146002 A1 8/2003 Vinegar et al.
2003/0196789 A1 10/2003 Wellington et al.
2003/0201098 A1 10/2003 Karanikas et al.
2004/0140096 A1 7/2004 Sandberg et al.
2004/0146288 A1 7/2004 Vinegar et al.
2004/0163801 A1 8/2004 Dalrymple et al.
2005/0006097 A1 1/2005 Sandberg et al.
2005/0006128 A1 1/2005 Mita et al.
2006/0116078 A1 6/2006 Miyoshi
2006/0231283 A1 10/2006 Stagi et al.
2006/0289536 A1 12/2006 Vinegar et al.
2007/0045268 A1 3/2007 Vinegar et al.
2007/0119098 A1 5/2007 Diaz et al.
2007/0127897 A1 6/2007 John et al.
2007/0131428 A1 6/2007 den Boestert et al.
2007/0133960 A1 6/2007 Vinegar et al.
2007/0173122 A1 7/2007 Matsuoka
2008/0035346 A1 2/2008 Nair et al.
2008/0073104 A1 3/2008 Barberree et al.
2008/0135244 A1 6/2008 Miller
2008/0173442 A1 7/2008 Vinegar et al.
2008/0217321 A1 9/2008 Vinegar et al.
2009/0070997 A1 3/2009 Yavari et al.
2009/0090158 A1 4/2009 Davidson et al.
2009/0095478 A1 4/2009 Karanikas et al.
2009/0095479 A1 4/2009 Karanikas et al.
2009/0120646 A1 5/2009 Kim et al.
2009/0126929 A1 5/2009 Vinegar
2009/0189617 A1 7/2009 Burns et al.
2009/0194269 A1 8/2009 Vinegar
2009/0194286 A1 8/2009 Mason
2009/0194287 A1 8/2009 Nguyen et al.
2009/0194329 A1 8/2009 Guimerans et al.
2009/0194333 A1 8/2009 MacDonald
2009/0194524 A1 8/2009 Kim
2009/0200022 A1 8/2009 Bravo et al.
2009/0200023 A1 8/2009 Costello et al.

(56) References Cited

U.S. PATENT DOCUMENTS

| | | | |
|---|---|---|---|
| 2009/0200031 | A1 | 8/2009 | Miller et al. |
| 2009/0200290 | A1 | 8/2009 | Cardinal et al. |
| 2009/0200854 | A1 | 8/2009 | Vinegar |
| 2009/0260824 | A1 | 10/2009 | Burns et al. |
| 2009/0272526 | A1 | 11/2009 | Burns et al. |
| 2009/0272533 | A1 | 11/2009 | Burns et al. |
| 2009/0272535 | A1 | 11/2009 | Burns et al. |
| 2009/0272536 | A1 | 11/2009 | Burns et al. |
| 2009/0272578 | A1 | 11/2009 | MacDonald |
| 2009/0301724 | A1 | 12/2009 | Roes et al. |
| 2009/0321417 | A1 | 12/2009 | Burns et al. |
| 2010/0038112 | A1 | 2/2010 | Grether |
| 2010/0044068 | A1 | 2/2010 | Deighton et al. |
| 2010/0044781 | A1 | 2/2010 | Tanabe |
| 2010/0071903 | A1 | 3/2010 | Prince-Wright et al. |
| 2010/0071904 | A1 | 3/2010 | Burns et al. |
| 2010/0089584 | A1 | 4/2010 | Burns |
| 2010/0089586 | A1 | 4/2010 | Stanecki |
| 2010/0096137 | A1 | 4/2010 | Nguyen et al. |
| 2010/0101783 | A1 | 4/2010 | Vinegar et al. |
| 2010/0101784 | A1 | 4/2010 | Vinegar et al. |
| 2010/0101794 | A1 | 4/2010 | Ryan |
| 2010/0108310 | A1 | 5/2010 | Fowler et al. |
| 2010/0108379 | A1 | 5/2010 | Edbury et al. |
| 2010/0147521 | A1 | 6/2010 | Xie et al. |
| 2010/0147522 | A1 | 6/2010 | Xie et al. |
| 2010/0155070 | A1 | 6/2010 | Roes et al. |
| 2010/0190649 | A1 | 7/2010 | Doll et al. |
| 2010/0206570 | A1 | 8/2010 | Ocampos et al. |
| 2010/0224368 | A1 | 9/2010 | Mason |
| 2010/0258265 | A1 | 10/2010 | Karanikas et al. |
| 2010/0258290 | A1 | 10/2010 | Bass |
| 2010/0258291 | A1 | 10/2010 | de St. Remey et al. |
| 2010/0258309 | A1 | 10/2010 | Ayodele et al. |
| 2011/0042084 | A1 | 2/2011 | Bos et al. |
| 2011/0042085 | A1 | 2/2011 | Diehl |
| 2011/0124223 | A1 | 5/2011 | Tilley |
| 2011/0132600 | A1 | 6/2011 | Kaminsky et al. |
| 2011/0132661 | A1 | 6/2011 | Harmason et al. |
| 2011/0134958 | A1 | 6/2011 | Arora et al. |
| 2011/0247805 | A1 | 10/2011 | de St. Remey et al. |
| 2011/0247817 | A1 | 10/2011 | Bass et al. |
| 2011/0248018 | A1 | 10/2011 | Bass et al. |
| 2012/0018421 | A1 | 1/2012 | Parman et al. |
| 2012/0084978 | A1 | 4/2012 | Hartford et al. |
| 2012/0085564 | A1 | 4/2012 | D'Angelo, III et al. |
| 2012/0090174 | A1 | 4/2012 | Harmason et al. |
| 2012/0110845 | A1 | 5/2012 | Burns et al. |
| 2012/0118634 | A1 | 5/2012 | Coles et al. |
| 2012/0193099 | A1 | 8/2012 | Vinegar et al. |
| 2012/0255772 | A1 | 10/2012 | D'Angelo, III et al. |

FOREIGN PATENT DOCUMENTS

| | | |
|---|---|---|
| CA | 1288043 | 8/1991 |
| CA | 2356037 | 8/2001 |
| EP | 107927 | 5/1984 |
| EP | 130671 | 9/1985 |
| GB | 676543 | 7/1952 |
| GB | 1010023 | 11/1965 |
| GB | 1204405 | 9/1970 |
| JP | 2000340350 | 12/2000 |
| WO | 97/23924 | 7/1997 |
| WO | 00/19061 | 4/2000 |

OTHER PUBLICATIONS

U.S Patent and Trademark Office, Office Communication for U.S. Appl. No. 12/250,357; mailed Mar. 14, 2011.

Russian "Official Action" for Russian Application No. 2008145876/03, mailed Mar. 29, 2011, 3 pages.

PCT "International Search Report and Written Opinion" for International Application No. PCT/US2011/031543, mailed, Jun. 24, 2011; 5 pages.

PCT "International Search Report and Written Opinion" for International Application No. PCT/US2011/055213, mailed, Jan. 31, 2012;7 pages.

U.S. Patent and Trademark Office"BPAI Decision" for U.S. Appl. No. 10/693,816 mailed Aug. 22, 2011, 7 pages.

U.S. Patent and Trademark Office, Office Communication for U.S. Appl. No. 12/250,357; mailed Aug. 30, 2011.

U.S. Patent and Trademark Office, "Office Communication," for U.S. Appl. No. 11/409,565 mailed Oct. 13, 2011.

U.S. Patent and Trademark Office, Office Communication for U.S. Appl. No. 12/106,139; mailed Oct. 6, 2011.

U.S. Patent and Trademark Office, Office Communication for U.S. Appl. No. 12/576,772; mailed Oct. 13, 2011.

U.S. Patent and Trademark Office, Office Communication for U.S. Appl. No. 12/893,642; mailed Nov. 9, 2011.

U.S. Patent and Trademark Office, Office Communication for U.S. Appl. No. 12/106,065; mailed Nov. 28, 2011.

U.S. Patent and Trademark Office, "Office Communication," for U.S. Appl. No. 10/693,700 mailed Dec. 21, 2011.

U.S. Patent and Trademark Office, "Office Communication," for U.S. Appl. No. 10/693,840 mailed Jan. 3, 2012.

U.S. Patent and Trademark Office, "Office Communication," for U.S. Appl. No. 10/693,820 mailed Jan. 3, 2012.

U.S. Patent and Trademark Office, Office Communication for U.S. Appl. No. 12/901,248; mailed Jan. 17, 2012.

U.S. Patent and Trademark Office, Office Communication for U.S. Appl. No. 12/576,763; mailed Jan. 27, 2012.

U.S. Patent and Trademark Office, Office Communication for U.S. Appl. No. 12/106,139; mailed Apr. 10, 2012.

PCT "International Search Report and Written Opinion" for International Application No. PCT/US2011/055217, mailed, Feb. 1, 2012; 12 pages.

U.S. Patent and Trademark Office, Office Communication for U.S. Appl. No. 12/576,772; mailed May 1, 2012.

U.S. Patent and Trademark Office, Office Communication for U.S. Appl. No. 11/788,869; mailed May 4, 2012.

PCT International Search Report for International Application No. PCT/US2011/031565 mailed Jun. 10 2011, 2 pages.

Australian Patent and Trademark Office, Examiner's First Report for Australian Patent Application No. 2007309735, mailed Dec. 9, 2010.

New Zealand Intellectual Property Office, "Examination Report" for New Zealand Application No. 581359, mailed Nov. 23, 2010.

McGee et al. "Electrical Heating with Horizontal Wells, The heat Transfer Problem," International Conference on Horizontal Well Tehcnology, Calgary, Alberta Canada, 1996; 14 pages.

"IEEE Recommended Practice for Electrical Impedance, Induction, and Skin Effect Heating of Pipelines and Vessels," IEEE Std. 844-200, 2000; 6 pages.

U.S. Patent and Trademark Office, Office Communication for U.S. Appl. No. 11/409,558; mailed Mar. 9, 2010.

U.S. Patent and Trademark Office, Office Communication for U.S. Appl. No. 11/409,565; mailed Mar. 5, 2010.

U.S. Patent and Trademark Office, "Office Communication," for U.S. Appl. No. 12/106,060 mailed Apr. 27, 2010.

U.S. Patent and Trademark Office, "Office Communication," for U.S. Appl. No. 11/112,881 mailed Apr. 28, 2006; 12 pages.

Bosch et al. "Evaluation of Downhole Electric Impedance Heating Systems for Paraffin Control in Oil Wells," IEEE Transactions on Industrial Applications, 1992, vol. 28; pp. 190-194.

Bosch et al., "Evaluation of Downhole Electric Impedance Heating Systems for Paraffin Control in Oil Wells," Industry Applications Society 37th Annual Petroleum and Chemical Industry Conference; The Institute of Electrical and Electronics Engineers Inc., Sep. 1990, pp. 223-227.

Rangel-German et al., "Electrical-Heating-Assisted Recovery for Heavy Oil", pp. 1-43. 2004.

Kovscek, Anthony R., "Reservoir Engineering analysis of Novel Thermal Oil Recovery Techniques applicable to Alaskan North Slope Heavy Oils", pp. 1-6.

PCT "International Search Report and Written Opinion" for International Application No. PCT/US10/52026, mailed, Dec. 17, 2010, 11 pages.

(56) References Cited

OTHER PUBLICATIONS

Swedish shale oil-Production methods in Sweden, Organisation for European Economic Cooperation, 1952, (70 pages).
PCT "International Search Report and Written Opinion" for International Application No. PCT/US10/52022, mailed, Dec. 10, 2010, 8 pages.
PCT "International Search Report and Written Opinion" for International Application No. PCT/US10/52027, mailed, Dec. 13, 2010, 8 pages.
Boggs, "The Case for Frequency Domain PD Testing in the Context of Distribution Cable", Electrical Insulation Magazine, IEEE, vol. 19, Issue 4, Jul.-Aug. 2003, pp. 13-19.
U.S. Patent and Trademark Office, Office Communication for U.S. Appl. No. 13/567,799; mailed May 15, 2013.
U.S. Patent and Trademark Office, Office Communication for U.S. Appl. No. 13/411,300; mailed May 14, 2013.
Chinese Communication for Chinese Application No. 200880017260.2 mailed Mar. 5, 2013, 15 pages.
Translation of Russian Communication for Russian Application No. 2010119956, mailed Oct. 4, 2012, 2 pages.
U.S. Patent and Trademark Office, Office Communication for U.S. Appl. No. 12/576,772; mailed Jun. 25, 2013.
U.S. Patent and Trademark Office, Office Communication for U.S. Appl. No. 12/901,237; mailed Jun. 13, 2013.
"Mineral insulated Cable-Aeropak MI Thermocouple Cable" www.ariindustries.com/cable/aeropak.php3. first visited Feb. 6, 2005, pp. 1-3.
U.S. Patent and Trademark Office, Office Communication for U.S. Appl. No. 13/083,177; mailed May 2, 2013.
U.S. Patent and Trademark Office, Office Communication for U.S. Appl. No. 13/268,238; mailed May 16, 2013.
U.S. Patent and Trademark Office, Office Communication for U.S. Appl. No. 13/268,258; mailed May 21, 2013.
U.S. Patent and Trademark Office, Office Communication for U.S. Appl. No. 12/757,661; mailed Mar. 7, 2013.
U.S. Patent and Trademark Office, Office Communication for U.S. Appl. No. 12/901,237; mailed Aug. 2, 2012.
U.S Patent and Trademark Office, Office Communication for U.S. Appl. No. 12/901,237; mailed Aug. 2, 2012.
U.S Patent and Trademark Office, Office Communication for U.S. Appl. No. 13/083,169; mailed Sep. 11, 2012.
U.S. Patent and Trademark Office, Office Communication for U.S. Appl. No. 12/576,772; mailed Dec. 12, 2012.
U.S. Patent and Trademark Office, Office Communication for U.S. Appl. No. 13/083,177; mailed Oct. 9, 2013.
United States Patent and Trademark "Office Communication" for U.S. Appl. No. 13/268,226, mailed Sep. 3, 2013.
United States Patent and Trademark "Office Communication" for U.S. Appl. No. 13/268,246, mailed Aug. 30, 2013.
U.S. Patent and Trademark Office, Office Communication for U.S. Appl. No. 12/901,237; mailed Apr. 3, 2014.
U.S. Patent and Trademark Office, Office Communication for U.S. Appl. No. 13/083,177; mailed Mar. 13, 2014.
U.S. Patent and Trademark Office, Office Communication for U.S. Appl. No. 12/576,772; mailed Mar. 10, 2014.

* cited by examiner

COMPACTED COUPLING JOINT FOR COUPLING INSULATED CONDUCTORS

PRIORITY CLAIM

This patent application claims priority to U.S. Provisional Patent No. 61/250,218 entitled "TREATING SUBSURFACE HYDROCARBON CONTAINING FORMATIONS AND THE SYSTEMS, METHODS, AND PROCESSES UTILIZED" to D'Angelo III et al. filed on Oct. 9, 2009; U.S. Provisional Patent No. 61/250,337 entitled "APPARATUS AND METHODS FOR SPLICING INSULATED CONDUCTORS" to D'Angelo III et al. filed on Oct. 9, 2009; U.S. Provisional Patent No. 61/322,664 entitled "HEATER TECHNOLOGY FOR TREATING SUBSURFACE FORMATIONS" to Bass et al. filed on Apr. 9, 2010; and U.S. Provisional Patent No. 61/322,513 entitled "TREATMENT METHODOLOGIES FOR SUBSURFACE HYDROCARBON CONTAINING FORMATIONS" to Bass et al. filed on Apr. 9, 2010, all of which are incorporated by reference in their entirety.

RELATED PATENTS

This patent application incorporates by reference in its entirety each of U.S. Pat. No. 6,688,387 to Wellington et al.; U.S. Pat. No. 6,991,036 to Sumnu-Dindoruk et al.; U.S. Pat. No. 6,698,515 to Karanikas et al.; U.S. Pat. No. 6,880,633 to Wellington et al.; U.S. Pat. No. 6,782,947 to de Rouffignac et al.; U.S. Pat. No. 6,991,045 to Vinegar et al.; U.S. Pat. No. 7,073,578 to Vinegar et al.; U.S. Pat. No. 7,121,342 to Vinegar et al.; U.S. Pat. No. 7,320,364 to Fairbanks; U.S. Pat. No. 7,527,094 to McKinzie et al.; U.S. Pat. No. 7,584,789 to Mo et al.; U.S. Pat. No. 7,533,719 to Hinson et al.; U.S. Pat. No. 7,562,707 to Miller; and U.S. Pat. No. 7,798,220 to Vinegar et al.; U.S. Patent Application Publication Nos. 2009-0189617 to Burns et al.; 2010-0071903 to Prince-Wright et al.; 2010-0096137 to Nguyen et al.; and U.S. patent application Ser. No. 12/757,621.

BACKGROUND

1. Field of the Invention

The present invention relates to systems for insulated conductors used in heater elements. More particularly, the invention relates to fittings to splice together insulated conductor cables.

2. Description of Related Art

Hydrocarbons obtained from subterranean formations are often used as energy resources, as feedstocks, and as consumer products. Concerns over depletion of available hydrocarbon resources and concerns over declining overall quality of produced hydrocarbons have led to development of processes for more efficient recovery, processing and/or use of available hydrocarbon resources. In situ processes may be used to remove hydrocarbon materials from subterranean formations that were previously inaccessible and/or too expensive to extract using available methods. Chemical and/or physical properties of hydrocarbon material in a subterranean formation may need to be changed to allow hydrocarbon material to be more easily removed from the subterranean formation and/or increase the value of the hydrocarbon material. The chemical and physical changes may include in situ reactions that produce removable fluids, composition changes, solubility changes, density changes, phase changes, and/or viscosity changes of the hydrocarbon material in the formation.

Heaters may be placed in wellbores to heat a formation during an in situ process. There are many different types of heaters which may be used to heat the formation. Examples of in situ processes utilizing downhole heaters are illustrated in U.S. Pat. No. 2,634,961 to Ljungstrom; U.S. Pat. No. 2,732,195 to Ljungstrom; U.S. Pat. No. 2,780,450 to Ljungstrom; U.S. Pat. No. 2,789,805 to Ljungstrom; U.S. Pat. No. 2,923,535 to Ljungstrom; U.S. Pat. No. 4,886,118 to Van Meurs et al.; and U.S. Pat. No. 6,688,387 to Wellington et al., each of which is incorporated by reference as if fully set forth herein.

Mineral insulated (MI) cables (insulated conductors) for use in subsurface applications, such as heating hydrocarbon containing formations in some applications, are longer, may have larger outside diameters, and may operate at higher voltages and temperatures than what is typical in the MI cable industry. There are many potential problems during manufacture and/or assembly of long length insulated conductors.

For example, there are potential electrical and/or mechanical problems due to degradation over time of the electrical insulator used in the insulated conductor. There are also potential problems with electrical insulators to overcome during assembly of the insulated conductor heater. Problems such as core bulge or other mechanical defects may occur during assembly of the insulated conductor heater. Such occurrences may lead to electrical problems during use of the heater and may potentially render the heater inoperable for its intended purpose.

In addition, for subsurface applications, the joining of multiple MI cables may be needed to make MI cables with sufficient length to reach the depths and distances needed to heat the subsurface efficiently and to join segments with different functions, such as lead-in cables joined to heater sections. Such long heaters also require higher voltages to provide enough power to the farthest ends of the heaters.

Conventional MI cable splice designs are typically not suitable for voltages above 1000 volts, above 1500 volts, or above 2000 volts and may not operate for extended periods without failure at elevated temperatures, such as over 650° C. (about 1200° F.), over 700° C. (about 1290° F.), or over 800° C. (about 1470° F.). Such high voltage, high temperature applications typically require the compaction of the mineral insulant in the splice to be as close as possible to or above the level of compaction in the insulated conductor (MI cable) itself.

The relatively large outside diameter and long length of MI cables for some applications requires that the cables be spliced while oriented horizontally. There are splices for other applications of MI cables that have been fabricated horizontally. These techniques typically use a small hole through which the mineral insulation (such as magnesium oxide powder) is filled into the splice and compacted slightly through vibration and tamping. Such methods do not provide sufficient compaction of the mineral insulation or even allow any compaction of the mineral insulation, and are not suitable for making splices for use at the high voltages needed for these subsurface applications.

Thus, there is a need for splices of insulated conductors that are simple yet can operate at the high voltages and temperatures in the subsurface environment over long durations without failure. In addition, the splices may need higher bending and tensile strengths to inhibit failure of the splice under the weight loads and temperatures that the cables can be subjected to in the subsurface. Techniques and methods also may be utilized to reduce electric field intensities in the splices so that leakage currents in the splices are reduced and to increase the margin between the operating voltage and electrical breakdown. Reducing electric field intensities may help increase voltage and temperature operating ranges of the splices.

In addition, there may be problems with increased stress on the insulated conductors during assembly and/or installation into the subsurface of the insulated conductors. For example, winding and unwinding of the insulated conductors on spools used for transport and installation of the insulated conductors may lead to mechanical stress on the electrical insulators and/or other components in the insulated conductors. Thus, more reliable systems and methods are needed to reduce or eliminate potential problems during manufacture, assembly, and/or installation of insulated conductors.

SUMMARY

Embodiments described herein generally relate to systems, methods, and heaters for treating a subsurface formation. Embodiments described herein also generally relate to heaters that have novel components therein. Such heaters can be obtained by using the systems and methods described herein.

In certain embodiments, the invention provides one or more systems, methods, and/or heaters. In some embodiments, the systems, methods, and/or heaters are used for treating a subsurface formation.

In certain embodiments, a fitting for coupling an end of a first insulated conductor to an end of a second insulated conductor includes: a first splice housing configured to be placed over the end of the first insulated conductor and coupled to the first insulated conductor, the first splice housing having an interior volume that tapers from a larger diameter at the end of the first splice housing facing the end of the first insulated conductor to a smaller diameter at or near the end of the first splice housing configured to be coupled to the first insulated conductor; a second splice housing configured to be placed over the end of the second insulated conductor and coupled to the second insulated conductor, the second splice housing having an interior volume that tapers from a larger diameter at the end of the second splice housing facing the end of the second insulated conductor to a smaller diameter at or near the end of the second splice housing configured to be coupled to the second insulated conductor; and a sleeve configured to be located over the end of the second insulated conductor and adjacent to the second splice housing, the sleeve being configured to be coupled to at least one of the splice housings; wherein an interior volume of the fitting is configured to be substantially filled with electrically insulating material, and the interior volume of the fitting is configured to be reduced such that the electrically insulating material substantially filling the interior volume is compacted.

In certain embodiments, a method for coupling an end of a first insulated conductor to an end of a second insulated conductor includes: placing a first splice housing over the end of the first insulated conductor; placing a second splice housing over the end of the second insulated conductor; placing a sleeve over the second insulated conductor and the second splice housing such that the sleeve is substantially adjacent to the second splice housing and located over the end of the second insulated conductor; coupling the first splice housing to the first insulated conductor; bringing the second splice housing and the sleeve together with the first splice housing such that the splice housings and the sleeve form a fitting with an interior volume; substantially filling at least a majority of the interior volume of the fitting with electrically insulating material; reducing the interior volume of the fitting such that the electrically insulating material substantially filling the interior volume is compacted; coupling the sleeve to the second splice housing; and coupling the second splice housing to the second insulated conductor.

In further embodiments, features from specific embodiments may be combined with features from other embodiments. For example, features from one embodiment may be combined with features from any of the other embodiments.

In further embodiments, treating a subsurface formation is performed using any of the methods, systems, power supplies, or heaters described herein.

In further embodiments, additional features may be added to the specific embodiments described herein.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings.

Figure 1:
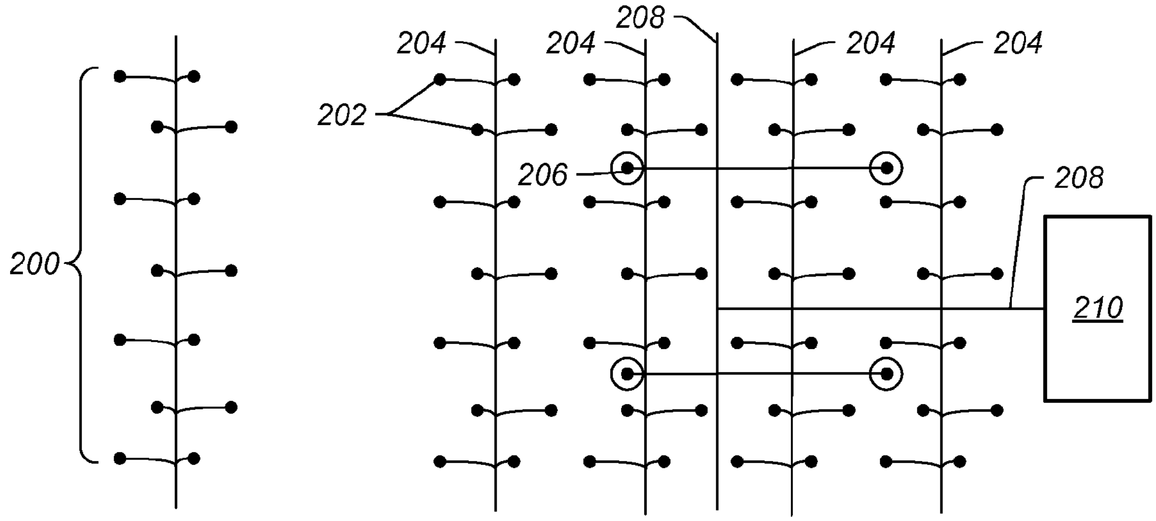
FIG. 1 shows a schematic view of an embodiment of a portion of an in situ heat treatment system for treating a hydrocarbon containing formation.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION

The following description generally relates to systems and methods for treating hydrocarbons in the formations. Such formations may be treated to yield hydrocarbon products, hydrogen, and other products.

"Alternating current (AC)" refers to a time-varying current that reverses direction substantially sinusoidally. AC produces skin effect electricity flow in a ferromagnetic conductor.

"Coupled" means either a direct connection or an indirect connection (for example, one or more intervening connections) between one or more objects or components. The phrase "directly connected" means a direct connection between objects or components such that the objects or components are connected directly to each other so that the objects or components operate in a "point of use" manner.

A "formation" includes one or more hydrocarbon containing layers, one or more non-hydrocarbon layers, an overburden, and/or an underburden. "Hydrocarbon layers" refer to layers in the formation that contain hydrocarbons. The hydrocarbon layers may contain non-hydrocarbon material and hydrocarbon material. The "overburden" and/or the "underburden" include one or more different types of impermeable materials. For example, the overburden and/or underburden may include rock, shale, mudstone, or wet/tight carbonate. In some embodiments of in situ heat treatment processes, the overburden and/or the underburden may include a hydrocarbon containing layer or hydrocarbon containing layers that are relatively impermeable and are not subjected to temperatures during in situ heat treatment processing that result in significant characteristic changes of the hydrocarbon containing layers of the overburden and/or the underburden. For example, the underburden may contain shale or mudstone, but the underburden is not allowed to heat to pyrolysis temperatures during the in situ heat treatment process. In some cases, the overburden and/or the underburden may be somewhat permeable.

"Formation fluids" refer to fluids present in a formation and may include pyrolyzation fluid, synthesis gas, mobilized hydrocarbons, and water (steam). Formation fluids may include hydrocarbon fluids as well as non-hydrocarbon fluids. The term "mobilized fluid" refers to fluids in a hydrocarbon containing formation that are able to flow as a result of thermal treatment of the formation. "Produced fluids" refer to fluids removed from the formation.

A "heat source" is any system for providing heat to at least a portion of a formation substantially by conductive and/or radiative heat transfer. For example, a heat source may include electrically conducting materials and/or electric heaters such as an insulated conductor, an elongated member, and/or a conductor disposed in a conduit. A heat source may also include systems that generate heat by burning a fuel external to or in a formation. The systems may be surface burners, downhole gas burners, flameless distributed combustors, and natural distributed combustors. In some embodiments, heat provided to or generated in one or more heat sources may be supplied by other sources of energy. The other sources of energy may directly heat a formation, or the energy may be applied to a transfer medium that directly or indirectly heats the formation. It is to be understood that one or more heat sources that are applying heat to a formation may use different sources of energy. Thus, for example, for a given formation some heat sources may supply heat from electrically conducting materials, electric resistance heaters, some heat sources may provide heat from combustion, and some heat sources may provide heat from one or more other energy sources (for example, chemical reactions, solar energy, wind energy, biomass, or other sources of renewable energy). A chemical reaction may include an exothermic reaction (for example, an oxidation reaction). A heat source may also include a electrically conducting material and/or a heater that provides heat to a zone proximate and/or surrounding a heating location such as a heater well.

A "heater" is any system or heat source for generating heat in a well or a near wellbore region. Heaters may be, but are not limited to, electric heaters, burners, combustors that react with material in or produced from a formation, and/or combinations thereof.

"Hydrocarbons" are generally defined as molecules formed primarily by carbon and hydrogen atoms. Hydrocarbons may also include other elements such as, but not limited to, halogens, metallic elements, nitrogen, oxygen, and/or sulfur. Hydrocarbons may be, but are not limited to, kerogen, bitumen, pyrobitumen, oils, natural mineral waxes, and asphaltites. Hydrocarbons may be located in or adjacent to mineral matrices in the earth. Matrices may include, but are not limited to, sedimentary rock, sands, silicilytes, carbonates, diatomites, and other porous media. "Hydrocarbon fluids" are fluids that include hydrocarbons. Hydrocarbon fluids may include, entrain, or be entrained in non-hydrocarbon fluids such as hydrogen, nitrogen, carbon monoxide, carbon dioxide, hydrogen sulfide, water, and ammonia.

An "in situ conversion process" refers to a process of heating a hydrocarbon containing formation from heat sources to raise the temperature of at least a portion of the formation above a pyrolysis temperature so that pyrolyzation fluid is produced in the formation.

An "in situ heat treatment process" refers to a process of heating a hydrocarbon containing formation with heat sources to raise the temperature of at least a portion of the formation above a temperature that results in mobilized fluid, visbreaking, and/or pyrolysis of hydrocarbon containing material so that mobilized fluids, visbroken fluids, and/or pyrolyzation fluids are produced in the formation.

"Insulated conductor" refers to any elongated material that is able to conduct electricity and that is covered, in whole or in part, by an electrically insulating material.

"Nitride" refers to a compound of nitrogen and one or more other elements of the Periodic Table. Nitrides include, but are not limited to, silicon nitride, boron nitride, or alumina nitride.

"Perforations" include openings, slits, apertures, or holes in a wall of a conduit, tubular, pipe or other flow pathway that allow flow into or out of the conduit, tubular, pipe or other flow pathway.

"Pyrolysis" is the breaking of chemical bonds due to the application of heat. For example, pyrolysis may include transforming a compound into one or more other substances by heat alone. Heat may be transferred to a section of the formation to cause pyrolysis.

"Pyrolyzation fluids" or "pyrolysis products" refers to fluid produced substantially during pyrolysis of hydrocarbons. Fluid produced by pyrolysis reactions may mix with other fluids in a formation. The mixture would be considered pyrolyzation fluid or pyrolyzation product. As used herein, "pyrolysis zone" refers to a volume of a formation (for example, a relatively permeable formation such as a tar sands formation) that is reacted or reacting to form a pyrolyzation fluid.

"Thickness" of a layer refers to the thickness of a cross section of the layer, wherein the cross section is normal to a face of the layer.

The term "wellbore" refers to a hole in a formation made by drilling or insertion of a conduit into the formation. A wellbore may have a substantially circular cross section, or another cross-sectional shape. As used herein, the terms "well" and "opening," when referring to an opening in the formation may be used interchangeably with the term "wellbore."

A formation may be treated in various ways to produce many different products. Different stages or processes may be used to treat the formation during an in situ heat treatment process. In some embodiments, one or more sections of the formation are solution mined to remove soluble minerals from the sections. Solution mining minerals may be performed before, during, and/or after the in situ heat treatment process. In some embodiments, the average temperature of one or more sections being solution mined may be maintained below about 120° C.

In some embodiments, one or more sections of the formation are heated to remove water from the sections and/or to remove methane and other volatile hydrocarbons from the sections. In some embodiments, the average temperature may be raised from ambient temperature to temperatures below about 220° C. during removal of water and volatile hydrocarbons.

In some embodiments, one or more sections of the formation are heated to temperatures that allow for movement and/or visbreaking of hydrocarbons in the formation. In some embodiments, the average temperature of one or more sections of the formation are raised to mobilization temperatures of hydrocarbons in the sections (for example, to temperatures ranging from 100° C. to 250° C., from 120° C. to 240° C., or from 150° C. to 230° C.).

In some embodiments, one or more sections are heated to temperatures that allow for pyrolysis reactions in the formation. In some embodiments, the average temperature of one or more sections of the formation may be raised to pyrolysis temperatures of hydrocarbons in the sections (for example, temperatures ranging from 230° C. to 900° C., from 240° C. to 400° C. or from 250° C. to 350° C.).

Heating the hydrocarbon containing formation with a plurality of heat sources may establish thermal gradients around the heat sources that raise the temperature of hydrocarbons in the formation to desired temperatures at desired heating rates. The rate of temperature increase through the mobilization temperature range and/or the pyrolysis temperature range for desired products may affect the quality and quantity of the formation fluids produced from the hydrocarbon containing formation. Slowly raising the temperature of the formation through the mobilization temperature range and/or pyrolysis temperature range may allow for the production of high quality, high API gravity hydrocarbons from the formation. Slowly raising the temperature of the formation through the mobilization temperature range and/or pyrolysis temperature range may allow for the removal of a large amount of the hydrocarbons present in the formation as hydrocarbon product.

In some in situ heat treatment embodiments, a portion of the formation is heated to a desired temperature instead of slowly heating the temperature through a temperature range. In some embodiments, the desired temperature is 300° C., 325° C., or 350° C. Other temperatures may be selected as the desired temperature.

Superposition of heat from heat sources allows the desired temperature to be relatively quickly and efficiently established in the formation. Energy input into the formation from the heat sources may be adjusted to maintain the temperature in the formation substantially at a desired temperature.

Mobilization and/or pyrolysis products may be produced from the formation through production wells. In some embodiments, the average temperature of one or more sections is raised to mobilization temperatures and hydrocarbons are produced from the production wells. The average temperature of one or more of the sections may be raised to pyrolysis temperatures after production due to mobilization decreases below a selected value. In some embodiments, the average temperature of one or more sections may be raised to pyrolysis temperatures without significant production before reaching pyrolysis temperatures. Formation fluids including pyrolysis products may be produced through the production wells.

In some embodiments, the average temperature of one or more sections may be raised to temperatures sufficient to allow synthesis gas production after mobilization and/or pyrolysis. In some embodiments, hydrocarbons may be raised to temperatures sufficient to allow synthesis gas production without significant production before reaching the temperatures sufficient to allow synthesis gas production. For example, synthesis gas may be produced in a temperature range from about 400° C. to about 1200° C., about 500° C. to about 1100° C., or about 550° C. to about 1000° C. A synthesis gas generating fluid (for example, steam and/or water) may be introduced into the sections to generate synthesis gas. Synthesis gas may be produced from production wells.

Solution mining, removal of volatile hydrocarbons and water, mobilizing hydrocarbons, pyrolyzing hydrocarbons, generating synthesis gas, and/or other processes may be performed during the in situ heat treatment process. In some embodiments, some processes may be performed after the in situ heat treatment process. Such processes may include, but are not limited to, recovering heat from treated sections, storing fluids (for example, water and/or hydrocarbons) in previously treated sections, and/or sequestering carbon dioxide in previously treated sections.

FIG. 1 depicts a schematic view of an embodiment of a portion of the in situ heat treatment system for treating the hydrocarbon containing formation. The in situ heat treatment system may include barrier wells 200. Barrier wells are used to form a barrier around a treatment area. The barrier inhibits fluid flow into and/or out of the treatment area. Barrier wells include, but are not limited to, dewatering wells, vacuum wells, capture wells, injection wells, grout wells, freeze wells, or combinations thereof. In some embodiments, barrier wells 200 are dewatering wells. Dewatering wells may remove liquid water and/or inhibit liquid water from entering a portion of the formation to be heated, or to the formation being heated. In the embodiment depicted in FIG. 1, the barrier wells 200 are shown extending only along one side of heat sources 202, but the barrier wells typically encircle all heat sources 202 used, or to be used, to heat a treatment area of the formation.

Heat sources 202 are placed in at least a portion of the formation. Heat sources 202 may include heaters such as insulated conductors, conductor-in-conduit heaters, surface burners, flameless distributed combustors, and/or natural distributed combustors. Heat sources 202 may also include other types of heaters. Heat sources 202 provide heat to at least a portion of the formation to heat hydrocarbons in the formation. Energy may be supplied to heat sources 202 through supply lines 204. Supply lines 204 may be structurally different depending on the type of heat source or heat sources used to heat the formation. Supply lines 204 for heat sources may transmit electricity for electric heaters, may transport fuel for combustors, or may transport heat exchange fluid that is circulated in the formation. In some embodiments, electricity for an in situ heat treatment process may be provided by a nuclear power plant or nuclear power plants. The use of nuclear power may allow for reduction or elimination of carbon dioxide emissions from the in situ heat treatment process.

When the formation is heated, the heat input into the formation may cause expansion of the formation and geomechanical motion. The heat sources may be turned on before, at the same time, or during a dewatering process. Computer simulations may model formation response to heating. The computer simulations may be used to develop a pattern and time sequence for activating heat sources in the formation so that geomechanical motion of the formation does not adversely affect the functionality of heat sources, production wells, and other equipment in the formation.

Heating the formation may cause an increase in permeability and/or porosity of the formation. Increases in permeability and/or porosity may result from a reduction of mass in the formation due to vaporization and removal of water, removal of hydrocarbons, and/or creation of fractures. Fluid may flow more easily in the heated portion of the formation because of the increased permeability and/or porosity of the formation. Fluid in the heated portion of the formation may move a considerable distance through the formation because of the increased permeability and/or porosity. The considerable distance may be over 1000 m depending on various factors, such as permeability of the formation, properties of the fluid, temperature of the formation, and pressure gradient allowing movement of the fluid. The ability of fluid to travel considerable distance in the formation allows production wells 206 to be spaced relatively far apart in the formation.

Production wells 206 are used to remove formation fluid from the formation. In some embodiments, production well 206 includes a heat source. The heat source in the production well may heat one or more portions of the formation at or near the production well. In some in situ heat treatment process embodiments, the amount of heat supplied to the formation from the production well per meter of the production well is less than the amount of heat applied to the formation from a heat source that heats the formation per meter of the heat source. Heat applied to the formation from the production well may increase formation permeability adjacent to the production well by vaporizing and removing liquid phase fluid adjacent to the production well and/or by increasing the permeability of the formation adjacent to the production well by formation of macro and/or micro fractures.

More than one heat source may be positioned in the production well. A heat source in a lower portion of the production well may be turned off when superposition of heat from adjacent heat sources heats the formation sufficiently to counteract benefits provided by heating the formation with the production well. In some embodiments, the heat source in an upper portion of the production well may remain on after the heat source in the lower portion of the production well is deactivated. The heat source in the upper portion of the well may inhibit condensation and reflux of formation fluid.

In some embodiments, the heat source in production well 206 allows for vapor phase removal of formation fluids from the formation. Providing heating at or through the production well may: (1) inhibit condensation and/or refluxing of production fluid when such production fluid is moving in the production well proximate the overburden, (2) increase heat input into the formation, (3) increase production rate from the production well as compared to a production well without a heat source, (4) inhibit condensation of high carbon number compounds (C6 hydrocarbons and above) in the production well, and/or (5) increase formation permeability at or proximate the production well.

Subsurface pressure in the formation may correspond to the fluid pressure generated in the formation. As temperatures in the heated portion of the formation increase, the pressure in the heated portion may increase as a result of thermal expansion of in situ fluids, increased fluid generation and vaporization of water. Controlling rate of fluid removal from the formation may allow for control of pressure in the formation. Pressure in the formation may be determined at a number of different locations, such as near or at production wells, near or at heat sources, or at monitor wells.

In some hydrocarbon containing formations, production of hydrocarbons from the formation is inhibited until at least some hydrocarbons in the formation have been mobilized and/or pyrolyzed. Formation fluid may be produced from the formation when the formation fluid is of a selected quality. In some embodiments, the selected quality includes an API gravity of at least about 20°, 30°, or 40°. Inhibiting production until at least some hydrocarbons are mobilized and/or pyrolyzed may increase conversion of heavy hydrocarbons to light hydrocarbons. Inhibiting initial production may minimize the production of heavy hydrocarbons from the formation. Production of substantial amounts of heavy hydrocarbons may require expensive equipment and/or reduce the life of production equipment.

In some hydrocarbon containing formations, hydrocarbons in the formation may be heated to mobilization and/or pyrolysis temperatures before substantial permeability has been generated in the heated portion of the formation. An initial lack of permeability may inhibit the transport of generated fluids to production wells 206. During initial heating, fluid pressure in the formation may increase proximate heat sources 202. The increased fluid pressure may be released, monitored, altered, and/or controlled through one or more heat sources 202. For example, selected heat sources 202 or separate pressure relief wells may include pressure relief valves that allow for removal of some fluid from the formation.

In some embodiments, pressure generated by expansion of mobilized fluids, pyrolysis fluids or other fluids generated in the formation may be allowed to increase although an open path to production wells 206 or any other pressure sink may not yet exist in the formation. The fluid pressure may be allowed to increase towards a lithostatic pressure. Fractures in the hydrocarbon containing formation may form when the fluid approaches the lithostatic pressure. For example, fractures may form from heat sources 202 to production wells 206 in the heated portion of the formation. The generation of fractures in the heated portion may relieve some of the pressure in the portion. Pressure in the formation may have to be maintained below a selected pressure to inhibit unwanted production, fracturing of the overburden or underburden, and/or coking of hydrocarbons in the formation.

After mobilization and/or pyrolysis temperatures are reached and production from the formation is allowed, pressure in the formation may be varied to alter and/or control a composition of formation fluid produced, to control a percentage of condensable fluid as compared to non-condensable fluid in the formation fluid, and/or to control an API gravity of formation fluid being produced. For example, decreasing pressure may result in production of a larger condensable fluid component. The condensable fluid component may contain a larger percentage of olefins.

In some in situ heat treatment process embodiments, pressure in the formation may be maintained high enough to promote production of formation fluid with an API gravity of greater than 20°. Maintaining increased pressure in the formation may inhibit formation subsidence during in situ heat treatment. Maintaining increased pressure may reduce or eliminate the need to compress formation fluids at the surface to transport the fluids in collection conduits to treatment facilities.

Maintaining increased pressure in a heated portion of the formation may surprisingly allow for production of large quantities of hydrocarbons of increased quality and of relatively low molecular weight. Pressure may be maintained so that formation fluid produced has a minimal amount of compounds above a selected carbon number. The selected carbon number may be at most 25, at most 20, at most 12, or at most 8. Some high carbon number compounds may be entrained in vapor in the formation and may be removed from the formation with the vapor. Maintaining increased pressure in the formation may inhibit entrainment of high carbon number compounds and/or multi-ring hydrocarbon compounds in the vapor. High carbon number compounds and/or multi-ring hydrocarbon compounds may remain in a liquid phase in the formation for significant time periods. The significant time periods may provide sufficient time for the compounds to pyrolyze to form lower carbon number compounds.

Generation of relatively low molecular weight hydrocarbons is believed to be due, in part, to autogenous generation and reaction of hydrogen in a portion of the hydrocarbon containing formation. For example, maintaining an increased pressure may force hydrogen generated during pyrolysis into the liquid phase within the formation. Heating the portion to a temperature in a pyrolysis temperature range may pyrolyze hydrocarbons in the formation to generate liquid phase pyrolyzation fluids. The generated liquid phase pyrolyzation fluids components may include double bonds and/or radicals. Hydrogen ($H_2$) in the liquid phase may reduce double bonds of the generated pyrolyzation fluids, thereby reducing a potential for polymerization or formation of long chain compounds from the generated pyrolyzation fluids. In addition, $H_2$ may also neutralize radicals in the generated pyrolyzation fluids. $H_2$ in the liquid phase may inhibit the generated pyrolyzation fluids from reacting with each other and/or with other compounds in the formation.

Formation fluid produced from production wells 206 may be transported through collection piping 208 to treatment facilities 210. Formation fluids may also be produced from heat sources 202. For example, fluid may be produced from heat sources 202 to control pressure in the formation adjacent to the heat sources. Fluid produced from heat sources 202 may be transported through tubing or piping to collection piping 208 or the produced fluid may be transported through tubing or piping directly to treatment facilities 210. Treatment facilities 210 may include separation units, reaction units, upgrading units, fuel cells, turbines, storage vessels, and/or other systems and units for processing produced formation fluids. The treatment facilities may form transportation fuel from at least a portion of the hydrocarbons produced from the formation. In some embodiments, the transportation fuel may be jet fuel, such as JP-8.

An insulated conductor may be used as an electric heater element of a heater or a heat source. The insulated conductor may include an inner electrical conductor (core) surrounded by an electrical insulator and an outer electrical conductor (jacket). The electrical insulator may include mineral insulation (for example, magnesium oxide) or other electrical insulation.

In certain embodiments, the insulated conductor is placed in an opening in a hydrocarbon containing formation. In some embodiments, the insulated conductor is placed in an uncased opening in the hydrocarbon containing formation. Placing the insulated conductor in an uncased opening in the hydrocarbon containing formation may allow heat transfer from the insulated conductor to the formation by radiation as well as conduction. Using an uncased opening may facilitate retrieval of the insulated conductor from the well, if necessary.

In some embodiments, an insulated conductor is placed within a casing in the formation; may be cemented within the formation; or may be packed in an opening with sand, gravel, or other fill material. The insulated conductor may be supported on a support member positioned within the opening. The support member may be a cable, rod, or a conduit (for example, a pipe). The support member may be made of a metal, ceramic, inorganic material, or combinations thereof. Because portions of a support member may be exposed to formation fluids and heat during use, the support member may be chemically resistant and/or thermally resistant.

Ties, spot welds, and/or other types of connectors may be used to couple the insulated conductor to the support member at various locations along a length of the insulated conductor. The support member may be attached to a wellhead at an upper surface of the formation. In some embodiments, the insulated conductor has sufficient structural strength such that a support member is not needed. The insulated conductor may, in many instances, have at least some flexibility to inhibit thermal expansion damage when undergoing temperature changes.

In certain embodiments, insulated conductors are placed in wellbores without support members and/or centralizers. An insulated conductor without support members and/or centralizers may have a suitable combination of temperature and corrosion resistance, creep strength, length, thickness (diameter), and metallurgy that will inhibit failure of the insulated conductor during use.

Figure 2:
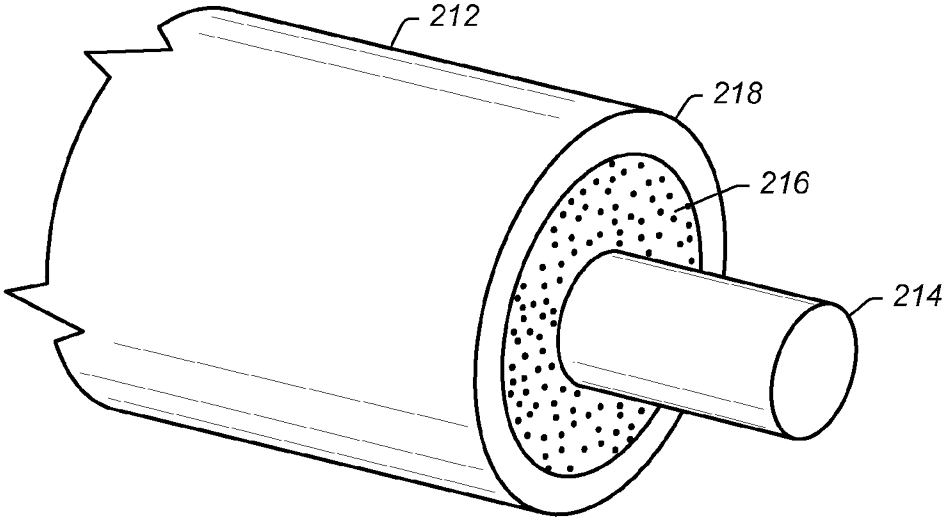
FIG. 2 depicts an embodiment of an insulated conductor heat source.

FIG. 2 depicts a perspective view of an end portion of an embodiment of insulated conductor 212. Insulated conductor 212 may have any desired cross-sectional shape such as, but not limited to, round (depicted in FIG. 2), triangular, ellipsoidal, rectangular, hexagonal, or irregular. In certain embodiments, insulated conductor 212 includes core 214, electrical insulator 216, and jacket 218. Core 214 may resistively heat when an electrical current passes through the core. Alternating or time-varying current and/or direct current may be used to provide power to core 214 such that the core resistively heats.

In some embodiments, electrical insulator 216 inhibits current leakage and arcing to jacket 218. Electrical insulator 216 may thermally conduct heat generated in core 214 to jacket 218. Jacket 218 may radiate or conduct heat to the formation. In certain embodiments, insulated conductor 212 is 1000 m or more in length. Longer or shorter insulated conductors may also be used to meet specific application needs. The dimensions of core 214, electrical insulator 216, and jacket 218 of insulated conductor 212 may be selected such that the insulated conductor has enough strength to be self supporting even at upper working temperature limits. Such insulated conductors may be suspended from wellheads or supports positioned near an interface between an overburden and a hydrocarbon containing formation without the need for support members extending into the hydrocarbon containing formation along with the insulated conductors.

Insulated conductor 212 may be designed to operate at power levels of up to about 1650 watts/meter or higher. In certain embodiments, insulated conductor 212 operates at a power level between about 500 watts/meter and about 1150 watts/meter when heating a formation. Insulated conductor 212 may be designed so that a maximum voltage level at a typical operating temperature does not cause substantial thermal and/or electrical breakdown of electrical insulator 216. Insulated conductor 212 may be designed such that jacket 218 does not exceed a temperature that will result in a significant reduction in corrosion resistance properties of the jacket material. In certain embodiments, insulated conductor 212 may be designed to reach temperatures within a range between about 650° C. and about 900° C. Insulated conductors having other operating ranges may be formed to meet specific operational requirements.

FIG. 2 depicts insulated conductor 212 having a single core 214. In some embodiments, insulated conductor 212 has two or more cores 214. For example, a single insulated conductor may have three cores. Core 214 may be made of metal or another electrically conductive material. The material used to form core 214 may include, but not be limited to, nichrome, copper, nickel, carbon steel, stainless steel, and combinations thereof. In certain embodiments, core 214 is chosen to have a diameter and a resistivity at operating temperatures such that its resistance, as derived from Ohm's law, makes it electrically and structurally stable for the chosen power dissipation per meter, the length of the heater, and/or the maximum voltage allowed for the core material.

In some embodiments, core 214 is made of different materials along a length of insulated conductor 212. For example, a first section of core 214 may be made of a material that has a significantly lower resistance than a second section of the core. The first section may be placed adjacent to a formation layer that does not need to be heated to as high a temperature as a second formation layer that is adjacent to the second section. The resistivity of various sections of core 214 may be adjusted by having a variable diameter and/or by having core sections made of different materials.

Electrical insulator 216 may be made of a variety of materials. Commonly used powders may include, but are not limited to, MgO, $Al_2O_3$, Zirconia, BeO, different chemical variations of Spinels, and combinations thereof. MgO may provide good thermal conductivity and electrical insulation properties. The desired electrical insulation properties include low leakage current and high dielectric strength. A low leakage current decreases the possibility of thermal breakdown and the high dielectric strength decreases the possibility of arcing across the insulator. Thermal breakdown can occur if the leakage current causes a progressive rise in the temperature of the insulator leading also to arcing across the insulator.

Jacket 218 may be an outer metallic layer or electrically conductive layer. Jacket 218 may be in contact with hot formation fluids. Jacket 218 may be made of material having a high resistance to corrosion at elevated temperatures. Alloys that may be used in a desired operating temperature range of jacket 218 include, but are not limited to, 304 stainless steel, 310 stainless steel, Incoloy® 800, and Inconel® 600 (Inco Alloys International, Huntington, W. Va., U.S.A.). The thickness of jacket 218 may have to be sufficient to last for three to ten years in a hot and corrosive environment. A thickness of jacket 218 may generally vary between about 1 mm and about 2.5 mm. For example, a 1.3 mm thick, 310 stainless steel outer layer may be used as jacket 218 to provide good chemical resistance to sulfidation corrosion in a heated zone of a formation for a period of over 3 years. Larger or smaller jacket thicknesses may be used to meet specific application requirements.

One or more insulated conductors may be placed within an opening in a formation to form a heat source or heat sources. Electrical current may be passed through each insulated conductor in the opening to heat the formation. Alternately, electrical current may be passed through selected insulated conductors in an opening. The unused conductors may be used as backup heaters. Insulated conductors may be electrically coupled to a power source in any convenient manner. Each end of an insulated conductor may be coupled to lead-in cables that pass through a wellhead. Such a configuration typically has a 180° bend (a "hairpin" bend) or turn located near a bottom of the heat source. An insulated conductor that includes a 180° bend or turn may not require a bottom termination, but the 180° bend or turn may be an electrical and/or structural weakness in the heater. Insulated conductors may be electrically coupled together in series, in parallel, or in series and parallel combinations. In some embodiments of heat sources, electrical current may pass into the conductor of an insulated conductor and may be returned through the jacket of the insulated conductor by connecting core 214 to jacket 218 (shown in FIG. 2) at the bottom of the heat source.

Figure 3:
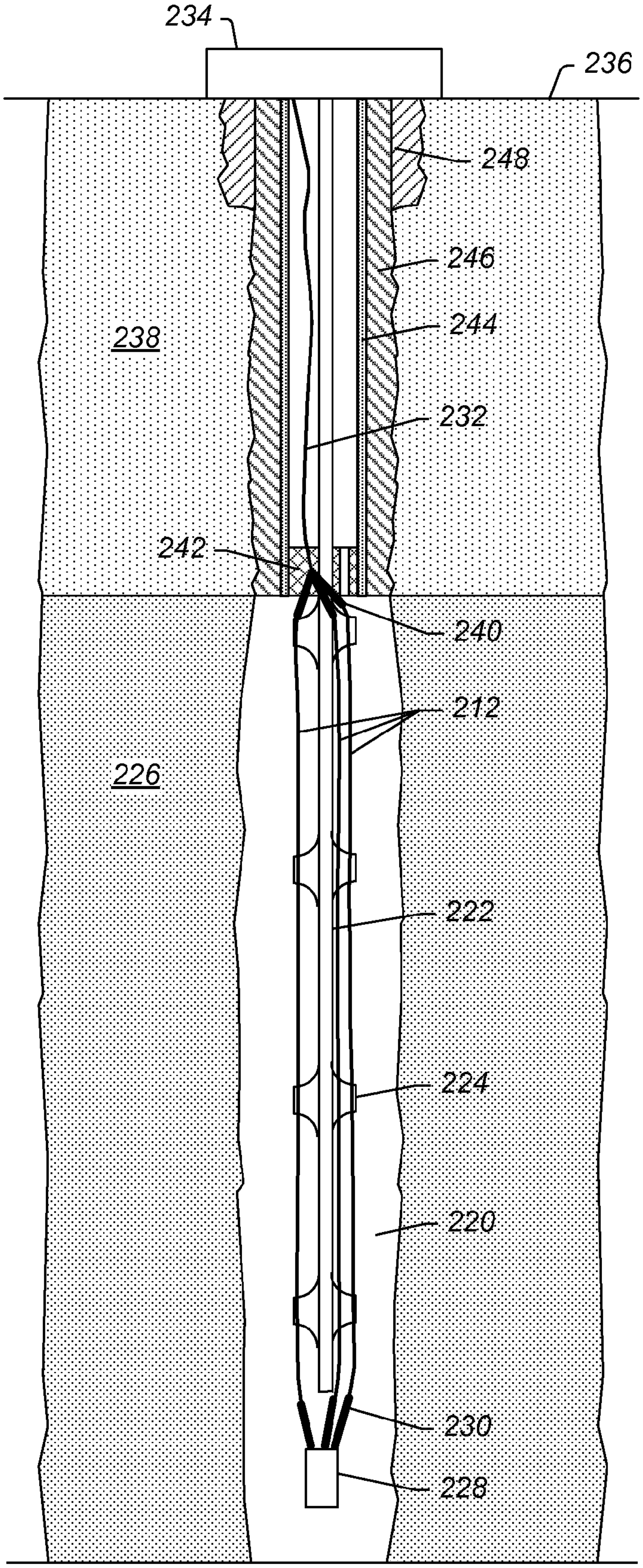
FIG. 3 depicts an embodiment of an insulated conductor heat source.
Figure 4:
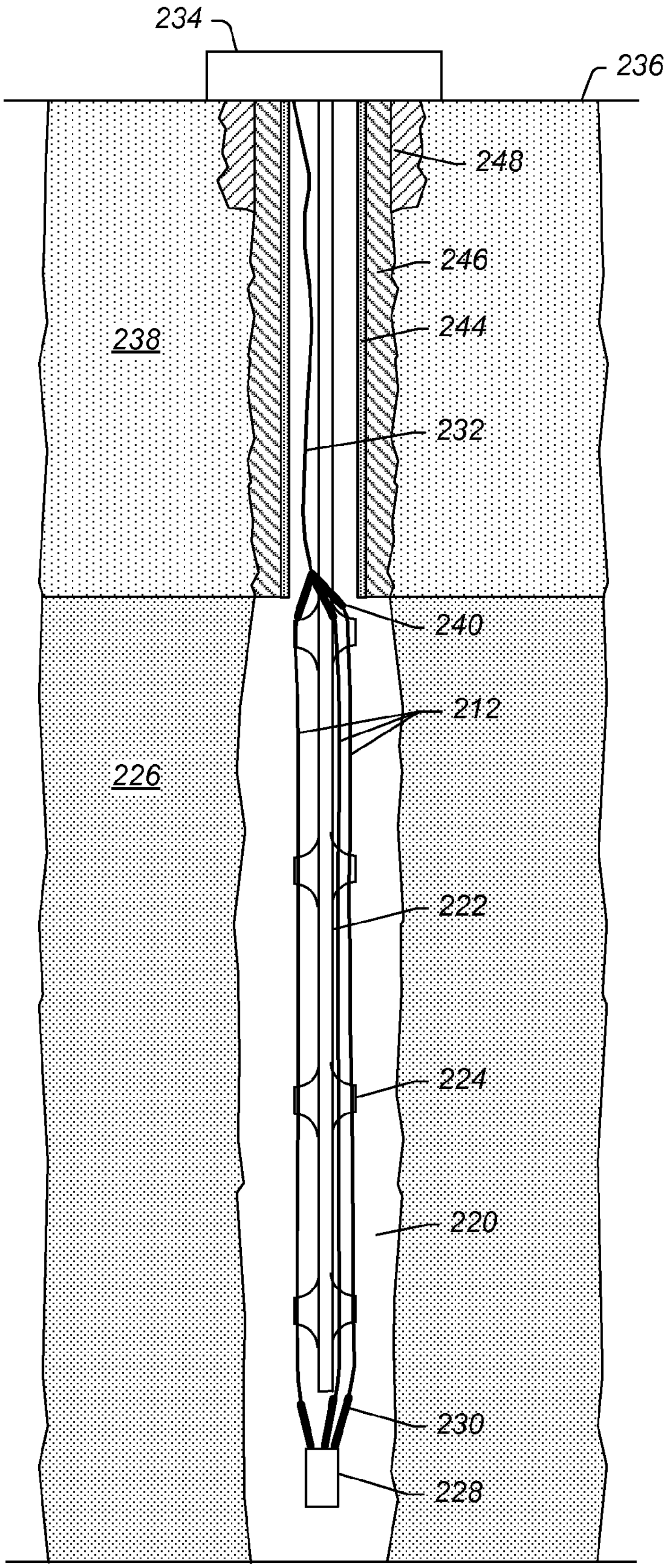
FIG. 4 depicts an embodiment of an insulated conductor heat source.

In some embodiments, three insulated conductors 212 are electrically coupled in a 3-phase wye configuration to a power supply. FIG. 3 depicts an embodiment of three insulated conductors in an opening in a subsurface formation coupled in a wye configuration. FIG. 4 depicts an embodiment of three insulated conductors 212 that are removable from opening 220 in the formation. No bottom connection may be required for three insulated conductors in a wye configuration. Alternately, all three insulated conductors of the wye configuration may be connected together near the bottom of the opening. The connection may be made directly at ends of heating sections of the insulated conductors or at ends of cold pins (less resistive sections) coupled to the heating sections at the bottom of the insulated conductors. The bottom connections may be made with insulator filled and sealed canisters or with epoxy filled canisters. The insulator may be the same composition as the insulator used as the electrical insulation.

Three insulated conductors 212 depicted in FIGS. 3 and 4 may be coupled to support member 222 using centralizers 224. Alternatively, insulated conductors 212 may be strapped directly to support member 222 using metal straps. Centralizers 224 may maintain a location and/or inhibit movement of insulated conductors 212 on support member 222. Centralizers 224 may be made of metal, ceramic, or combinations thereof. The metal may be stainless steel or any other type of metal able to withstand a corrosive and high temperature environment. In some embodiments, centralizers 224 are bowed metal strips welded to the support member at distances less than about 6 m. A ceramic used in centralizer 224 may be, but is not limited to, $Al_2O_3$, MgO, or another electrical insulator. Centralizers 224 may maintain a location of insulated conductors 212 on support member 222 such that movement of insulated conductors is inhibited at operating temperatures of the insulated conductors. Insulated conductors 212 may also be somewhat flexible to withstand expansion of support member 222 during heating.

Support member 222, insulated conductor 212, and centralizers 224 may be placed in opening 220 in hydrocarbon layer 226. Insulated conductors 212 may be coupled to bottom conductor junction 228 using cold pin 230. Bottom conductor junction 228 may electrically couple each insulated conductor 212 to each other. Bottom conductor junction 228 may include materials that are electrically conducting and do not melt at temperatures found in opening 220. Cold pin 230 may be an insulated conductor having lower electrical resistance than insulated conductor 212.

Lead-in conductor 232 may be coupled to wellhead 234 to provide electrical power to insulated conductor 212. Lead-in conductor 232 may be made of a relatively low electrical resistance conductor such that relatively little heat is generated from electrical current passing through the lead-in conductor. In some embodiments, the lead-in conductor is a rubber or polymer insulated stranded copper wire. In some embodiments, the lead-in conductor is a mineral insulated conductor with a copper core. Lead-in conductor 232 may couple to wellhead 234 at surface 236 through a sealing flange located between overburden 238 and surface 236. The sealing flange may inhibit fluid from escaping from opening 220 to surface 236.

In certain embodiments, lead-in conductor 232 is coupled to insulated conductor 212 using transition conductor 240. Transition conductor 240 may be a less resistive portion of insulated conductor 212. Transition conductor 240 may be referred to as "cold pin" of insulated conductor 212. Transition conductor 240 may be designed to dissipate about one-tenth to about one-fifth of the power per unit length as is dissipated in a unit length of the primary heating section of insulated conductor 212. Transition conductor 240 may typically be between about 1.5 m and about 15 m, although shorter or longer lengths may be used to accommodate specific application needs. In an embodiment, the conductor of transition conductor 240 is copper. The electrical insulator of transition conductor 240 may be the same type of electrical insulator used in the primary heating section. A jacket of transition conductor 240 may be made of corrosion resistant material.

In certain embodiments, transition conductor 240 is coupled to lead-in conductor 232 by a splice or other coupling joint. Splices may also be used to couple transition conductor 240 to insulated conductor 212. Splices may have to withstand a temperature equal to half of a target zone operating temperature. Density of electrical insulation in the splice should in many instances be high enough to withstand the required temperature and the operating voltage.

In some embodiments, as shown in FIG. 3, packing material 242 is placed between overburden casing 244 and opening 220. In some embodiments, reinforcing material 246 may secure overburden casing 244 to overburden 238. Packing material 242 may inhibit fluid from flowing from opening 220 to surface 236. Reinforcing material 246 may include, for example, Class G or Class H Portland cement mixed with silica flour for improved high temperature performance, slag or silica flour, and/or a mixture thereof. In some embodiments, reinforcing material 246 extends radially a width of from about 5 cm to about 25 cm.

As shown in FIGS. 3 and 4, support member 222 and lead-in conductor 232 may be coupled to wellhead 234 at surface 236 of the formation. Surface conductor 248 may enclose reinforcing material 246 and couple to wellhead 234. Embodiments of surface conductors may extend to depths of approximately 3 m to approximately 515 m into an opening in the formation. Alternatively, the surface conductor may extend to a depth of approximately 9 m into the formation. Electrical current may be supplied from a power source to insulated conductor 212 to generate heat due to the electrical resistance of the insulated conductor. Heat generated from three insulated conductors 212 may transfer within opening 220 to heat at least a portion of hydrocarbon layer 226.

Heat generated by insulated conductors 212 may heat at least a portion of a hydrocarbon containing formation. In some embodiments, heat is transferred to the formation substantially by radiation of the generated heat to the formation. Some heat may be transferred by conduction or convection of heat due to gases present in the opening. The opening may be an uncased opening, as shown in FIGS. 3 and 4. An uncased opening eliminates cost associated with thermally cementing the heater to the formation, costs associated with a casing, and/or costs of packing a heater within an opening. In addition, heat transfer by radiation is typically more efficient than by conduction, so the heaters may be operated at lower temperatures in an open wellbore. Conductive heat transfer during initial operation of a heat source may be enhanced by the addition of a gas in the opening. The gas may be maintained at a pressure up to about 27 bars absolute. The gas may include, but is not limited to, carbon dioxide and/or helium. An insulated conductor heater in an open wellbore may advantageously be free to expand or contract to accommodate thermal expansion and contraction. An insulated conductor heater may advantageously be removable or redeployable from an open wellbore.

In certain embodiments, an insulated conductor heater assembly is installed or removed using a spooling assembly. More than one spooling assembly may be used to install both the insulated conductor and a support member simultaneously. Alternatively, the support member may be installed using a coiled tubing unit. The heaters may be un-spooled and connected to the support as the support is inserted into the well. The electric heater and the support member may be un-spooled from the spooling assemblies. Spacers may be coupled to the support member and the heater along a length of the support member. Additional spooling assemblies may be used for additional electric heater elements.

Temperature limited heaters may be in configurations and/or may include materials that provide automatic temperature limiting properties for the heater at certain temperatures. Examples of temperature limited heaters may be found in U.S. Pat. No. 6,688,387 to Wellington et al.; U.S. Pat. No. 6,991,036 to Sumnu-Dindoruk et al.; U.S. Pat. No. 6,698,515 to Karanikas et al.; U.S. Pat. No. 6,880,633 to Wellington et al.; U.S. Pat. No. 6,782,947 to de Rouffignac et al.; U.S. Pat. No. 6,991,045 to Vinegar et al.; U.S. Pat. No. 7,073,578 to Vinegar et al.; U.S. Pat. No. 7,121,342 to Vinegar et al.; U.S. Pat. No. 7,320,364 to Fairbanks; U.S. Pat. No. 7,527,094 to McKinzie et al.; U.S. Pat. No. 7,584,789 to Mo et al.; U.S. Pat. No. 7,533,719 to Hinson et al.; and U.S. Pat. No. 7,562,707 to Miller; U.S. Patent Application Publication Nos. 2009-0071652 to Vinegar et al.; 2009-0189617 to Burns et al.; 2010-0071903 to Prince-Wright et al.; and 2010-0096137 to Nguyen et al., each of which is incorporated by reference as if fully set forth herein. Temperature limited heaters are dimensioned to operate with AC frequencies (for example, 60 Hz AC) or with modulated DC current.

In certain embodiments, ferromagnetic materials are used in temperature limited heaters. Ferromagnetic material may self-limit temperature at or near the Curie temperature of the material and/or the phase transformation temperature range to provide a reduced amount of heat when a time-varying current is applied to the material. In certain embodiments, the ferromagnetic material self-limits temperature of the temperature limited heater at a selected temperature that is approximately the Curie temperature and/or in the phase transformation temperature range. In certain embodiments, the selected temperature is within about 35° C., within about 25° C., within about 20° C., or within about 10° C. of the Curie temperature and/or the phase transformation temperature range. In certain embodiments, ferromagnetic materials are coupled with other materials (for example, highly conductive materials, high strength materials, corrosion resistant materials, or combinations thereof) to provide various electrical and/or mechanical properties. Some parts of the temperature limited heater may have a lower resistance (caused by different geometries and/or by using different ferromagnetic and/or non-ferromagnetic materials) than other parts of the temperature limited heater. Having parts of the temperature limited heater with various materials and/or dimensions allows for tailoring the desired heat output from each part of the heater.

Temperature limited heaters may be more reliable than other heaters. Temperature limited heaters may be less apt to break down or fail due to hot spots in the formation. In some embodiments, temperature limited heaters allow for substantially uniform heating of the formation. In some embodiments, temperature limited heaters are able to heat the formation more efficiently by operating at a higher average heat output along the entire length of the heater. The temperature limited heater operates at the higher average heat output along the entire length of the heater because power to the heater does not have to be reduced to the entire heater, as is the case with typical constant wattage heaters, if a temperature along any point of the heater exceeds, or is about to exceed, a maximum operating temperature of the heater. Heat output from portions of a temperature limited heater approaching a Curie temperature and/or the phase transformation temperature range of the heater automatically reduces without controlled adjustment of the time-varying current applied to the heater. The heat output automatically reduces due to changes in electrical properties (for example, electrical resistance) of portions of the temperature limited heater. Thus, more power is supplied by the temperature limited heater during a greater portion of a heating process.

In certain embodiments, the system including temperature limited heaters initially provides a first heat output and then provides a reduced (second heat output) heat output, near, at, or above the Curie temperature and/or the phase transformation temperature range of an electrically resistive portion of the heater when the temperature limited heater is energized by a time-varying current. The first heat output is the heat output at temperatures below which the temperature limited heater begins to self-limit. In some embodiments, the first heat output is the heat output at a temperature about 50° C., about 75° C., about 100° C., or about 125° C. below the Curie temperature and/or the phase transformation temperature range of the ferromagnetic material in the temperature limited heater.

The temperature limited heater may be energized by time-varying current (alternating current or modulated direct current) supplied at the wellhead. The wellhead may include a power source and other components (for example, modulation components, transformers, and/or capacitors) used in supplying power to the temperature limited heater. The temperature limited heater may be one of many heaters used to heat a portion of the formation.

In certain embodiments, the temperature limited heater includes a conductor that operates as a skin effect or proximity effect heater when time-varying current is applied to the conductor. The skin effect limits the depth of current penetration into the interior of the conductor. For ferromagnetic materials, the skin effect is dominated by the magnetic permeability of the conductor. The relative magnetic permeability of ferromagnetic materials is typically between 10 and 1000 (for example, the relative magnetic permeability of ferromagnetic materials is typically at least 10 and may be at least 50, 100, 500, 1000 or greater). As the temperature of the ferromagnetic material is raised above the Curie temperature, or the phase transformation temperature range, and/or as the applied electrical current is increased, the magnetic permeability of the ferromagnetic material decreases substantially and the skin depth expands rapidly (for example, the skin depth expands as the inverse square root of the magnetic permeability). The reduction in magnetic permeability results in a decrease in the AC or modulated DC resistance of the conductor near, at, or above the Curie temperature, the phase transformation temperature range, and/or as the applied electrical current is increased. When the temperature limited heater is powered by a substantially constant current source, portions of the heater that approach, reach, or are above the Curie temperature and/or the phase transformation temperature range may have reduced heat dissipation. Sections of the temperature limited heater that are not at or near the Curie temperature and/or the phase transformation temperature range may be dominated by skin effect heating that allows the heater to have high heat dissipation due to a higher resistive load.

An advantage of using the temperature limited heater to heat hydrocarbons in the formation is that the conductor is chosen to have a Curie temperature and/or a phase transformation temperature range in a desired range of temperature operation. Operation within the desired operating temperature range allows substantial heat injection into the formation while maintaining the temperature of the temperature limited heater, and other equipment, below design limit temperatures. Design limit temperatures are temperatures at which properties such as corrosion, creep, and/or deformation are adversely affected. The temperature limiting properties of the temperature limited heater inhibit overheating or burnout of the heater adjacent to low thermal conductivity "hot spots" in the formation. In some embodiments, the temperature limited heater is able to lower or control heat output and/or withstand heat at temperatures above 25° C., 37° C., 100° C., 250° C., 500° C., 700° C., 800° C., 900° C., or higher up to 1131° C., depending on the materials used in the heater.

The temperature limited heater allows for more heat injection into the formation than constant wattage heaters because the energy input into the temperature limited heater does not have to be limited to accommodate low thermal conductivity regions adjacent to the heater. For example, in Green River oil shale there is a difference of at least a factor of 3 in the thermal conductivity of the lowest richness oil shale layers and the highest richness oil shale layers. When heating such a formation, substantially more heat is transferred to the formation with the temperature limited heater than with the conventional heater that is limited by the temperature at low thermal conductivity layers. The heat output along the entire length of the conventional heater needs to accommodate the low thermal conductivity layers so that the heater does not overheat at the low thermal conductivity layers and burn out. The heat output adjacent to the low thermal conductivity layers that are at high temperature will reduce for the temperature limited heater, but the remaining portions of the temperature limited heater that are not at high temperature will still provide high heat output. Because heaters for heating hydrocarbon formations typically have long lengths (for example, at least 10 m, 100 m, 300 m, 500 m, 1 km or more up to about 10 km), the majority of the length of the temperature limited heater may be operating below the Curie temperature and/or the phase transformation temperature range while only a few portions are at or near the Curie temperature and/or the phase transformation temperature range of the temperature limited heater.

The use of temperature limited heaters allows for efficient transfer of heat to the formation. Efficient transfer of heat allows for reduction in time needed to heat the formation to a desired temperature. For example, in Green River oil shale, pyrolysis typically requires 9.5 years to 10 years of heating when using a 12 m heater well spacing with conventional constant wattage heaters. For the same heater spacing, temperature limited heaters may allow a larger average heat output while maintaining heater equipment temperatures below equipment design limit temperatures. Pyrolysis in the formation may occur at an earlier time with the larger average heat output provided by temperature limited heaters than the lower average heat output provided by constant wattage heaters. For example, in Green River oil shale, pyrolysis may occur in 5 years using temperature limited heaters with a 12 m heater well spacing. Temperature limited heaters counteract hot spots due to inaccurate well spacing or drilling where heater wells come too close together. In certain embodiments, temperature limited heaters allow for increased power output over time for heater wells that have been spaced too far apart, or limit power output for heater wells that are spaced too close together. Temperature limited heaters also supply more power in regions adjacent the overburden and underburden to compensate for temperature losses in these regions.

Temperature limited heaters may be advantageously used in many types of formations. For example, in tar sands formations or relatively permeable formations containing heavy hydrocarbons, temperature limited heaters may be used to provide a controllable low temperature output for reducing the viscosity of fluids, mobilizing fluids, and/or enhancing the radial flow of fluids at or near the wellbore or in the formation. Temperature limited heaters may be used to inhibit excess coke formation due to overheating of the near wellbore region of the formation.

In some embodiments, the use of temperature limited heaters eliminates or reduces the need for expensive temperature control circuitry. For example, the use of temperature limited heaters eliminates or reduces the need to perform temperature logging and/or the need to use fixed thermocouples on the heaters to monitor potential overheating at hot spots.

The temperature limited heaters may be used in conductor-in-conduit heaters. In some embodiments of conductor-in-conduit heaters, the majority of the resistive heat is generated in the conductor, and the heat radiatively, conductively and/or convectively transfers to the conduit. In some embodiments of conductor-in-conduit heaters, the majority of the resistive heat is generated in the conduit.

In some embodiments, a relatively thin conductive layer is used to provide the majority of the electrically resistive heat output of the temperature limited heater at temperatures up to a temperature at or near the Curie temperature and/or the phase transformation temperature range of the ferromagnetic conductor. Such a temperature limited heater may be used as the heating member in an insulated conductor heater. The heating member of the insulated conductor heater may be located inside a sheath with an insulation layer between the sheath and the heating member.

Mineral insulated (MI) cables (insulated conductors) for use in subsurface applications, such as heating hydrocarbon containing formations in some applications, are longer, may have larger outside diameters, and may operate at higher voltages and temperatures than what is typical in the MI cable industry. For these subsurface applications, the joining of multiple MI cables is needed to make MI cables with sufficient length to reach the depths and distances needed to heat the subsurface efficiently and to join segments with different functions, such as lead-in cables joined to heater sections. Such long heaters also require higher voltages to provide enough power to the farthest ends of the heaters.

Conventional MI cable splice designs are typically not suitable for voltages above 1000 volts, above 1500 volts, or above 2000 volts and may not operate for extended periods without failure at elevated temperatures, such as over 650° C. (about 1200° F.), over 700° C. (about 1290° F.), or over 800° C. (about 1470° F.). Such high voltage, high temperature applications typically require the compaction of the mineral insulant in the splice to be as close as possible to or above the level of compaction in the insulated conductor (MI cable) itself.

The relatively large outside diameter and long length of MI cables for some applications requires that the cables be spliced while oriented horizontally. There are splices for other applications of MI cables that have been fabricated horizontally. These techniques typically use a small hole through which the mineral insulation (such as magnesium oxide powder) is filled into the splice and compacted slightly through vibration and tamping. Such methods do not provide sufficient compaction of the mineral insulation or even, in some cases, allow any compaction of the mineral insulation, and, thus may not be suitable for making splices for use at the high voltages needed for these subsurface applications.

Thus, there is a need for splices of insulated conductors that are simple yet can operate at the high voltages and temperatures in the subsurface environment over long durations without failure. In addition, the splices may need higher bending and tensile strengths to inhibit failure of the splice under the weight loads and temperatures that the cables can be subjected to in the subsurface. Techniques and methods also may be utilized to reduce electric field intensities in the splices to reduce leakage currents in the splices and to increase the margin between the operating voltage and electrical breakdown. Reducing electric field intensities may help increase voltage and temperature operating ranges of the splices.

Figure 5:
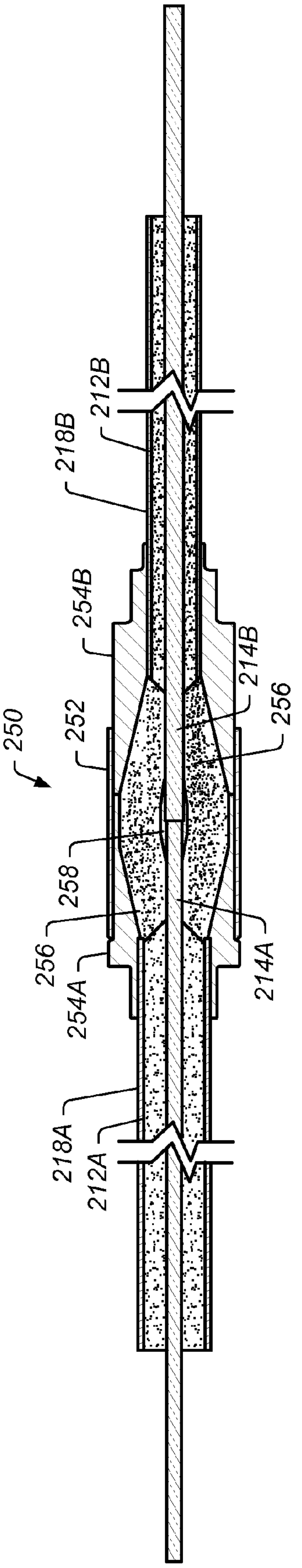
FIG. 5 depicts a side view cross-sectional representation of one embodiment of a fitting for joining insulated conductors.

FIG. 5 depicts a side view cross-sectional representation of one embodiment of a fitting for joining insulated conductors. Fitting 250 is a splice or coupling joint for joining insulated conductors 212A, 212B. In certain embodiments, fitting 250 includes sleeve 252 and housings 254A, 254B. Housings 254A, 254B may be splice housings, coupling joint housings, or coupler housings. Sleeve 252 and housings 254A, 254B may be made of mechanically strong, electrically conductive materials such as, but not limited to, stainless steel. Sleeve 252 and housings 254A, 254B may be cylindrically shaped or polygon shaped. Sleeve 252 and housings 254A, 254B may have rounded edges, tapered diameter changes, other features, or combinations thereof, which reduce electric field intensities in fitting 250.

Fitting 250 may be used to couple (splice) insulated conductor 212A to insulated conductor 212B while maintaining the mechanical and electrical integrity of the jackets (sheaths), insulation, and cores (conductors) of the insulated conductors. Fitting 250 may be used to couple heat producing insulated conductors with non-heat producing insulated conductors, to couple heat producing insulated conductors with other heat producing insulated conductors, or to couple non-heat producing insulated conductors with other non-heat producing insulated conductors. In some embodiments, more than one fitting 250 is used to couple multiple heat producing and non-heat producing insulated conductors to provide a long insulated conductor.

Fitting 250 may be used to couple insulated conductors with different diameters, as shown in FIG. 5. For example, the insulated conductors may have different core (conductor) diameters, different jacket (sheath) diameters, or combinations of different diameters. Fitting 250 may also be used to couple insulated conductors with different metallurgies, different types of insulation, or combinations thereof.

As shown in FIG. 5, housing 254A is coupled to jacket (sheath) 218A of insulated conductor 212A and housing 254B is coupled to jacket 218B of insulated conductor 212B. In certain embodiments, housings 254A, 254B are welded, brazed, or otherwise permanently affixed to insulated conductors 212A, 212B. In some embodiments, housings 254A, 254B are temporarily or semi-permanently affixed to jackets 218A, 218B of insulated conductors 212A, 212B (for example, coupled using threads or adhesives). Fitting 250 may be centered between the end portions of the insulated conductors 212A, 212B.

In certain embodiments, the interior volumes of sleeve 252 and housings 254A, 254B are substantially filled with electrically insulating material 256. In certain embodiments, "substantially filled" refers to entirely or almost entirely filling the volume or volumes with electrically insulating material with substantially no macroscopic voids in the volume or volumes. For example, substantially filled may refer to filling almost the entire volume with electrically insulating material that has some porosity because of microscopic voids (for example, up to about 40% porosity). Electrically insulating material 256 may include magnesium oxide, talc, ceramic powders (for example, boron nitride), a mixture of magnesium oxide and another electrical insulator (for example, up to about 50% by weight boron nitride), ceramic cement, mixtures of ceramic powders with certain non-ceramic materials (such as tungsten sulfide ($WS_2$)), or mixtures thereof. For example, magnesium oxide may be mixed with boron nitride or another electrical insulator to improve the ability of the electrically insulating material to flow, to improve the dielectric characteristics of the electrically insulating material, or to improve the flexibility of the fitting. In some embodiments, electrically insulating material 256 is material similar to electrical insulation used inside of at least one of insulated conductors 212A, 212B. Electrically insulating material 256 may have substantially similar dielectric characteristics to electrical insulation used inside of at least one of insulated conductors 212A, 212B.

In certain embodiments, first sleeve 252 and housings 254A, 254B are made up (for example, put together or manufactured) buried or submerged in electrically insulating material 256. Making up sleeve 252 and housings 254A, 254B buried in electrically insulating material 256 inhibits open space from forming in the interior volumes of the portions. Sleeve 252 and housings 254A, 254B have open ends to allow insulated conductors 212A, 212B to pass through. These open ends may be sized to have diameters slightly larger than the outside diameter of the jackets of the insulated conductors.

In certain embodiments, cores 214A, 214B of insulated conductors 212A, 212B are joined together at coupling 258. The jackets and insulation of insulated conductors 212A, 212B may be cut back or stripped to expose desired lengths of cores 214A, 214B before joining the cores. Coupling 258 may be located in electrically insulating material 256 inside sleeve 252.

Coupling 258 may join cores 214A, 214B together, for example, by compression, crimping, brazing, welding, or other techniques known in the art. In some embodiments, core 214A is made of different material than core 214B. For example, core 214A may be copper while core 214B is stainless steel, carbon steel, or Alloy 180. In such embodiments, special methods may have to be used to weld the cores together. For example, the tensile strength properties and/or yield strength properties of the cores may have to be matched closely such that the coupling between the cores does not degrade over time or with use.

In some embodiments, a copper core may be work-hardened before joining the core to carbon steel or Alloy 180. In some embodiments, the cores are coupled by in-line welding using filler material (for example, filler metal) between the cores of different materials. For example, Monel® (Special Metals Corporation, New Hartford, N.Y., U.S.A.) nickel alloys may be used as filler material. In some embodiments, copper cores are buttered (melted and mixed) with the filler material before the welding process.

In an embodiment, insulated conductors 212A, 212B are coupled using fitting 250 by first sliding housing 254A over jacket 218A of insulated conductor 212A and, second, sliding housing 254B over jacket 218B of insulated conductor 212B. The housings are slid over the jackets with the large diameter ends of the housings facing the ends of the insulated conductors. Sleeve 252 may be slid over insulated conductor 212B such that it is adjacent to housing 254B. Cores 214A, 214B are joined at coupling 258 to create a robust electrical and mechanical connection between the cores. The small diameter end of housing 254A is joined (for example, welded) to jacket 218A of insulated conductor 212A. Sleeve 252 and housing 254B are brought (moved or pushed) together with housing 254A to form fitting 250. The interior volume of fitting 250 may be substantially filled with electrically insulating material while the sleeve and the housings are brought together. The interior volume of the combined sleeve and housings is reduced such that the electrically insulating material substantially filling the entire interior volume is compacted. Sleeve 252 is joined to housing 254B and housing 254B is joined to jacket 218B of insulated conductor 212B. The volume of sleeve 252 may be further reduced, if additional compaction is desired.

In certain embodiments, the interior volumes of housings 254A, 254B filled with electrically insulating material 256 have tapered shapes. The diameter of the interior volumes of housings 254A, 254B may taper from a smaller diameter at or near the ends of the housings coupled to insulated conductors 212A, 212B to a larger diameter at or near the ends of the housings located inside sleeve 252 (the ends of the housings facing each other or the ends of the housings facing the ends of the insulated conductors). The tapered shapes of the interior volumes may reduce electric field intensities in fitting 250. Reducing electric field intensities in fitting 250 may reduce leakage currents in the fitting at increased operating voltages and temperatures, and may increase the margin to electrical breakdown. Thus, reducing electric field intensities in fitting 250 may increase the range of operating voltages and temperatures for the fitting.

In some embodiments, the insulation from insulated conductors 212A, 212B tapers from jackets 218A, 218B down to cores 214A, 214B in the direction toward the center of fitting 250 in the event that the electrically insulating material 256 is a weaker dielectric than the insulation in the insulated conductors. In some embodiments, the insulation from insulated conductors 212A, 212B tapers from jackets 218A, 218B down to cores 214A, 214B in the direction toward the insulated conductors in the event that electrically insulating material 256 is a stronger dielectric than the insulation in the insulated conductors. Tapering the insulation from the insulated conductors reduces the intensity of electric fields at the interfaces between the insulation in the insulated conductors and the electrically insulating material within the fitting.

Figure 6:
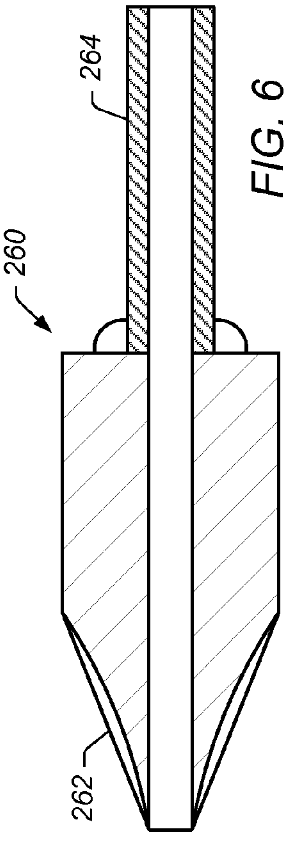
FIG. 6 depicts an embodiment of a cutting tool.

FIG. 6 depicts a tool that may be used to cut away part of the inside of insulated conductors 212A, 212B (for example, electrical insulation inside the jacket of the insulated conductor). Cutting tool 260 may include cutting teeth 262 and drive tube 264. Drive tube 264 may be coupled to the body of cutting tool 260 using, for example, a weld or a braze. In some embodiments, no cutting tool is needed to cut away electrical insulation from inside the jacket.

Sleeve 252 and housings 254A, 254B may be coupled together using any means known in the art such as brazing, welding, or crimping. In some embodiments, as shown in FIG. 7, sleeve 252 and housings 254A, 254B have threads that engage to couple the pieces together.

Figure 7:
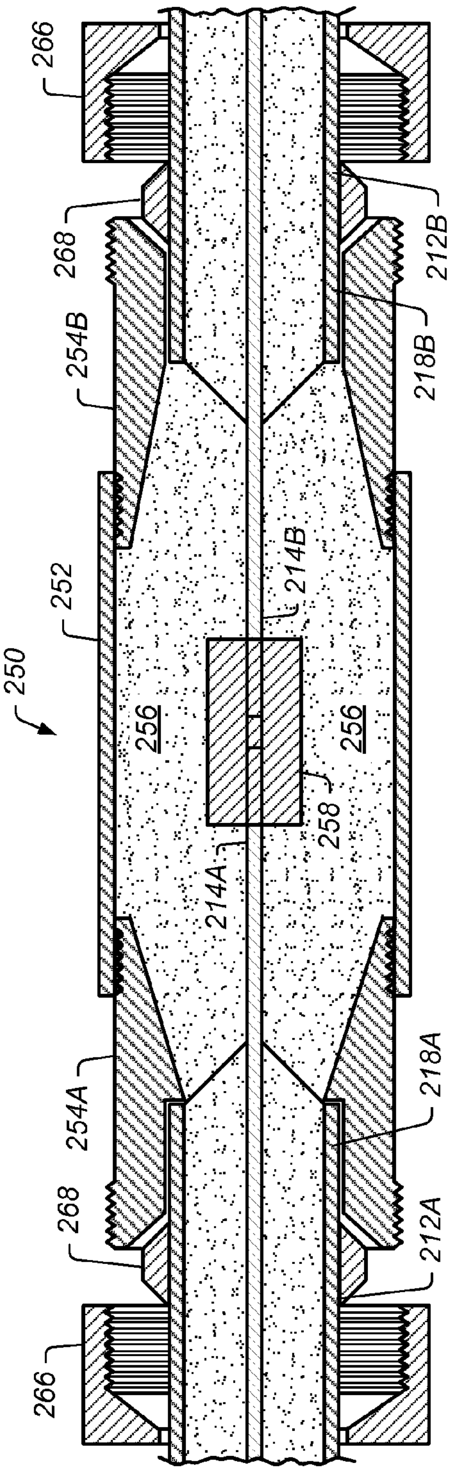
FIG. 7 depicts a side view cross-sectional representation of another embodiment of a fitting for joining insulated conductors.
Figure 10:
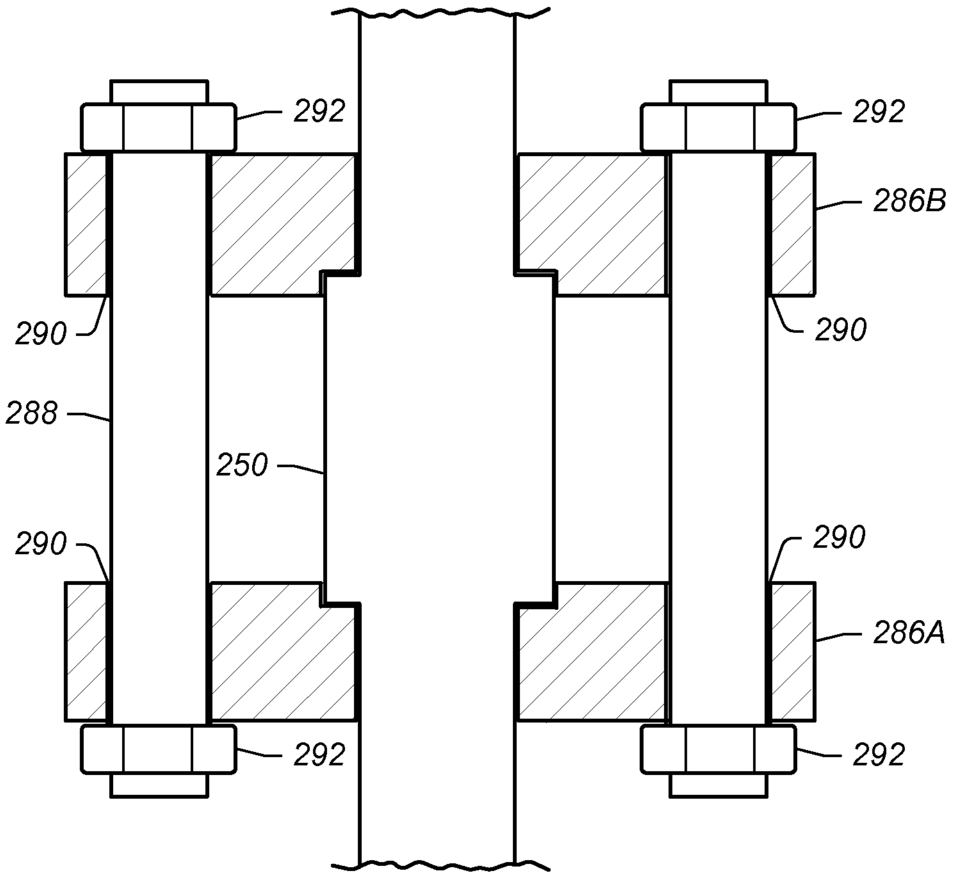
FIG. 10 depicts an embodiment of a clamp assembly that may be used to compact mechanically a fitting for joining insulated conductors.
Figure 11:
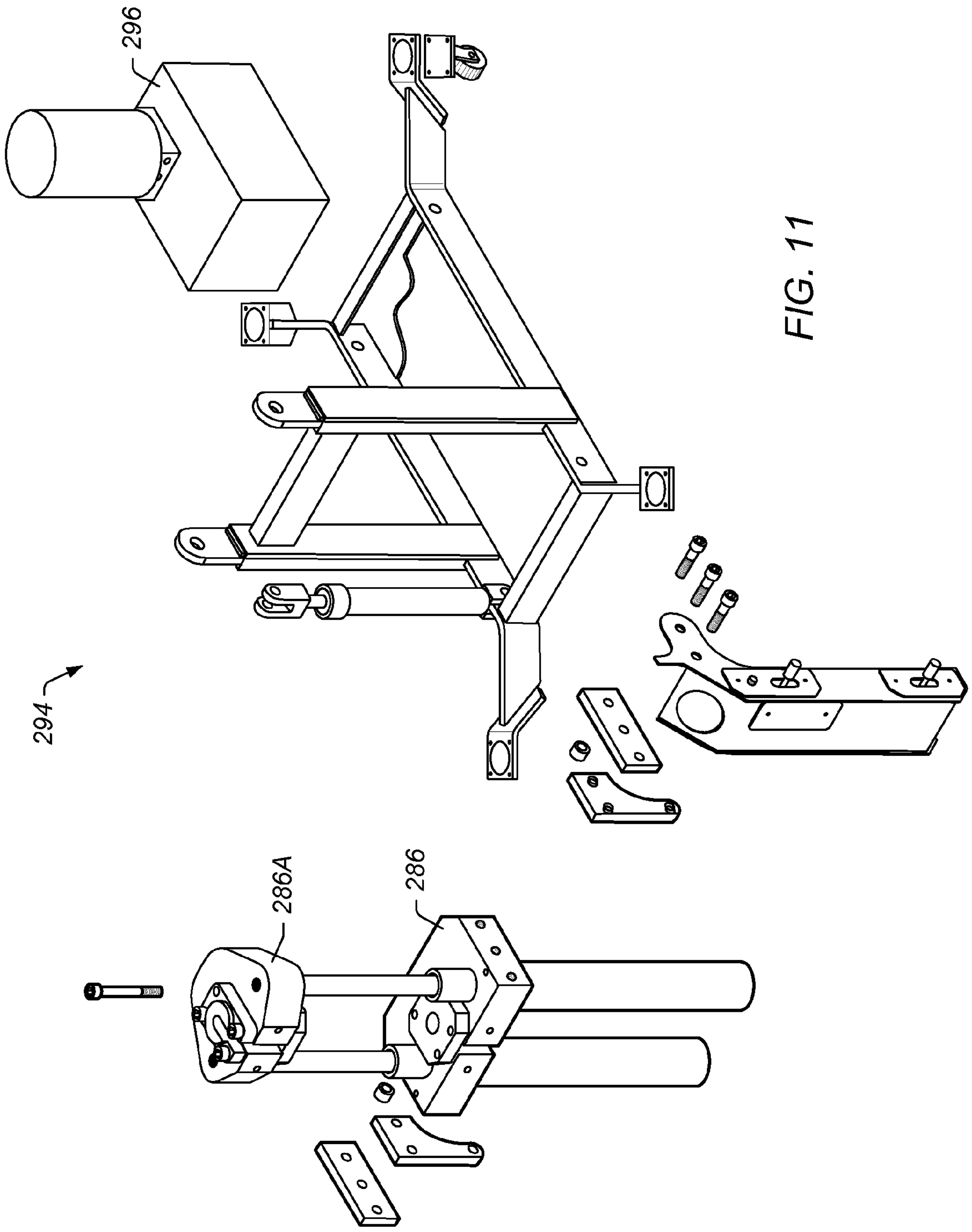
FIG. 11 depicts an exploded view of an embodiment of a hydraulic compaction machine.
Figure 12:
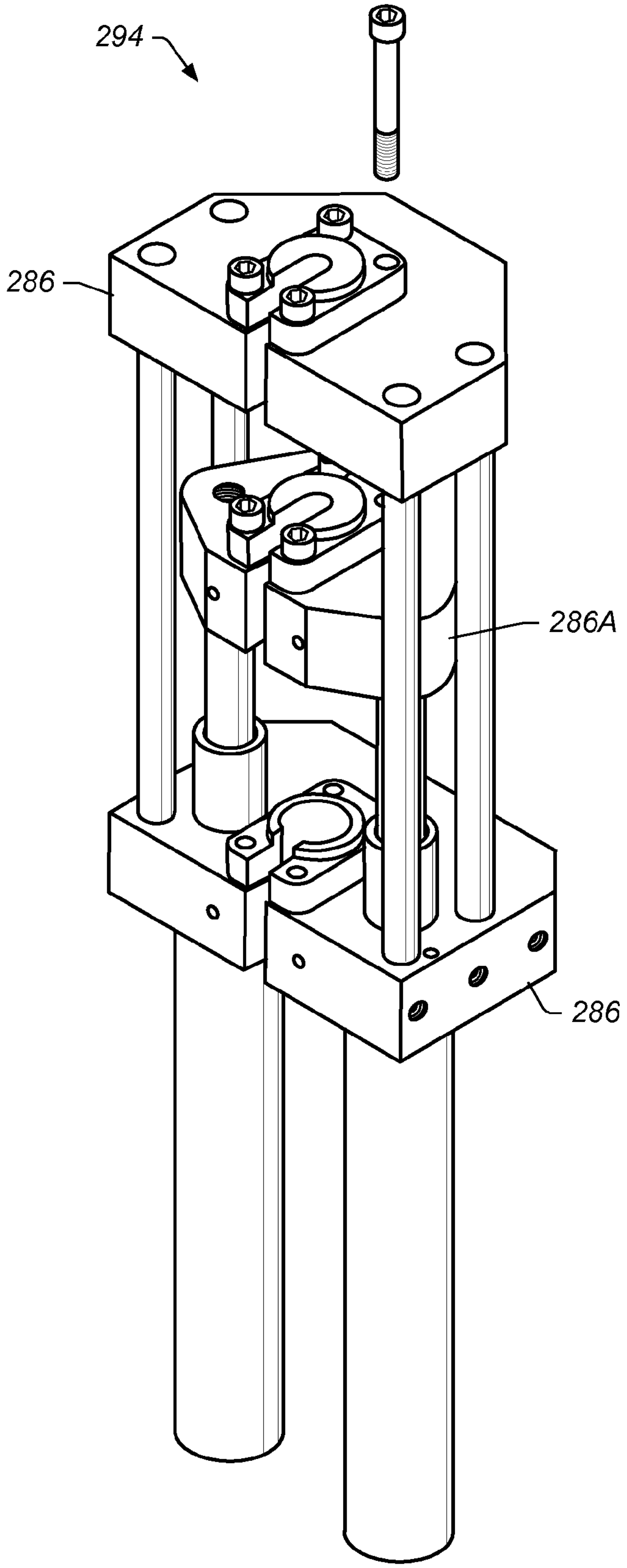
FIG. 12 depicts a representation of an embodiment of an assembled hydraulic compaction machine.

As shown in FIGS. 5 and 7, in certain embodiments, electrically insulating material 256 is compacted during the assembly process. The force to press the housings 254A, 254B toward each other may put a pressure on electrically insulating material 256 of, for example, at least 25,000 pounds per square inch up to 55,000 pounds per square inch in order to provide acceptable compaction of the insulating material. The tapered shapes of the interior volumes of housings 254A, 254B and the make-up of electrically insulating material 256 may enhance compaction of the electrically insulating material during the assembly process to the point where the dielectric characteristics of the electrically insulating material are, to the extent practical, comparable to that within insulated conductors 212A, 212B. Methods and devices to facilitate compaction include, but are not limited to, mechanical methods (such as shown in FIG. 10), pneumatic, hydraulic (such as shown in FIGS. 11 and 12), swaged, or combinations thereof.

The combination of moving the pieces together with force and the housings having the tapered interior volumes compacts electrically insulating material 256 using both axial and radial compression. Both axial and radial compressing electrically insulating material 256 provides more uniform compaction of the electrically insulating material. In some embodiments, vibration and/or tamping of electrically insulating material 256 may also be used to consolidate the electrically insulating material. Vibration (and/or tamping) may be applied either at the same time as application of force to push the housings 254A, 254B together, or vibration (and/or tamping) may be alternated with application of such force. Vibration and/or tamping may reduce bridging of particles in electrically insulating material 256.

In the embodiment depicted in FIG. 7, electrically insulating material 256 inside housings 254A, 254B is compressed mechanically by tightening nuts 266 against ferrules 268 coupled to jackets 218A, 218B. The mechanical method compacts the interior volumes of housings 254A, 254B because of the tapered shape of the interior volumes. Ferrules 268 may be copper or other soft metal ferrules. Nuts 266 may be stainless steel or other hard metal nut that is movable on jackets 218A, 218B. Nuts 266 may engage threads on housings 254A, 254B to couple to the housings. As nuts 266 are threaded onto housings 254A, 254B, nuts 266 and ferrules 268 work to compress the interior volumes of the housings. In some embodiments, nuts 266 and ferrules 268 may work to move housings 254A, 254B further onto sleeve 252 (using the threaded coupling between the pieces) and compact the interior volume of the sleeve. In some embodiments, housings 254A, 254B and sleeve 252 are coupled together using the threaded coupling before the nut and ferrule are swaged down on the second portion. As the interior volumes inside housings 254A, 254B are compressed, the interior volume inside sleeve 252 may also be compressed. In some embodiments, nuts 266 and ferrules 268 may act to couple housings 254A, 254B to insulated conductors 212A, 212B.

Figure 8A:
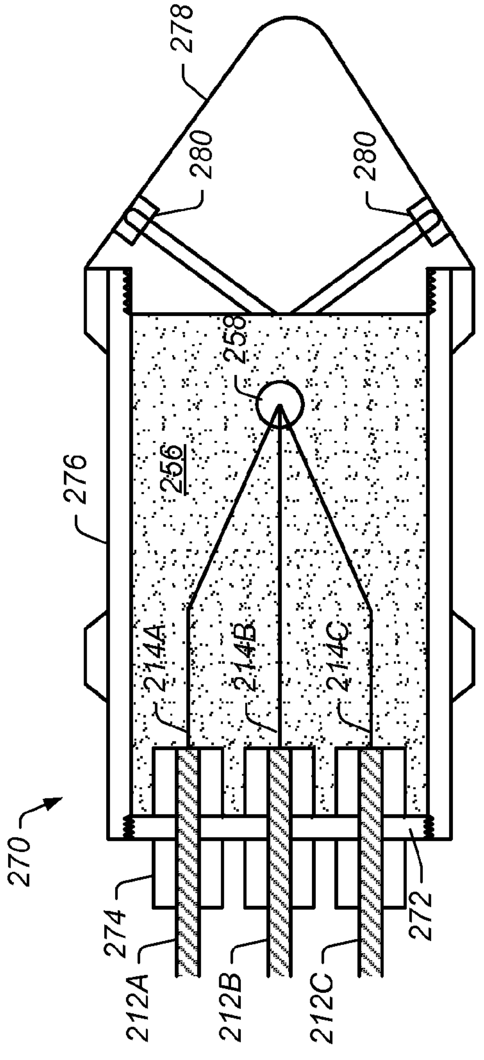
FIG. 8A depicts a side view of a cross-sectional representation of an embodiment of a threaded fitting for coupling three insulated conductors.
Figure 8B:
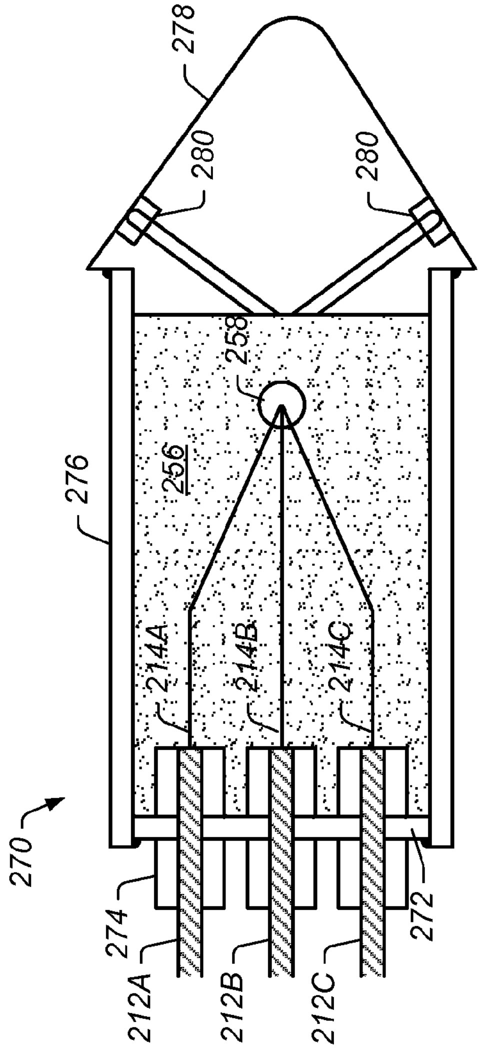
FIG. 8B depicts a side view of a cross-sectional representation of an embodiment of a welded fitting for coupling three insulated conductors.

In certain embodiments, multiple insulated conductors are spliced together in an end fitting. For example, three insulated conductors may be spliced together in an end fitting to couple electrically the insulated conductors in a 3-phase wye configuration. FIG. 8A depicts a side view of a cross-sectional representation of an embodiment of threaded fitting 270 for coupling three insulated conductors 212A, 212B, 212C. FIG. 8B depicts a side view of a cross-sectional representation of an embodiment of welded fitting 270 for coupling three insulated conductors 212A, 212B, 212C. As shown in FIGS. 8A and 8B, insulated conductors 212A, 212B, 212C may be coupled to fitting 270 through end cap 272. End cap 272 may include three strain relief fittings 274 through which insulated conductors 212A, 212B, 212C pass.

Cores 214A, 214B, 214C of the insulated conductors may be coupled together at coupling 258. Coupling 258 may be, for example, a braze (such as a silver braze or copper braze), a welded joint, or a crimped joint. Coupling cores 214A, 214B, 214C at coupling 258 electrically join the three insulated conductors for use in a 3-phase wye configuration.

As shown in FIG. 8A, end cap 272 may be coupled to main body 276 of fitting 270 using threads. Threading of end cap 272 and main body 276 may allow the end cap to compact electrically insulating material 256 inside the main body. At the end of main body 276 opposite of end cap 272 is cover 278. Cover 278 may also be attached to main body 276 by threads. In certain embodiments, compaction of electrically insulating material 256 in fitting 270 is enhanced through tightening of cover 278 into main body 276, by crimping of the main body after attachment of the cover, or a combination of these methods.

As shown in FIG. 8B, end cap 272 may be coupled to main body 276 of fitting 270 using welding, brazing, or crimping. End cap 272 may be pushed or pressed into main body 276 to compact electrically insulating material 256 inside the main body. Cover 278 may also be attached to main body 276 by welding, brazing, or crimping. Cover 278 may be pushed or pressed into main body 276 to compact electrically insulating material 256 inside the main body. Crimping of the main body after attachment of the cover may further enhance compaction of electrically insulating material 256 in fitting 270.

In some embodiments, as shown in FIGS. 8A and 8B, plugs 280 close openings or holes in cover 278. For example, the plugs may be threaded, welded, or brazed into openings in cover 278. The openings in cover 278 may allow electrically insulating material 256 to be provided inside fitting 270 when cover 278 and end cap 272 are coupled to main body 276. The openings in cover 278 may be plugged or covered after electrically insulating material 256 is provided inside fitting 270. In some embodiments, openings are located on main body 276 of fitting 270. Openings on main body 276 may be plugged with plugs 280 or other plugs.

Figure 9:
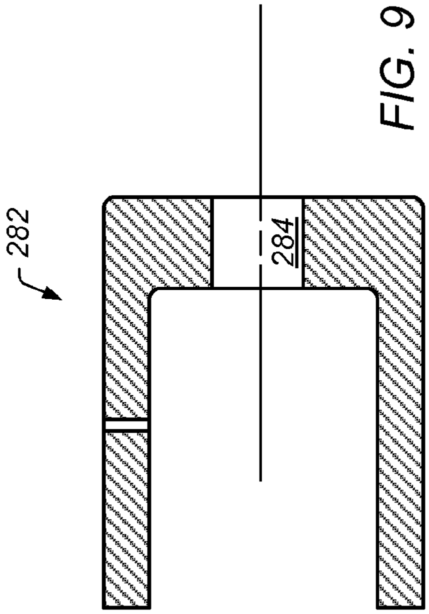
FIG. 9 depicts an embodiment of a torque tool.

In some embodiments, cover 278 includes one or more pins. In some embodiments, the pins are or are part of plugs 280. The pins may engage a torque tool that turns cover 278 and tightens the cover on main body 276. An example of torque tool 282 that may engage the pins is depicted in FIG. 9. Torque tool 282 may have an inside diameter that substantially matches the outside diameter of cover 278 (depicted in FIG. 8A). As shown in FIG. 9, torque tool 282 may have slots or other depressions that are shaped to engage the pins on cover 278. Torque tool 282 may include recess 284. Recess 284 may be a square drive recess or other shaped recess that allows operation (turning) of the torque tool.

FIG. 10 depicts an embodiment of clamp assemblies 286A,B that may be used to mechanically compact fitting 250. Clamp assemblies 286A,B may be shaped to secure fitting 250 in place at the shoulders of housings 254A, 254B. Threaded rods 288 may pass through holes 290 of clamp assemblies 286A,B. Nuts 292, along with washers, on each of threaded rods 288 may be used to apply force on the outside faces of each clamp assembly and bring the clamp assemblies together such that compressive forces are applied to housings 254A, 254B of fitting 250. These compressive forces compact electrically insulating material inside fitting 250.

In some embodiments, clamp assemblies 286 are used in hydraulic, pneumatic, or other compaction methods. FIG. 11 depicts an exploded view of an embodiment of hydraulic compaction machine 294. FIG. 12 depicts a representation of an embodiment of assembled hydraulic compaction machine 294. As shown in FIGS. 11 and 12, clamp assemblies 286 may be used to secure fitting 250 (depicted, for example, in FIG. 5) in place with insulated conductors coupled to the fitting. At least one clamp assembly (for example, clamp assembly 286A) may be moveable together to compact the fitting in the axial direction. Power unit 296, shown in FIG. 11, may be used to power compaction machine 294.

Figure 13:
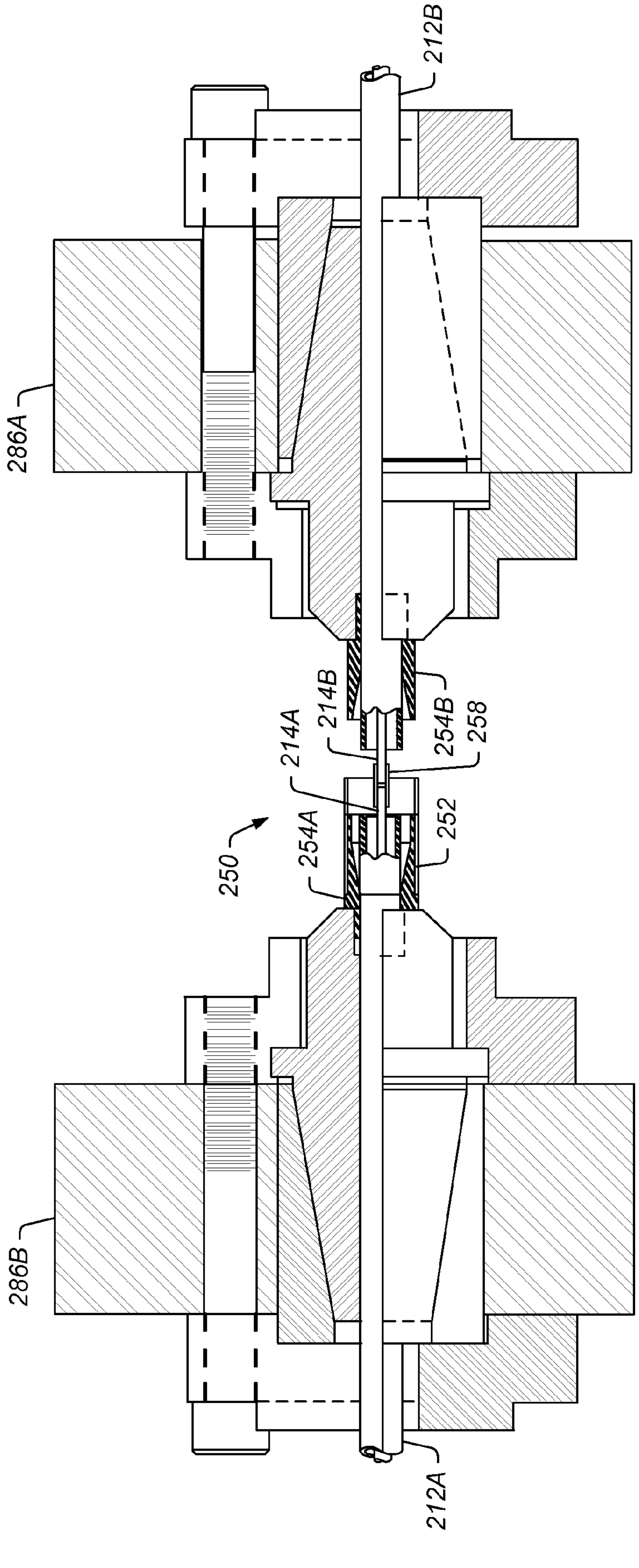
FIG. 13 depicts an embodiment of a fitting and insulated conductors secured in clamp assemblies before compaction of the fitting and insulated conductors.

FIG. 13 depicts an embodiment of fitting 250 and insulated conductors 212A, 212B secured in clamp assembly 286A and clamp assembly 286B before compaction of the fitting and insulated conductors. As shown in FIG. 13, the cores of insulated conductors 212A, 212B are coupled using coupling 258 at or near the center of sleeve 252. Sleeve 252 is slid over housing 254A, which is coupled to insulated conductor 212A. Sleeve 252 and housing 254A are secured in fixed (non-moving) clamp assembly 286B. Insulated conductor 212B passes through housing 254B and movable clamp assembly 286A. Insulated conductor 212B may be secured by another clamp assembly fixed relative to clamp assembly 286B (not shown). Clamp assembly 286A may be moved towards clamp assembly 286B to couple housing 254B to sleeve 252 and compact electrically insulating material inside the housings and the sleeve. Interfaces between insulated conductor 212A and housing 254A, between housing 254A and sleeve 252, between sleeve 252 and housing 254B, and between housing 254B and insulated conductor 212B may then be coupled by welding, brazing, or other techniques known in the art.

Figure 14:
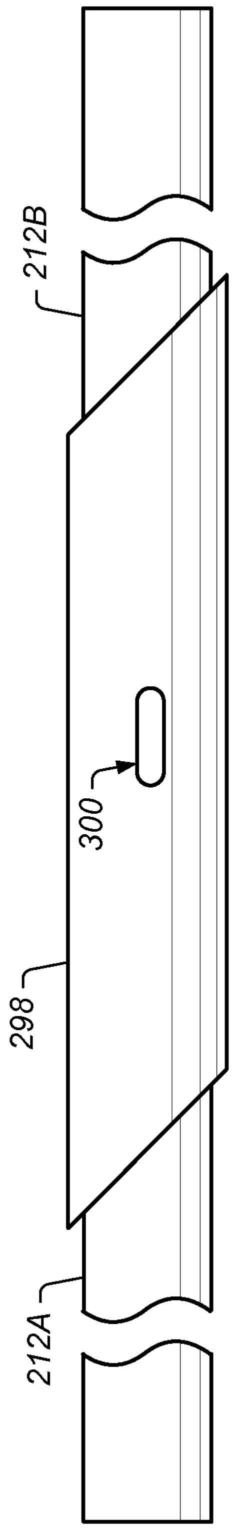
FIG. 14 depicts a side view representation of yet another embodiment of a fitting for joining insulated conductors.

FIG. 14 depicts a side view representation of an embodiment of fitting 298 for joining insulated conductors. Fitting 298 may be a cylinder or sleeve that has sufficient clearance between the inside diameter of the sleeve and the outside diameters of insulated conductors 212A, 212B such that the sleeve fits over the ends of the insulated conductors. The cores of insulated conductors 212A, 212B may be joined inside fitting 298. The jackets and insulation of insulated conductors 212A, 212B may be cut back or stripped to expose desired lengths of the cores before joining the cores. Fitting 298 may be centered between the end portions of insulated conductors 212A, 212B.

Fitting 298 may be used to couple insulated conductor 212A to insulated conductor 212B while maintaining the mechanical and electrical integrity of the jackets, insulation, and cores of the insulated conductors. Fitting 298 may be used to couple heat producing insulated conductors with non-heat producing insulated conductors, to couple heat producing insulated conductors with other heat producing insulated conductors, or to couple non-heat producing insulated conductors with other non-heat producing insulated conductors. In some embodiments, more than one fitting 298 is used in to couple multiple heat producing and non-heat producing insulated conductors to produce a long insulated conductor.

Fitting 298 may be used to couple insulated conductors with different diameters. For example, the insulated conductors may have different core diameters, different jacket diameters, or combinations of different diameters. Fitting 298 may also be used to couple insulated conductors with different metallurgies, different types of insulation, or a combination thereof.

In certain embodiments, fitting 298 has at least one angled end. For example, the ends of fitting 298 may be angled relative to the longitudinal axis of the fitting. The angle may be, for example, about 45° or between 30° and 60°. Thus, the ends of fitting 298 may have substantially elliptical cross-sections. The substantially elliptical cross-sections of the ends of fitting 298 provide a larger area for welding or brazing of the fitting to insulated conductors 212A, 212B. The larger coupling area increases the strength of spliced insulated conductors. In the embodiment shown in FIG. 14, the angled ends of fitting 298 give the fitting a substantially parallelogram shape.

The angled ends of fitting 298 provide higher tensile strength and higher bending strength for the fitting than if the fitting had straight ends by distributing loads along the fitting. Fitting 298 may be oriented so that when insulated conductors 212A, 212B and the fitting are spooled (for example, on a coiled tubing installation), the angled ends act as a transition in stiffness from the fitting body to the insulated conductors. This transition reduces the likelihood of the insulated conductors to kink or crimp at the end of the fitting body.

As shown in FIG. 14, fitting 298 includes opening 300. Opening 300 allows electrically insulating material (such as electrically insulating material 256, depicted in FIG. 5) to be provided (filled) inside fitting 298. Opening 300 may be a slot or other longitudinal opening extending along part of the length of fitting 298. In certain embodiments, opening 300 extends substantially the entire gap between the ends of insulated conductors 212A, 212B inside fitting 298. Opening 300 allows substantially the entire volume (area) between insulated conductors 212A, 212B, and around any welded or spliced joints between the insulated conductors, to be filled with electrically insulating material without the insulating material having to be moved axially toward the ends of the volume between the insulated conductors. The width of opening 300 allows electrically insulating material to be forced into the opening and packed more tightly inside fitting 298, thus, reducing the amount of void space inside the fitting. Electrically insulating material may be forced through the slot into the volume between insulated conductors 212A, 212B, for example, with a tool with the dimensions of the slot. The tool may be forced into the slot to compact the insulating material. Then, additional insulating material may be added and the compaction is repeated. In some embodiments, the electrically insulating material may be further compacted inside fitting 298 using vibration, tamping, or other techniques. Further compacting the electrically insulating material may more uniformly distribute the electrically insulating material inside fitting 298.

Figure 15:
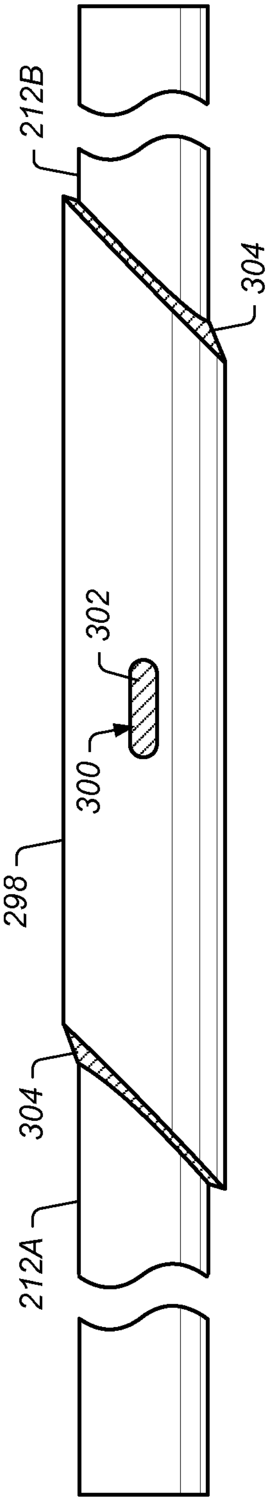
FIG. 15 depicts a side view representation of an embodiment of a fitting with an opening covered with an insert.

After filling electrically insulating material inside fitting 298 and, in some embodiment, compaction of the electrically insulating material, opening 300 may be closed. For example, an insert or other covering may be placed over the opening and secured in place. FIG. 15 depicts a side view representation of an embodiment of fitting 298 with opening 300 covered with insert 302. Insert 302 may be welded or brazed to fitting 298 to close opening 300. In some embodiments, insert 302 is ground or polished so that the insert if flush on the surface of fitting 298. Also depicted in FIG. 15, welds or brazes 304 may be used to secure fitting 298 to insulated conductors 212A, 212B.

After opening 300 is closed, fitting 298 may be compacted mechanically, hydraulically, pneumatically, or using swaging methods to compact further the electrically insulating material inside the fitting. Further compaction of the electrically insulating material reduces void volume inside fitting 298 and reduces the leakage currents through the fitting and increases the operating range of the fitting (for example, the maximum operating voltages or temperatures of the fitting).

Figure 16:
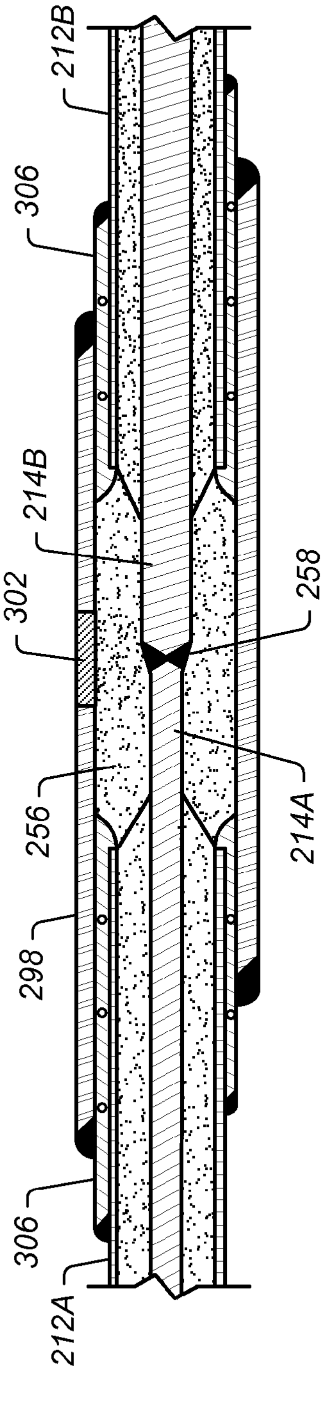
FIG. 16 depicts an embodiment of a fitting with electric field reducing features between the jackets of the insulated conductors and the sleeves and at the ends of the insulated conductors.

In certain embodiments, fitting 298 includes certain features that may further reduce electric field intensities inside the fitting. For example, fitting 298 or coupling 258 of the cores of the insulated conductors inside the fitting may include tapered edges, rounded edges, or other smoothed out features to reduce electric field intensities. FIG. 16 depicts an embodiment of fitting 298 with electric field reducing features at coupling 258 between insulated conductors 212A, 212B. As shown in FIG. 16, coupling 258 is a welded joint with a smoothed out or rounded profile to reduce electric field intensity inside fitting 298. In addition, fitting 298 has a tapered interior volume to increase the volume of electrically insulating material inside the fitting. Having the tapered and larger volume may reduce electric field intensities inside fitting 298.

Figure 17:
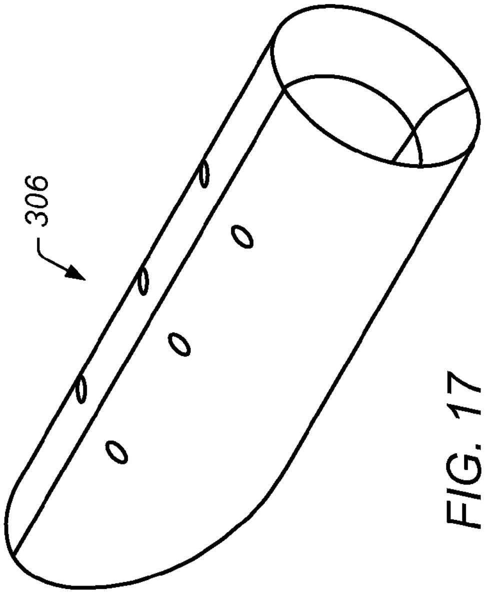
FIG. 17 depicts an embodiment of an electric field stress reducer.

In some embodiments, electric field stress reducers may be located inside fitting 298 to decrease the electric field intensity. FIG. 17 depicts an embodiment of electric field stress reducer 306. Reducer 306 may be located in the interior volume of fitting 298 (shown in FIG. 16). Reducer 306 may be a split ring or other separable piece so that the reducer can be fitted around cores 214A, 214B of insulated conductors 212A, 212B after they are joined (shown in FIG. 16).

Figure 18:
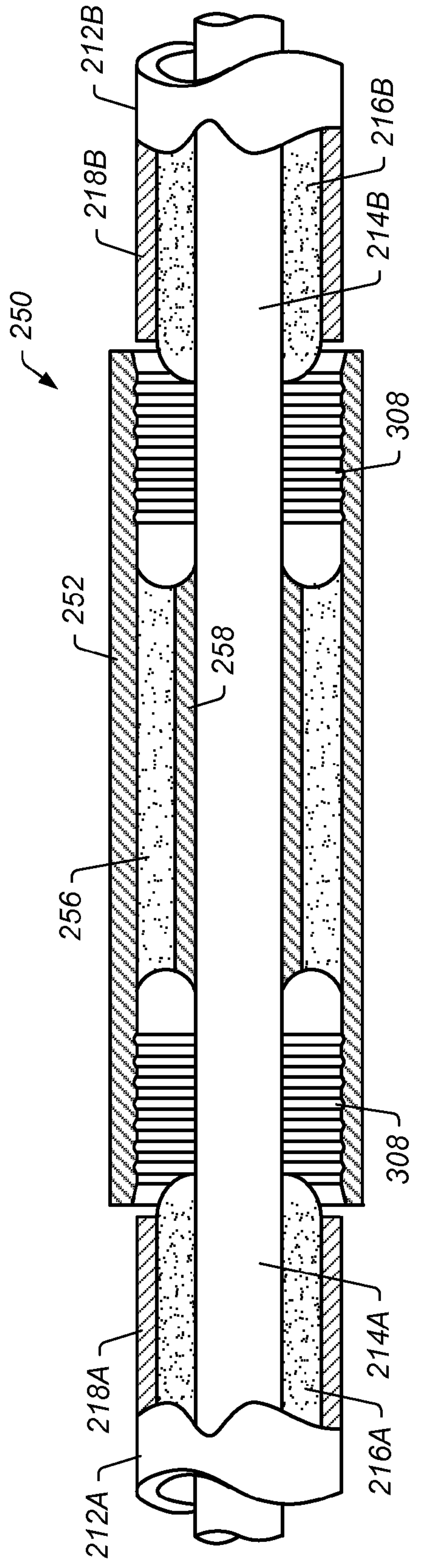
FIG. 18 depicts a cross-sectional representation of a fitting as insulated conductors are being moved into the fitting.
Figure 19:
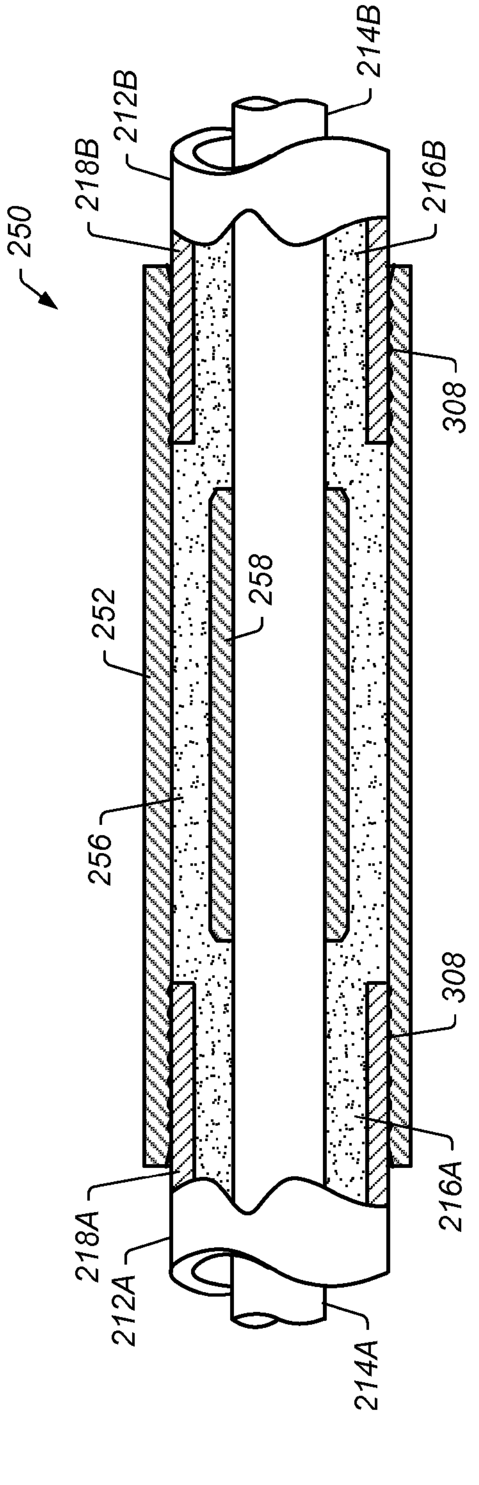
FIG. 19 depicts a cross-sectional representation of a fitting with insulated conductors joined inside the fitting.

FIGS. 18 and 19 depict cross-sectional representations of another embodiment of fitting 250 used for joining insulated conductors. FIG. 18 depicts a cross-sectional representation of fitting 250 as insulated conductors 212A, 212B are being moved into the fitting. FIG. 19 depicts a cross-sectional representation of fitting 250 with insulated conductors 212A, 212B joined inside the fitting. In certain embodiments, fitting 250 includes sleeve 252 and coupling 258.

Fitting 250 may be used to couple (splice) insulated conductor 212A to insulated conductor 212B while maintaining the mechanical and electrical integrity of the jackets (sheaths), insulation, and cores (conductors) of the insulated conductors. Fitting 250 may be used to couple heat producing insulated conductors with non-heat producing insulated conductors, to couple heat producing insulated conductors with other heat producing insulated conductors, or to couple non-heat producing insulated conductors with other non-heat producing insulated conductors. In some embodiments, more than one fitting 250 is used to couple multiple heat producing and non-heat producing insulated conductors to provide a long insulated conductor.

Fitting 250 may be used to couple insulated conductors with different diameters. For example, the insulated conductors may have different core (conductor) diameters, different jacket (sheath) diameters, or combinations of different diameters. Fitting 250 may also be used to couple insulated conductors with different metallurgies, different types of insulation, or combinations thereof.

Coupling 258 is used to join and electrically couple cores 214A, 214B of insulated conductors 212A, 212B inside fitting 250. Coupling 258 may be made of copper or another suitable electrical conductor. In certain embodiments, cores 214A, 214B are press fit or pushed into coupling 258. In some embodiments, coupling 258 is heated to enable cores 214A, 214B to be slid into the coupling. In some embodiments, core 214A is made of different material than core 214B. For example, core 214A may be copper while core 214B is stainless steel, carbon steel, or Alloy 180. In such embodiments, special methods may have to be used to weld the cores together. For example, the tensile strength properties and/or yield strength properties of the cores may have to be matched closely such that the coupling between the cores does not degrade over time or with use.

In some embodiments, coupling 258 includes one or more grooves on the inside of the coupling. The grooves may inhibit particles from entering or exiting the coupling after the cores are joined in the coupling. In some embodiments, coupling 258 has a tapered inner diameter (for example, tighter inside diameter towards the center of the coupling). The tapered inner diameter may provide a better press fit between coupling 258 and cores 214A, 214B.

In certain embodiments, electrically insulating material 256 is located inside sleeve 252. In some embodiments, electrically insulating material 256 is magnesium oxide or a mixture of magnesium oxide and boron nitride (80% magnesium oxide and 20% boron nitride by weight). Electrically insulating material 256 may include magnesium oxide, talc, ceramic powders (for example, boron nitride), a mixture of magnesium oxide and another electrical insulator (for example, up to about 50% by weight boron nitride), ceramic cement, mixtures of ceramic powders with certain non-ceramic materials (such as tungsten sulfide ($WS_2$)), or mixtures thereof. For example, magnesium oxide may be mixed with boron nitride or another electrical insulator to improve the ability of the electrically insulating material to flow, to improve the dielectric characteristics of the electrically insulating material, or to improve the flexibility of the fitting. In some embodiments, electrically insulating material 256 is material similar to electrical insulation used inside of at least one of insulated conductors 212A, 212B. Electrically insulating material 256 may have substantially similar dielectric characteristics to electrical insulation used inside of at least one of insulated conductors 212A, 212B.

In certain embodiments, the interior volumes of sleeve 252 is substantially filled with electrically insulating material 256. In certain embodiments, "substantially filled" refers to entirely or almost entirely filling the volume or volumes with electrically insulating material with substantially no macroscopic voids in the volume or volumes. For example, substantially filled may refer to filling almost the entire volume with electrically insulating material that has some porosity because of microscopic voids (for example, up to about 40% porosity).

In some embodiments, sleeve 252 has one or more grooves 308. Grooves 308 may inhibit electrically insulating material 256 from moving out of sleeve 252 (for example, the grooves trap the electrically insulating material in the sleeve).

In certain embodiments, electrically insulating material 256 has concave shaped end portions at or near the edges of coupling 258, as shown in FIG. 18. The concave shapes of electrically insulating material 256 may enhance coupling with electrical insulators 216A, 216B of insulated conductors 212A, 212B. In some embodiments, electrical insulators 216A, 216B have convex shaped (or tapered) end portions to enhance coupling with electrically insulating material 256. The end portions of electrically insulating material 256 and electrical insulators 216A, 216B may comingle or mix under the pressure applied during joining of the insulated conductors. The comingling or mixing of the insulation materials may enhance the coupling between the insulated conductors.

In certain embodiments, insulated conductors 212A, 212B are joined with fitting 250 by moving (pushing) the insulated conductors together towards the center of the fitting. Cores 214A, 214B are brought together inside coupling 258 with the movement of insulated conductors 212A, 212B. After insulated conductors 212A, 212B are moved together into fitting 250, the fitting and end portions of the insulated conductors inside the fitting may be compacted or pressed to secure the insulated conductors in the fitting and compress electrically insulating material 256. Clamp assemblies or other similar devices may be used to bring together insulated conductors 212A, 212B and fitting 250. In certain embodiments, the force to compress electrically insulating material 256 is, for example, at least 25,000 pounds per square inch up to 55,000 pounds per square inch in order to provide acceptable compaction of the insulating material. The compaction of electrically insulating material 256 during the assembly process may provide dielectric characteristics for the electrically insulating material that are, to the extent practical, comparable to that within insulated conductors 212A, 212B. Methods and devices to facilitate compaction include, but are not limited to, mechanical methods, pneumatic, hydraulic, swaged, or combinations thereof.

In some embodiments, end portions of sleeve 252 are coupled (welded or brazed) to jackets 218A, 218B of insulated conductors 212A, 212B. In some embodiments, a support sleeve and/or strain reliefs are placed over fitting 250 to provide additional strength to the fitting.

The fittings depicted herein (such as, but not limited to, fitting 250, depicted in FIGS. 5, 7, 18, and 19, fitting 270, depicted in FIG. 8, and fitting 298, depicted in FIGS. 14,15, and 16) may form robust electrical and mechanical connections between insulated conductors. For example, fittings depicted herein may be suitable for extended operation at voltages above 1000 volts, above 1500 volts, or above 2000 volts and temperatures of at least about 650° C., at least about 700° C., at least about 800° C.

In certain embodiments, the fittings depicted herein couple insulated conductors used for heating (for example, insulated conductors located in a hydrocarbon containing layer) to insulated conductors not used for heating (for example, insulated conductors used in overburden sections of the formation). The heating insulated conductor may have a smaller core and different material core than the non-heating insulated conductor. For example, the core of the heating insulated conductor may be a copper-nickel alloy, stainless steel, or carbon steel while the core of the non-heating insulated conductor may be copper. Because of the difference in sizes and electrical properties of materials of the cores, however, the electrical insulation in the sections may have sufficiently different thicknesses that cannot be compensated in a single fitting joining the insulated conductors. Thus, in some embodiments, a short section of intermediate heating insulated conductor may be used in between the heating insulated conductor and the non-heating insulated conductor.

The intermediate heating insulated conductor may have a core diameter that tapers from the core diameter of the non-heating insulated conductor to the core diameter of the heating insulated conductor while using core material similar to the non-heating insulated conductor. For example, the intermediate heating insulated conductor may be copper with a core diameter that tapers to the same diameter as the heating insulated conductor. Thus, the thickness of the electrical insulation at the fitting coupling the intermediate insulated conductor and the heating insulated conductor is similar to the thickness of the electrical insulation in the heating insulated conductor. Having the same thickness allows the insulated conductors to be easily joined in the fitting. The intermediate heating insulated conductor may provide some voltage drop and some heating losses because of the smaller core diameter, however, the intermediate heating insulated conductor may be relatively short in length such that these losses are minimal.

In certain embodiments, a fitting for joining insulated conductors is compacted or compressed to improve the electrical insulation properties (dielectric characteristics) of electrically insulating material inside the fitting. For example, compaction of electrically insulating material inside the fitting may increase the uniformity of the electrically insulating material and/or remove voids or other interfaces in the electrically insulating material.

In some embodiments, blocks of electrically insulating material (for example, magnesium oxide) are compacted in the fitting. In some embodiments, electrically insulating material powder is compacted in the fitting. In some embodiments, combinations of powder and/or blocks of electrically insulating material are used in the fitting. In addition, combinations of different types of electrically insulating material may be used (for example, a combination of magnesium oxide and boron nitride).

A fitting used to join insulated conductors may be compacted mechanically, pneumatically, and/or hydraulically. Compaction of the fitting may improve the dielectric characteristics of the electrically insulating material such that the electrically insulating material has dielectric characteristics that are similar to the dielectric characteristics of electrical insulation in the insulated conductors. In some embodiments, compacted electrically insulating material in the fitting may have dielectric characteristics that are better than the dielectric characteristics of electrical insulation in the insulated conductors.

Figure 20:
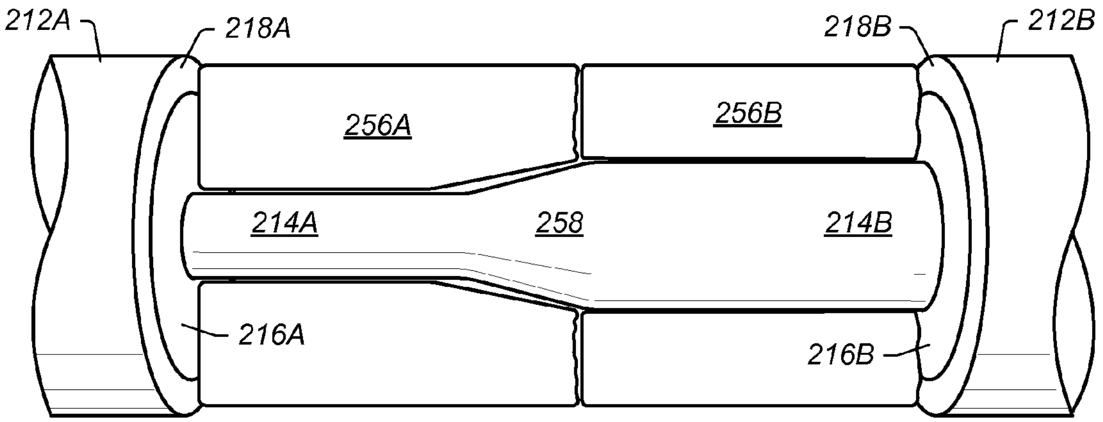
FIG. 20 depicts an embodiment of blocks of electrically insulating material in position around cores of joined insulated conductors.

FIG. 20 depicts an embodiment of blocks of electrically insulating material in position around cores of joined insulated conductors. Core 214A of insulated conductor 212A is coupled to core 214B of insulated conductor 212B at coupling 258. Cores 214A, 214B are exposed by removing portions of electrical insulators 216A, 216B and jackets 218A, 218B surrounding the cores at the ends of insulated conductors 212A, 212B.

In some embodiments, cores 214A, 214B have different diameters. In such embodiments, coupling 258 may taper from the diameter of core 214A to the diameter of core 214B. In some embodiments, cores 214A, 214B include different materials. Coupling 258 may compensate for the different materials in the cores. For example, coupling 258 may include a blend or mixture of materials in the cores.

In certain embodiments, one or more blocks of electrically insulating material 256 are placed around the exposed portions of cores 214A, 214B, as shown in FIG. 20. Blocks of electrically insulating material 256 may be made of, for example, magnesium oxide or a mixture of magnesium oxide and another electrical insulator. The blocks of electrically insulating material 256 may be hard or soft blocks of material depending on the type of compaction desired. A desired number of blocks of electrically insulating material 256 may be placed around the exposed portions of cores 214A, 214B such that the blocks substantially completely surround the exposed core portions. The number of blocks of electrically insulating material 256 may vary based on, for example, the length and/or diameter of the exposed core portions and/or the size of the blocks of electrically insulating material. In certain embodiments, four blocks of electrically insulating material 256 are used to surround the exposed portions of the cores.

Figure 21:
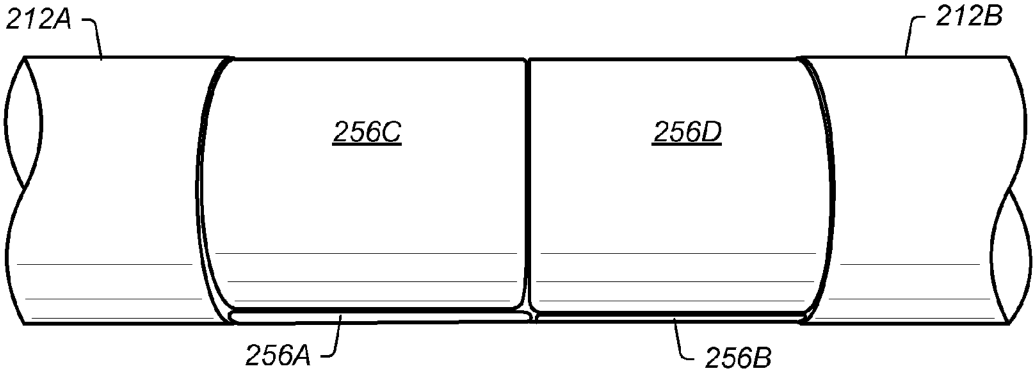
FIG. 21 depicts an embodiment of four blocks of electrically insulating material in position surrounding the cores of joined insulated conductors.

FIG. 20 depicts two blocks of electrically insulating material 256A, 256B surrounding one half (a semi-circle) of the exposed portions of cores 214A, 214B. The depicted blocks of electrically insulating material 256 are semi-circular blocks that fit snugly around the outside diameters of the exposed core portions. In the embodiment depicted in FIG. 20, two additional blocks of electrically insulating material 256 would be placed on the exposed core portions to surround the exposed core portions with electrically insulating material. FIG. 21 depicts an embodiment of four blocks of electrically insulating material 256A, 256B, 256C, 256D in position surrounding the cores of joined insulated conductors 212A, 212B.

In certain embodiments, blocks of electrically insulating material 256 have inside diameters sized and/or shaped to match the outside diameters of the exposed portions of cores 214A, 214B. Matching the inside diameters of the blocks with the outside diameters of the exposed core portions may provide a snug fit between the blocks and the exposed core portions and inhibit or reduce gap formation during compaction of the blocks.

In some embodiments, one or more blocks of electrically insulating material 256 have a tapered inside diameter to match a tapered outer diameter of coupling 258 and/or the exposed portions of cores 214A, 214B, as shown in FIG. 20. The inside diameter of the blocks of electrically insulating material 256 may be formed by sanding or grinding the inner diameter of the blocks to the desired tapered shape.

Figure 22:
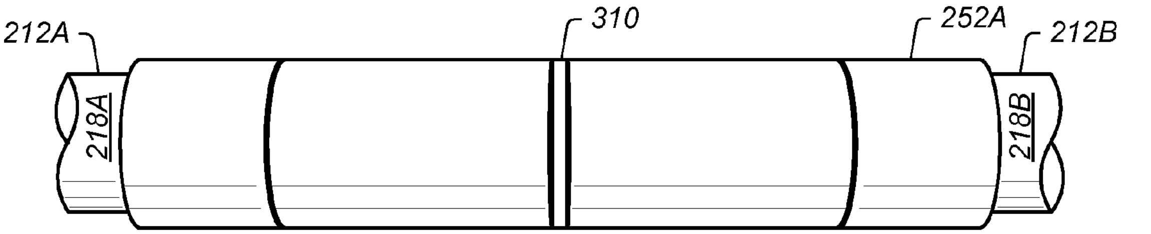
FIG. 22 depicts an embodiment of an inner sleeve placed over joined insulated conductors.

After blocks of electrically insulating material 256 have been placed around the exposed portions of the cores (as shown in FIG. 21), a sleeve or other cylindrical covering is placed over the joined insulated conductors to substantially cover the blocks and at least a portion of each of the insulated conductors. FIG. 22 depicts an embodiment of inner sleeve 252A placed over joined insulated conductors 212A, 212B. Inner sleeve 252A may be a material the same as or similar to material used for jackets 218A, 218B of insulated conductors 212A, 212B. For example, inner sleeve 252A and jackets 218A, 218B may be 304 stainless steel. Inner sleeve 252A and jackets 218A, 218B are typically made of materials that can be welded together.

Inner sleeve 252A has a tight or snug fit over jackets 218A, 218B of insulated conductors 212A, 212B. In certain embodiments, inner sleeve 252A includes alignment ridge 310. Alignment ridge 310 is located at or near a center of the coupling between insulated conductors 212A, 212B.

Figure 23:
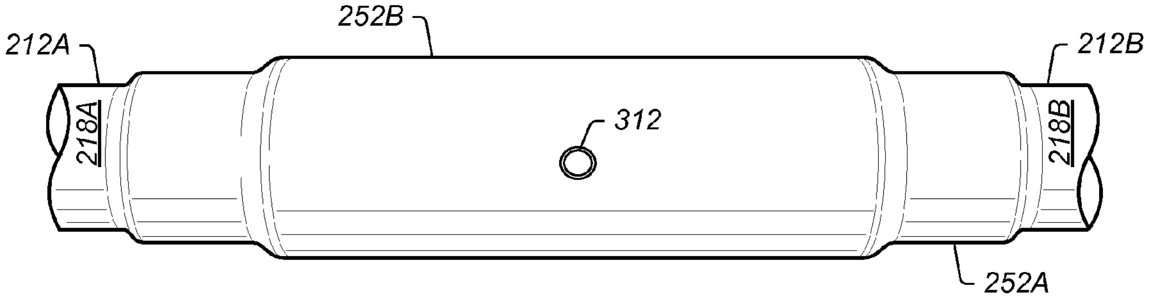
FIG. 23 depicts an embodiment of an outer sleeve placed over an inner sleeve and joined insulated conductors.

After the inner sleeve has been placed around the blocks of electrically insulating material (as shown in FIG. 22), an outer sleeve or other cylindrical covering is placed over the inner sleeve. FIG. 23 depicts an embodiment of outer sleeve 252B placed over inner sleeve 252A and joined insulated conductors 212A, 212B. In certain embodiments, outer sleeve 252B has a shorter length than inner sleeve 252A. In certain embodiments, outer sleeve 252B has opening 312. Opening 312 may be located at or near a center of outer sleeve 252B. Opening 312 may be aligned with alignment ridge 310 on inner sleeve 252A (the alignment ridge is viewed through the opening). In some embodiments, outer sleeve 252B is made of two or more pieces. For example, the outer sleeve may be two-pieces put together in a clam-shell configuration. The pieces may be welded or otherwise coupled to form the outer sleeve.

Outer sleeve 252B may be a material the same as or similar to material used for inner sleeve 252A and jackets 218A, 218B (for example, 304 stainless steel). Outer sleeve 252B may have a tight or snug fit over inner sleeve 252A. After outer sleeve 252B and inner sleeve 252A are placed over jackets 218A, 218B of insulated conductors 212A, 212B, the sleeves may be permanently coupled (for example, welded) to jackets 218A, 218B. Sleeves 252A, 252B may be permanently coupled to jackets 218A, 218B such that the ends of the sleeves are substantially sealed (there are no leaks at the ends of the sleeves that allow air or other fluids to enter or exit the ends of the sleeves). After coupling of sleeves 252A, 252B to jackets 218A, 218B, opening 312 is the only port for fluid to enter/exit outer sleeve 252B and there the interior of inner sleeve 252A is substantially sealed.

In certain embodiments, fluid (for example, hydraulic fluid) is provided into the interior volume of outer sleeve 252B through opening 312. In certain embodiments, the fluid is hydraulic oil. In some embodiments, the fluid includes other fluids such as molten salt or gas. In some embodiments, the fluid is heated during pressurization.

The fluid provided into the interior volume of outer sleeve 252B may be pressurized to compact or compress inner sleeve 252A and electrically insulating material 256. For example, the fluid may be hydraulically pressurized using a hand pump or another suitable hydraulic pressurizing pump. Pressurizing the fluid inside outer sleeve 252B may provide isostatic pressure to compress inner sleeve 252A.

Outer sleeve 252B may be hard or non-susceptible to compaction under pressure while inner sleeve 252A is susceptible to compaction under pressure. For example, inner sleeve 252A may be thinner than outer sleeve 252B and/or the inner sleeve may be heat treated (annealed) to be softer than the outer sleeve.

The fluid inside outer sleeve 252B is pressurized to a selected pressure or into a selected pressure range to compact inner sleeve 252A and electrically insulating material 256 to a desired compaction level. In some embodiments, the fluid inside outer sleeve 252B is pressurized to a pressure between about 15,000 psi (about 100,000 kPa) and about 20,000 psi (about 140,000 kPa). In some embodiments, the fluid may be pressurized to higher pressures (for example, pressurized up to about 35,000 psi (about 240,000 kPa)).

Pressurizing the fluid to such pressures deforms inner sleeve 252A by compressing the inner sleeve and compacts electrically insulating material 256 inside the inner sleeve. Inner sleeve 252A may be uniformly deformed by the fluid pressure inside outer sleeve 252B. In certain embodiments, electrically insulating material 256 is compacted such that the electrically insulating material has dielectric properties similar to or better than the dielectric properties of the electrical insulator in at least one of the joined insulated conductors. Using the pressurized fluid to compress and compact inner sleeve 252A and electrically insulating material 256 may allow the insulated conductors to be joined in the sleeves in a horizontal configuration. Joining the insulated conductors in a horizontal configuration allows longer lengths of insulated conductors to be joined together without the need for complicated or expensive cable hanging systems.

Figure 24:
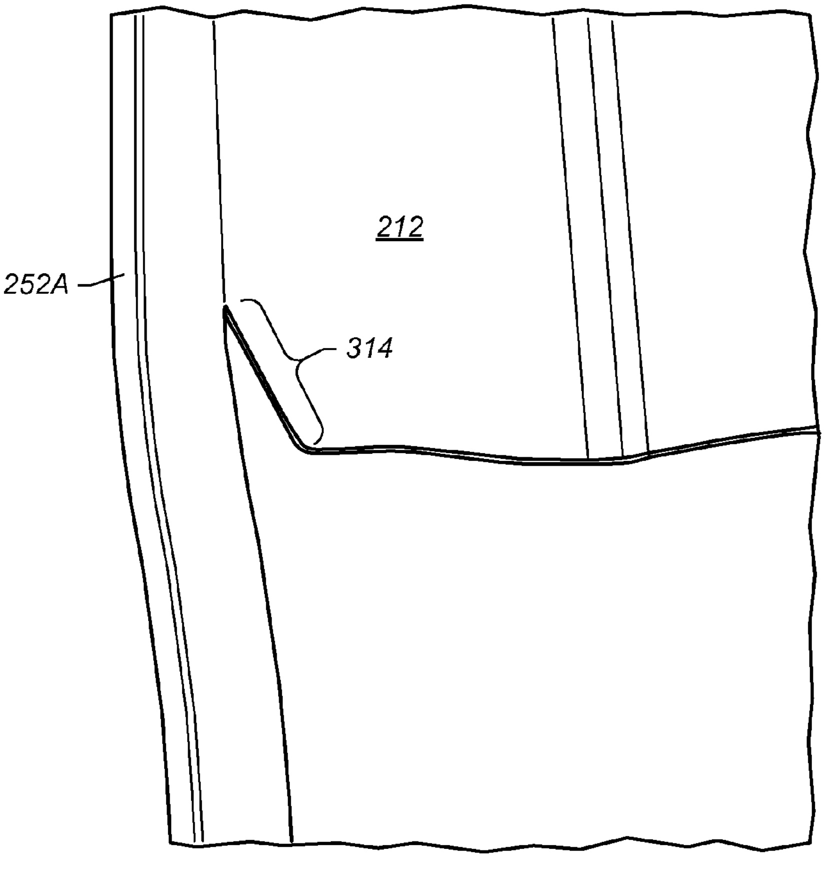
FIG. 24 depicts an embodiment of a chamfered end of an insulated conductor after compression.

In some embodiments, the ends of insulated conductors may have chamfers or other tapering to allow for compression of the inner sleeve. FIG. 24 depicts an embodiment of a chamfered end of an insulated conductor after compression. Insulated conductor 212 includes chamfer 314 inside inner sleeve 252A. Chamfer 314 may inhibit kinking or buckling of inner sleeve 252A during compression.

In some embodiments, electrically insulating material powder is added into the interior of inner sleeve 252A before sealing and compaction of the inner sleeve. The electrically insulating material powder may penetrate and fill voids inside the inner sleeve (such as in the recess formed between a chamfer on the insulated conductor and the inner sleeve). Use of electrically insulating material powder may also reduce the number of interfaces in compacted electrically insulating material. In some embodiments, electrically insulating material powder is used instead of blocks of electrically insulating material.

In some embodiments, an additive such as a dopant or another additional material may be added to the electrically insulating material. The additive may improve the dielectric properties of the electrically insulating material. For example, the additive may increase the dielectric strength of the electrically insulating material.

Figure 25:
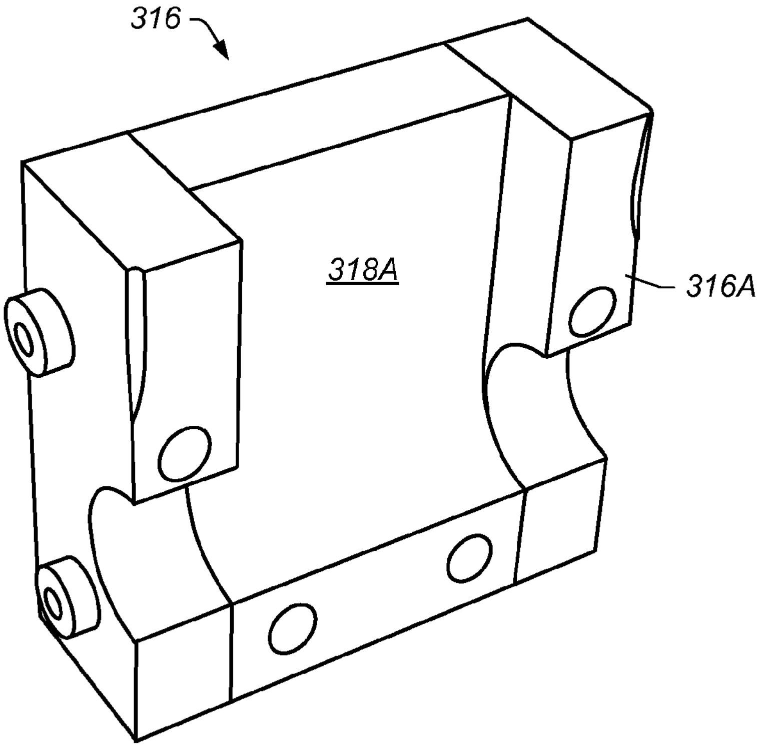
FIG. 25 depicts an embodiment of a first half of a mechanical compaction device to be used for compaction of electrically insulating material at a coupling of insulated conductors.

In certain embodiments, mechanical compaction is used to radially compact electrically insulating material at the coupling of joined insulated conductors. FIG. 25 depicts an embodiment of first half 316A of mechanical compaction device 316 to be used for compaction of electrically insulating material at a coupling of insulated conductors. The second half of device 316 has a similar shape and size as first half 316A depicted in FIG. 25. The first half and second half of device 316 are coupled together to form the device around a section of insulated conductors to be joined together.

Figure 26:
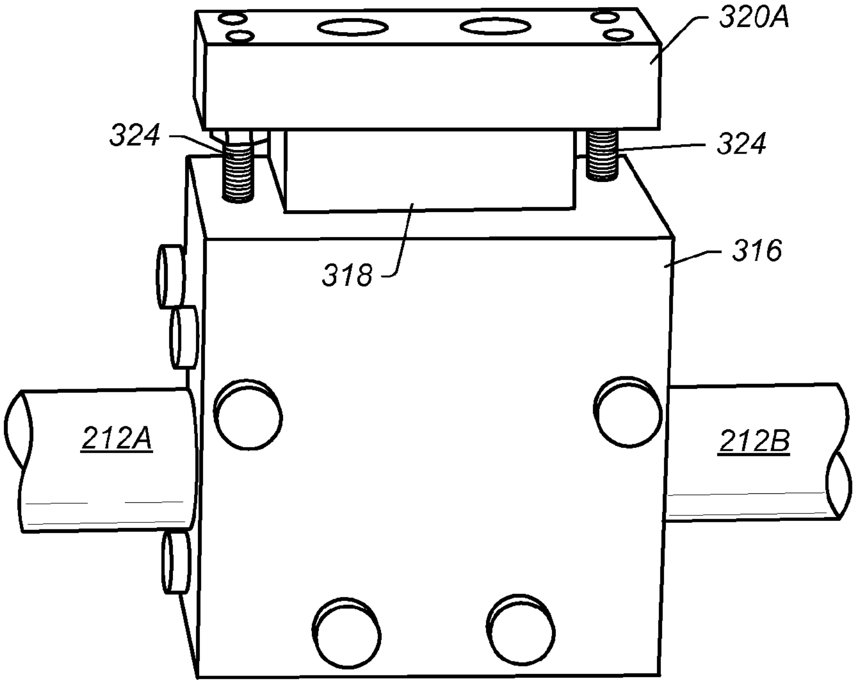
FIG. 26 depicts an embodiment of a device coupled together around insulated conductors.

FIG. 26 depicts an embodiment of device 316 coupled together around insulated conductors 212A, 212B. The jackets and electrical insulator surrounding the cores of insulated conductors 212A, 212B have been removed to expose the portions of the cores located inside device 316.

As shown in FIG. 25, first half 316A includes first half 318A of opening 318 that is formed in the top of device 316 when the two halves of the device are coupled together. Opening 318 allows electrically insulating material and/or other materials to be provided into the space around exposed cores of the insulated conductors. In certain embodiments, electrically insulating material powder is provided into device 316.

As shown in FIG. 26, after at least some electrically insulating material is provided through opening 318 into device 316 around the exposed cores, first plunger 320A is inserted into the opening. First plunger 320A is used to mechanically compact (for example, by applying force to the top of the plunger) electrically insulating material inside device 316. For example, force may be applied to first plunger 320A using a hammer.

Figure 27:
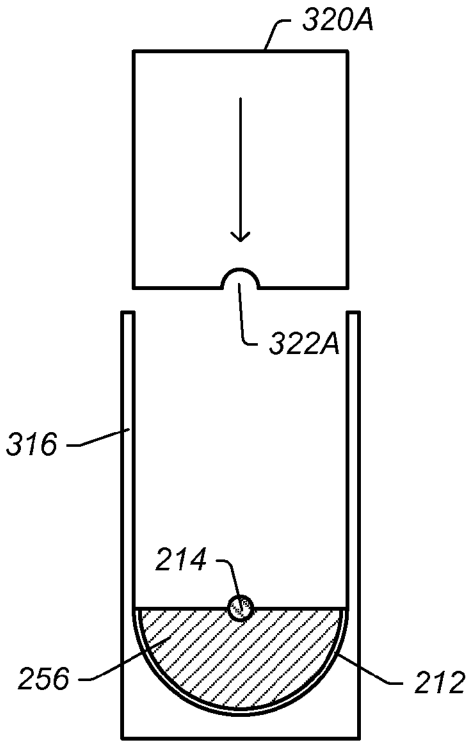
FIG. 27 depicts a side view of an insulated conductor inside a device with a first plunger in position above the insulated conductor with exposed core.

FIG. 27 depicts a side view of insulated conductor 212 inside device 316 with first plunger 320A in position above the insulated conductor with exposed core 214. In certain embodiments, first plunger 320A has a bottom with recess 322A. Recess 322A may have a shape that is substantially similar to the shape of the exposed portions of the cores. First plunger 320A may include stops 324, shown in FIG. 26, that inhibit the depth the first plunger can go into device 316. For example, stops 324 may inhibit first plunger 320A from going to a depth inside device 316 that would bend or deform the cores of the insulated conductors.

First plunger 320A may be used to compact electrically insulating material 256 to a first level inside device 316. For example, as shown in FIG. 27, electrically insulating material 256 is compacted to level that surrounds a lower portion (for example, a lower half) of exposed core 214. The process of adding electrically insulating material and compacting the material with the first plunger may be repeated until a desired level of compaction is achieved around a lower portion of the core.

Figure 28:
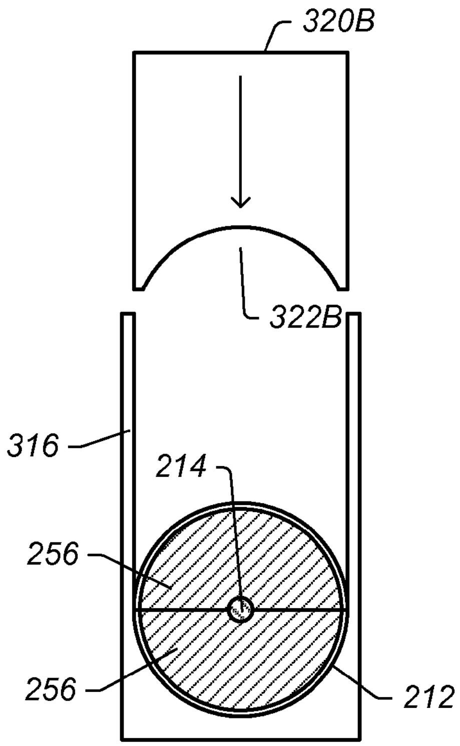
FIG. 28 depicts a side view of an insulated conductor inside a device with a second plunger in position above the insulated conductor with exposed core.

FIG. 28 depicts a side view of insulated conductor 212 inside device 316 with second plunger 320B in position above the insulated conductor with exposed core 214. In certain embodiments, second plunger 320B has a bottom with recess 322B. Recess 322B may have a shape that is substantially similar to the outer shape of the insulated conductor. Second plunger 320B may include stops that inhibit the depth the second plunger can go into device 316. For example, the stops may inhibit second plunger 320B from going to a depth inside device 316 past the outer shape of the insulated conductor.

Second plunger 320B may be used to compact electrically insulating material 256 to a second level inside device 316. For example, as shown in FIG. 28, electrically insulating material 256 is compacted to level that surrounds exposed core 214. The process of adding electrically insulating material and compacting the material with the second plunger may be repeated until a desired level of compaction is achieved around the core. For example, the process may be repeated until the desired level of compaction of electrically insulating material is achieved in a shape and outside diameter similar to the shape and outside diameter of the insulated conductor.

Figure 29:
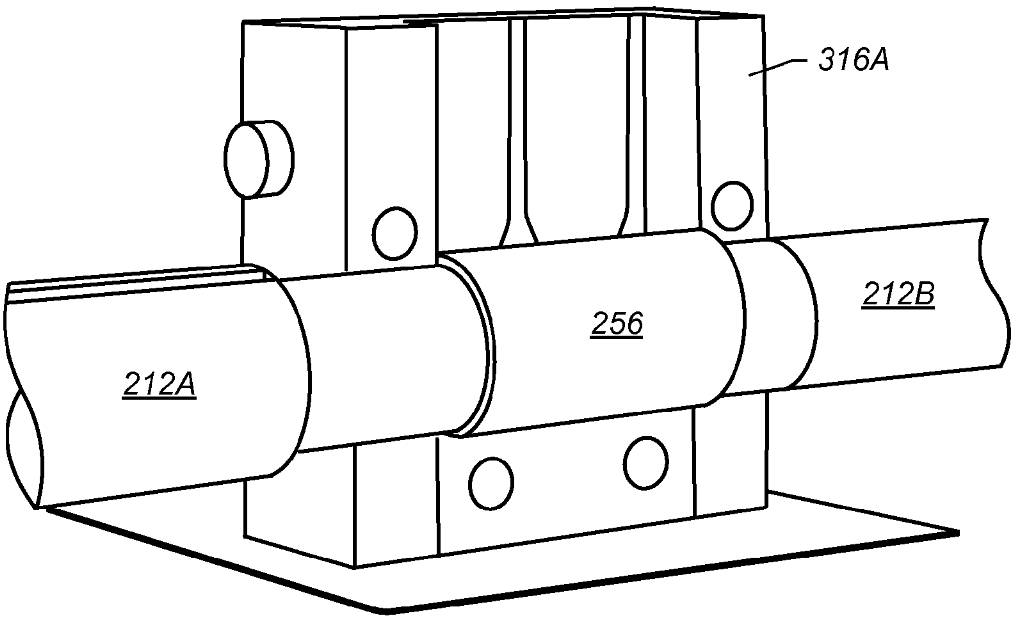
FIG. 29 depicts an embodiment with the second half of a device removed to leave the first half and electrically insulating material compacted around the coupling between insulated conductors.

After compaction of a desired amount of electrically insulating material, device 316 may be removed from around the coupling of the insulated conductors. FIG. 29 depicts an embodiment with the second half of device 316 removed to leave first half 316A and electrically insulating material 256 compacted around the coupling between insulated conductors 212A, 212B.

Figure 30:
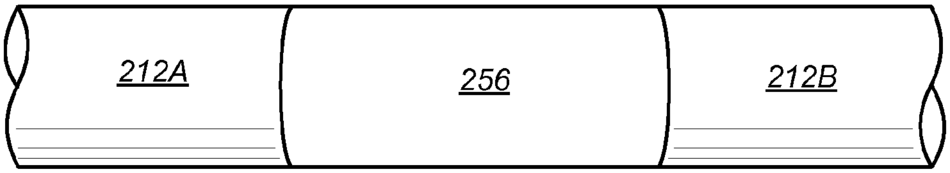
FIG. 30 depicts an embodiment of electrically insulating material shaped around the coupling between insulated conductors.

After removal of device 316, compacted electrically insulating material 256 may be shaped into a substantially cylindrical shape with the outside diameter relatively similar to the outside diameter of insulated conductors 212A, 212B, as shown in FIG. 30. Compacted electrically insulating material 256 may be formed into its final shape by removing excess portions of the compacted material. For example, excess portions of compacted electrically insulating material 256 may be axially removed using a saw blade, a sleeve with a shaving edge slid over the compacted material, and/or other techniques known in the art.

Figure 31:
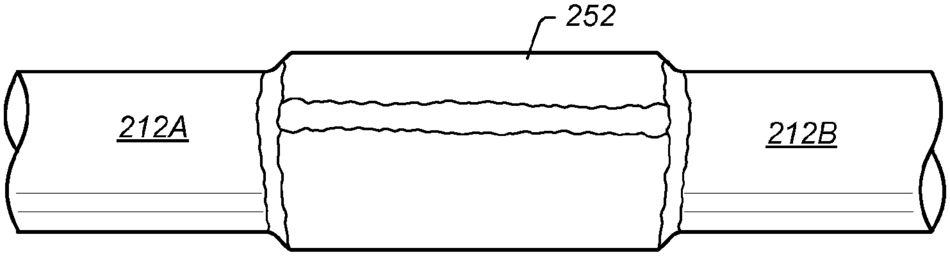
FIG. 31 depicts an embodiment of a sleeve placed over electrically insulating material.

After electrically insulating material 256 is formed into the final shape, sleeve 252 is placed over the electrically insulating material, as shown in FIG. 31. Sleeve 252 may include two or more portions placed over the electrically insulating material and coupled (welded) together to form the sleeve. Sleeve 252 may be coupled (welded) to jackets of insulated conductors 212A, 212B. Sleeve 252 may be made of materials similar to the jackets of insulated conductors 212A, 212B. For example, sleeve 252 may be 304 stainless steel.

In certain embodiments, electrically insulating material 256 that is compacted in device 316 includes a mixture of magnesium oxide and boron nitride powders. In an embodiment, electrically insulating material 256 that is compacted in device 316 includes an 80% by weight magnesium oxide, 20% by weight boron nitride powder mixture. Other electrically insulating materials and/or other mixtures of electrically insulating materials may also be used. In some embodiments, a combination of electrically insulating material powder and blocks of electrically insulating material are used.

In some embodiments, the electrically insulating material is further compacted using hydraulic pressure or fluid pressure as described above. In some embodiments, the electrically insulating material is compacted while at elevated temperatures. For example, the electrically insulating material may be compacted at a temperature of about 90° C. or higher. In some embodiments, first plunger 320A and/or second plunger 320B are coated with non-metallic materials such as ceramics. Coating the plungers may inhibit metal transfer into the electrically insulating material.

Figure 32:
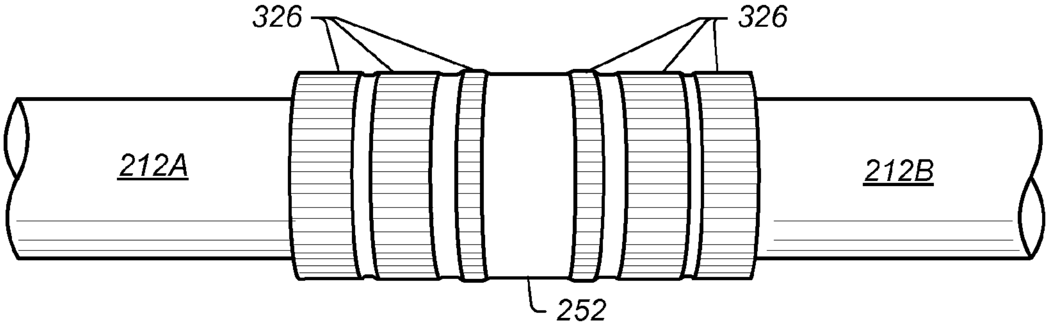
FIG. 32 depicts an embodiment of a sleeve that is used in circumferential mechanical compression.

In certain embodiments, a sleeve is mechanically compressed circumferentially around the sleeve to compress the sleeve. FIG. 32 depicts an embodiment of sleeve 252 that is used in circumferential mechanical compression. Sleeve 252 may be placed around blocks and/or powder of electrically insulating material. For example, sleeve 252 may be placed around blocks of electrically insulating material depicted in FIG. 21, compacted electrically insulating material powder depicted in FIG. 30, or combinations of the depicted blocks and powder.

In certain embodiments, sleeve 252 includes ribs 326. Ribs 326 may be raised portions of sleeve 252 (for example, high spots on the outer diameter of the sleeve). Ribs 326 may be shaped and sized to match the crimping portions of a press used to mechanically compress sleeve 252. For example, sleeve 252 may be compressed using a hydraulically actuated mechanical compression system that circumferentially compresses the sleeve circumferentially. For example, sleeve 252 may be compressed using a Pyplok® swage tool available from Tube-Mac® Industries (Stoney Creek, Ontario, Canada).

Figure 33:
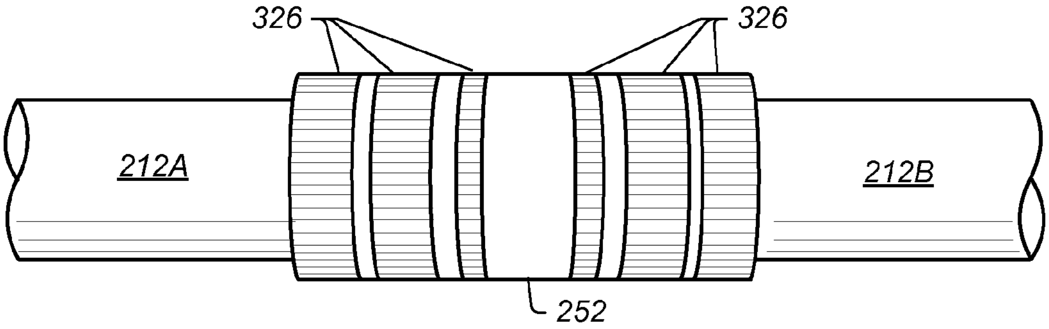
FIG. 33 depicts an embodiment of a sleeve on insulated conductors after the sleeve and ribs have been circumferentially compressed.

Crimping portions of the press compress ribs 326 until the ribs are compressed to about the outer diameter of the remaining portions of sleeve 252 (the ribs have a diameter substantially similar to the diameter of the remainder of the sleeve). FIG. 33 depicts an embodiment of sleeve 252 on insulated conductors 212A, 212B after the sleeve and ribs 326 have been circumferentially compressed. Compression of ribs 326 circumferentially (radially) compresses electrically insulating material inside sleeve 252 and couples the sleeve to insulated conductors 212A, 212B. Sleeve 252 may be further coupled to insulated conductors 212A, 212B. For example, the ends of sleeve 252 may be welded to the jackets of insulated conductors 212A, 212B.

Figure 34:
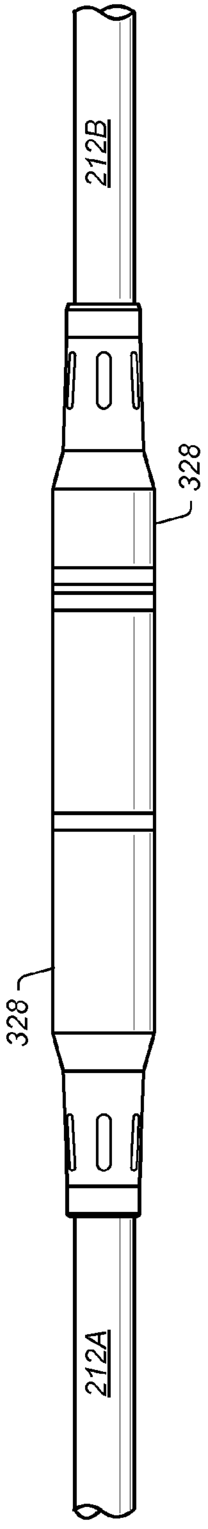
FIG. 34 depicts an embodiment of reinforcement sleeves on joined insulated conductors.

In certain embodiments described herein, a reinforcement sleeve or other strain relief is placed at or near the coupling of insulated conductors. FIG. 34 depicts an embodiment of reinforcement sleeves 328 on joined insulated conductors 212A, 212B. Reinforcement sleeves 328 provide strain relief to strengthen the coupling between the insulated conductors. Reinforcement sleeves 328 allow the joined insulated conductors to be spooled, unspooled, and pulled in tension for installation/removal in wellbores and/or in an installation conduit (for example, coiled tubing installation).

Figure 35:
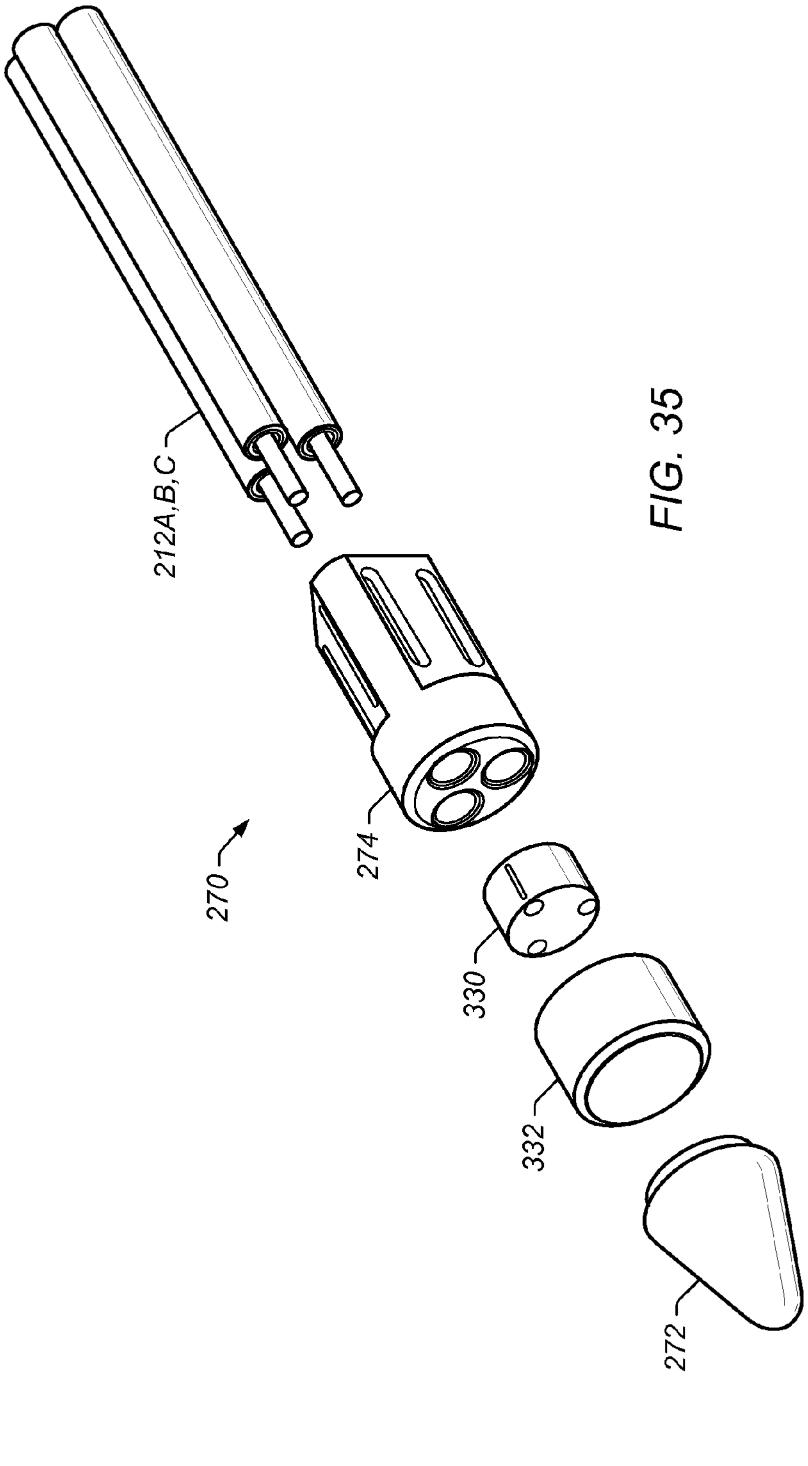
FIG. 35 depicts an exploded view of another embodiment of a fitting used for coupling three insulated conductors.

FIG. 35 depicts an exploded view of another embodiment of fitting 270 used for coupling three insulated conductors 212A, 212B, 212C. In certain embodiments, fitting 270 includes strain relief fitting 274, electrical bus 330, cylinder 332, and end cap 272. FIGS. 36-43 depict an embodiment of a method for installation of fitting 270 onto ends of insulated conductors 212A, 212B, 212C.

Figure 36:
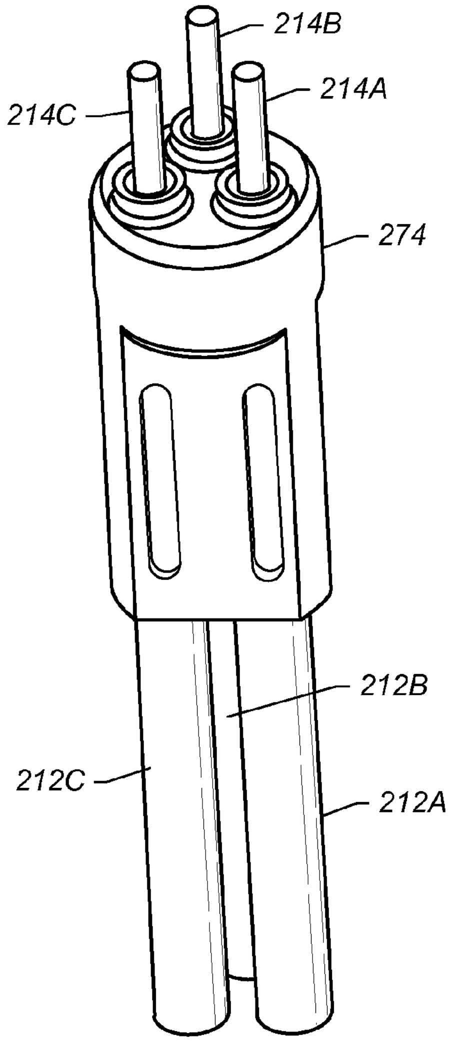
FIGS. 36-43 depict an embodiment of a method for installation of a fitting onto ends of insulated conductors.

In FIG. 36, insulated conductors 212A, 212B, 212C are passed through longitudinal openings in strain relief fitting 274. Strain relief fitting 274 may be an end termination for insulated conductors 212A, 212B, 212C. End portions of the jackets and electrical insulators of insulated conductors 212A, 212B, 212C that extend through strain relief fitting 274 are removed to expose end portions of cores 214A, 214B, 214C extending through the strain relief fitting 274. In certain embodiments, the jackets of insulated conductors 212A, 212B, 212C are coupled to strain relief fitting 274. For example, the jackets may be welded (seam welded) to strain relief fitting 274. After installation of insulated conductors 212A, 212B, 212C into strain relief fitting 274, insulated conductors 212A, 212B, 212C are aligned in the strain relief fitting and a portion of cores 214A, 214B, 214C protruding from the fitting are exposed.

Figure 37:
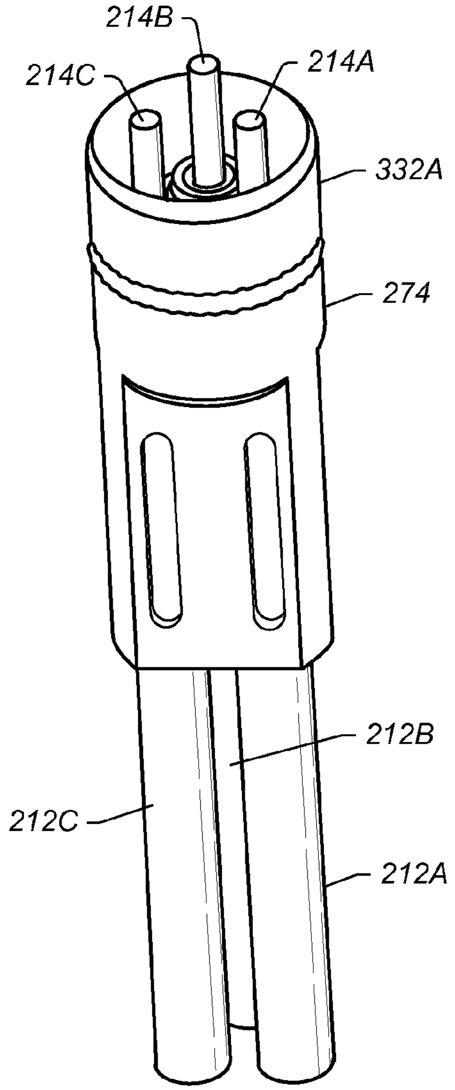

In FIG. 37, first cylinder 332A is coupled to the end of strain relief fitting 274 with protruding cores 214A, 214B, 214C. First cylinder 332A may be welded into place on the end of strain relief fitting 274. First cylinder 332A may have a longitudinal length less than the length of protruding cores 214A, 214B, 214C. Thus, at least some portion of the cores may extend beyond the length of first cylinder 332A.

Figure 38:
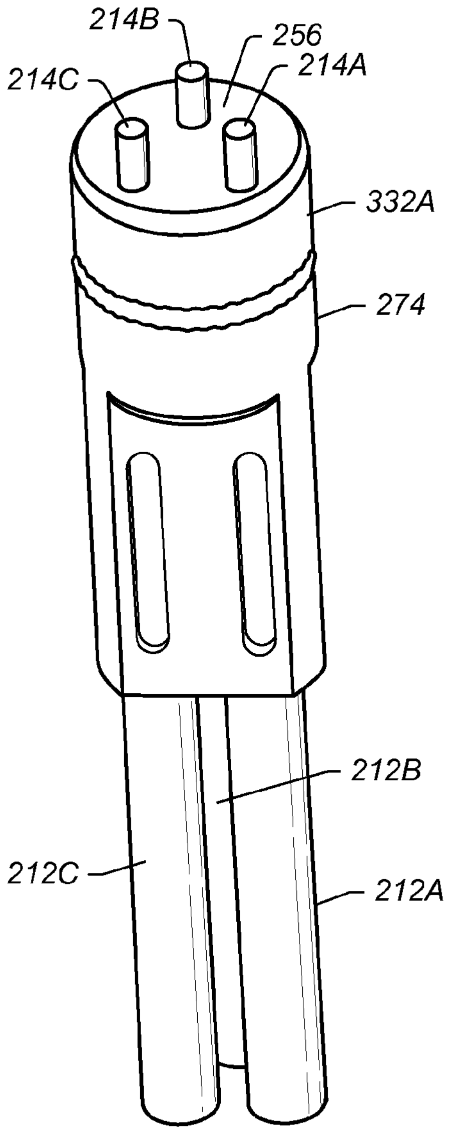
Figure 44:
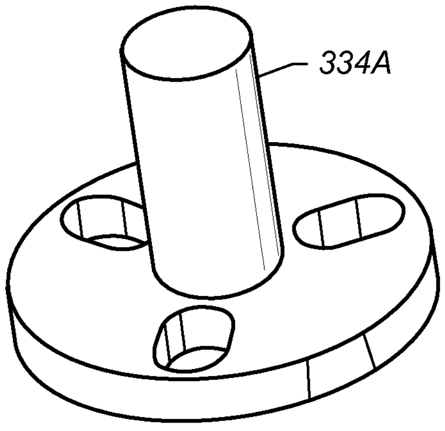
FIG. 44 depicts an embodiment of a compaction tool that can be used to compact electrically insulating material.

Following coupling of first cylinder 332A to strain relief fitting 274, electrically insulating material 256 is added into the cylinder to at least partially cover cores 214A, 214B, 214C, as shown in FIG. 38. Thus, at least a portion of the cores remain exposed above electrically insulating material 256. Electrically insulating material 256 may include powder and/or blocks of electrically insulating material (for example, magnesium oxide). In certain embodiments, electrically insulating material 256 is compacted inside first cylinder 332A. For example, electrically insulating material 256 may be mechanically compacted using a compaction tool. FIG. 44 depicts an embodiment of compaction tool 334A that can be used to compact electrically insulating material 256. Compaction tool 334A may have openings that allow the tool to fit over cores 214A, 214B, 214C while compacting electrically insulating material.

Figure 39:
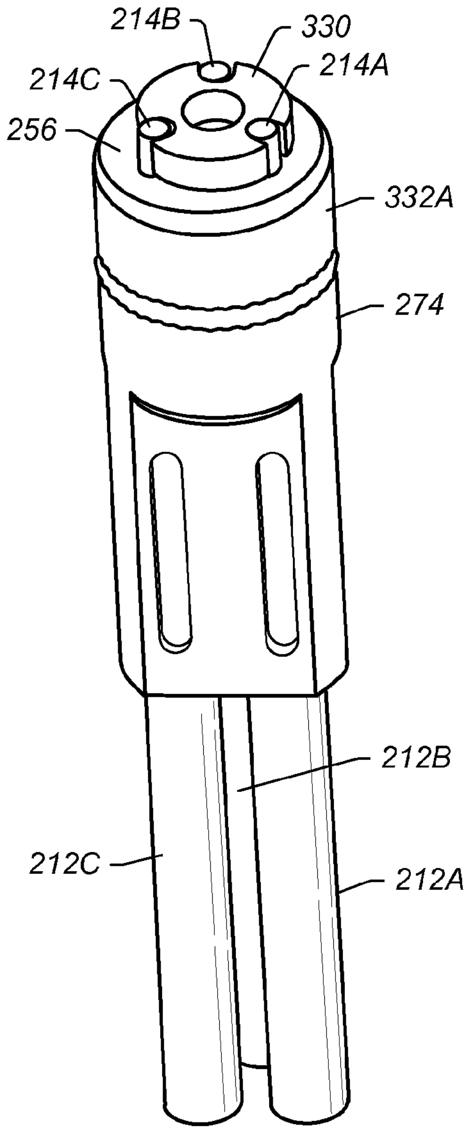

In certain embodiments, after compaction of electrically insulating material 256 in cylinder 332A, the portion cores 214A, 214B, 214C that remain exposed are coupled to electrical bus 330, as shown in FIG. 39. Electrical bus 330 may be, for example, copper or another material suitable for electrically coupling cores 214A, 214B, 214C together. In some embodiments, electrical bus 330 is welded to cores 214A, 214B, 214C.

Figure 40:
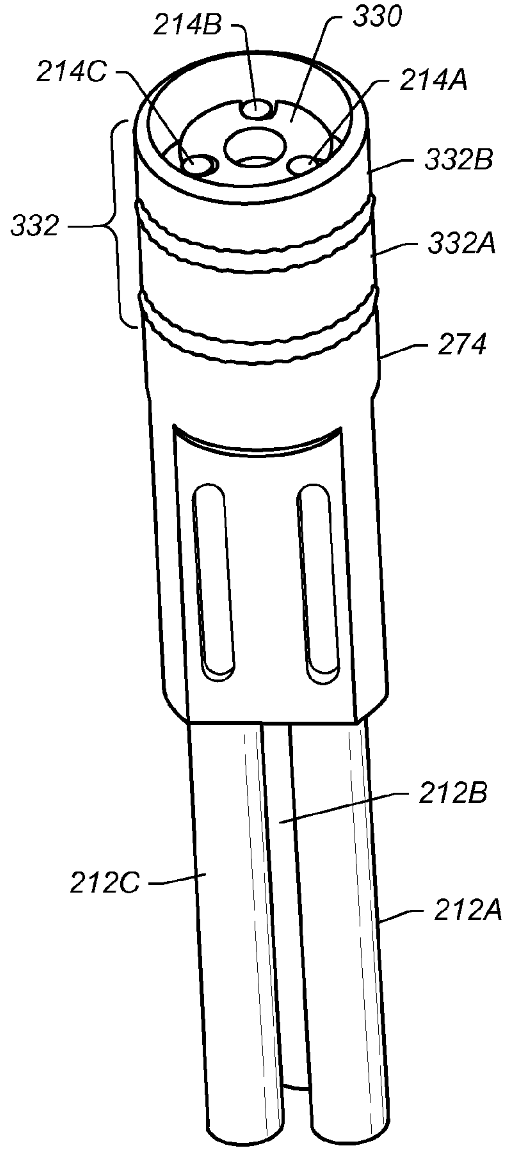

After coupling electrical bus 330 to cores 214A, 214B, 214C, second cylinder 332B may be coupled to first cylinder 332A to form cylinder 332 around the exposed portions of the cores, as shown in FIG. 40. In some embodiments, cylinder 332 is a single cylinder coupled to strain relief fitting 274 in a single step. In some embodiments, cylinder 332 includes two or more cylinders coupled to strain relief fitting 274 in multiple steps.

Second cylinder 332B may be welded into place on the end first cylinder 332A. As shown in FIG. 40, completed cylinder 332 may have a longitudinal length that extends beyond the length of protruding cores 214A, 214B, 214C. Thus, the cores may are contained within the boundaries of cylinder 332.

Figure 41:
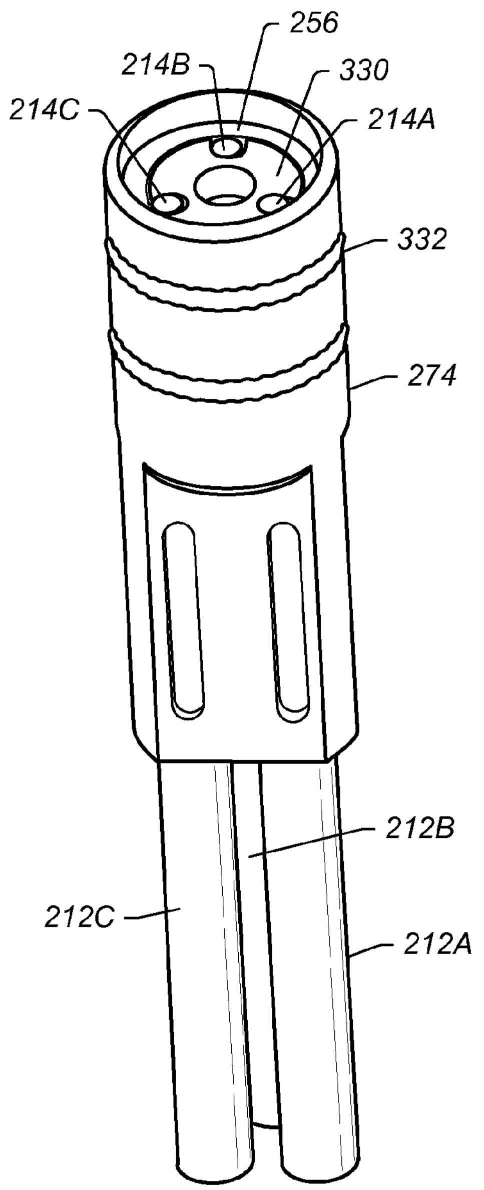
Figure 45:
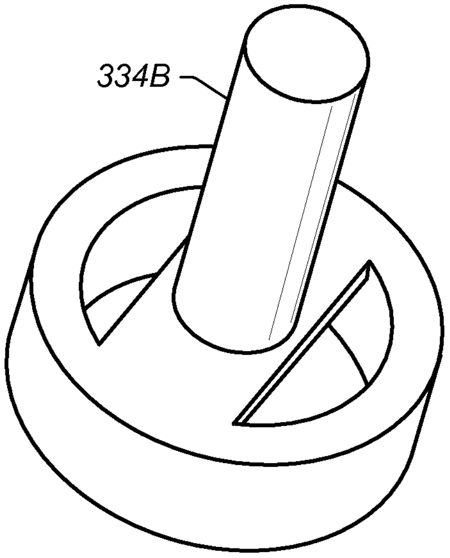
FIG. 45 depicts an embodiment of another compaction tool that can be used to compact electrically insulating material.

Following formation of cylinder 332, electrically insulating material 256 is added into the cylinder to a level that is about even with the top of cores 214A, 214B, 214C and electrical bus 330, as shown in FIG. 41. In certain embodiments, electrically insulating material 256 at the level shown in FIG. 41 is compacted (for example, mechanically compacted). FIG. 45 depicts an embodiment of compaction tool 334B that can be used to compact electrically insulating material 256. Compaction tool 334B may have an annulus that allows the tool to fit over electrical bus 330 and cores 214A, 214B, 214C while compacting electrically insulating material.

Figure 42:
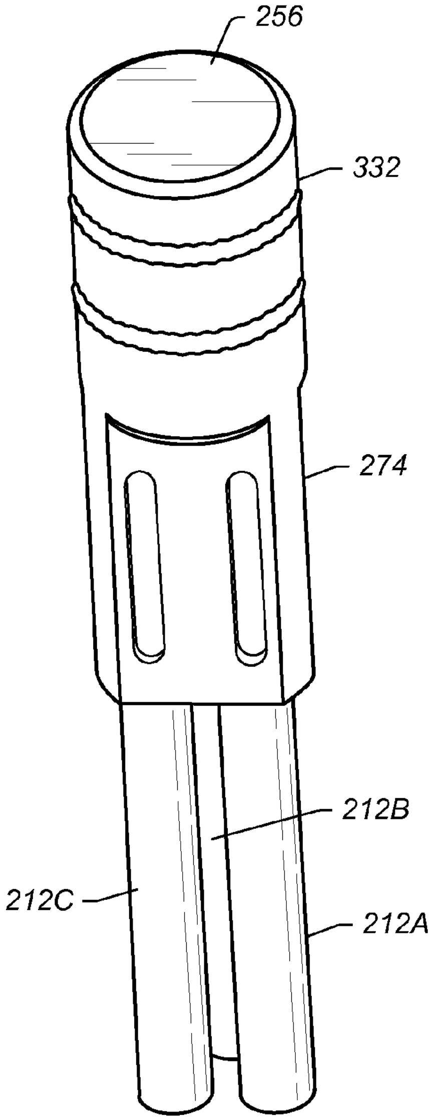
Figure 43:
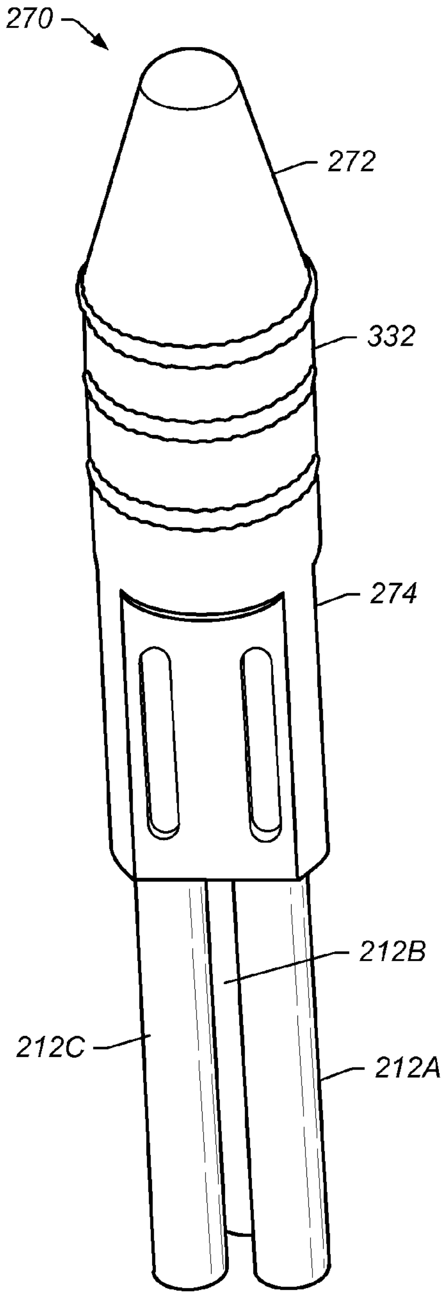
Figure 46:
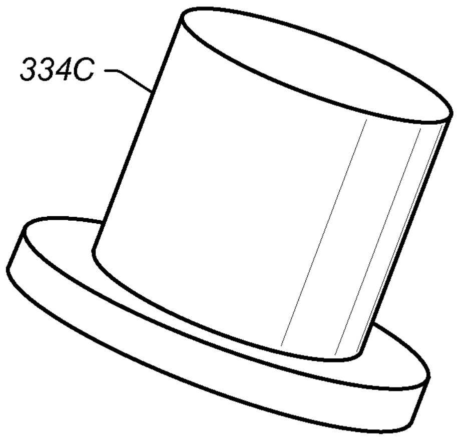
FIG. 46 depicts an embodiment of a compaction tool that can be used for the final compaction of electrically insulating material.

Following compaction of material at the level of the top of electrical bus 330 and cores 214A, 214B, 214C, additional electrically insulating material 256 is added into the cylinder to completely cover the electrical bus and the cores, as shown in FIG. 42. Thus, the cores and electrical bus are substantially enclosed in electrically insulating material 256. In certain embodiments, electrically insulating material 256 added into cylinder 332 to enclose the cores is compacted (for example, mechanically compacted). FIG. 46 depicts an embodiment of compaction tool 334C that can be used for the final compaction of electrically insulating material 256.

After final compaction of electrically insulating material 256, end cap 272 is coupled (welded) to cylinder 332 to form fitting 270. In some embodiments, end cap 272 is shaped to be used as a guide for guiding the installation of insulated conductors 212A, 212B, 212C into a wellbore or a deployment device (for example, coiled tubing installation). Mechanical compaction of electrically insulating material inside fitting 270 may produce a fitting with a higher mechanical breakdown voltage than fittings that are filled with electrically insulating material and vibrated for compaction of the electrically insulating material.

EXAMPLES

Non-restrictive examples are set forth below.

Samples Using Fitting Embodiment Depicted in FIG. 5

Samples using an embodiment of fitting 250 similar to the embodiment depicted in FIG. 5 were fabricated using a hydraulic compaction machine with a medium voltage insulated conductor suitable for use as a subsurface heater on one side of the fitting and a medium voltage insulated conductor suitable for use as an overburden cable on the other side of the fitting. Magnesium oxide was used as the electrically insulating material in the fittings. The samples were 6 feet long from the end of one mineral insulated conductor to the other. Prior to electrical testing, the samples were placed in a 6½ ft long oven and dried at 850° F. for 30 hours. Upon cooling to 150° F., the ends of the mineral insulated conductors were sealed using epoxy. The samples were then placed in an oven 3 feet long to heat up the samples and voltage was applied to the samples using a 5 kV (max) hipot (high potential) tester, which was able to measure both total and real components of the leakage current. Three thermocouples were placed on the samples and averaged for temperature measurement. The samples were placed in the oven with the fitting at the center of the oven. Ambient DC (direct current) responses and AC (alternating current) leakage currents were measured using the hipot tester.

A total of eight samples were tested at about 1000° F. and voltages up to 5 kV. One individual sample tested at 5 kV had a leakage current of 2.28 mA, and another had a leakage current of 6.16 mA. Three more samples with cores connected together in parallel were tested to 5 kV and had an aggregate leakage current of 11.7 mA, or 3.9 mA average leakage current per cable, and the three samples were stable. Three other samples with cores connected together in parallel were tested to 4.4 kV and had an aggregate leakage current of 4.39 mA, but they could not withstand a higher voltage without tripping the hipot tester (which occurs when leakage current exceeds 40 mA). One of the samples tested to 5 kV underwent further testing at ambient temperature to breakdown. Breakdown occurred at 11 kV.

A total of eleven more samples were fabricated for additional breakdown testing at ambient temperature. Three of the samples had insulated conductors prepared with the mineral insulation cut perpendicular to the jacket while the eight other samples had insulated conductors prepared with the mineral insulation cut at a 30° angle to the jacket. Of the first three samples with the perpendicular cut, the first sample withstood up to 10.5 kV before breakdown, the second sample withstood up to 8 kV before breakdown, while the third sample withstood only 500 V before breakdown, which suggested a flaw in fabrication of the third sample. Of the eight samples with the 30° cut, two samples withstood up to 10 kV before breakdown, three samples withstood between 8 kV and 9.5 kV before breakdown, and three samples withstood no voltage or less than 750 V, which suggested flaws in fabrication of these three samples.

Samples Using Fitting Embodiment Depicted in FIG. 8B

Three samples using an embodiment of fitting 270 similar to the embodiment depicted in FIG. 8B were made. The samples were made with two insulated conductors instead of three and were tested to breakdown at ambient temperature. One sample withstood 5 kV before breakdown, a second sample withstood 4.5 kV before breakdown, and a third sample could withstand only 500 V, which suggested a flaw in fabrication.

Samples Using Fitting Embodiment Depicted in FIGS. 14 and 15

Samples using an embodiment of fitting 298 similar to the embodiment depicted in FIGS. 14 and 15 were used to connect two insulated conductors with 1.2" outside diameters and 0.7" diameter cores. MgO powder (Muscle Shoals Minerals, Greenville, Tenn., U.S.A.) was used as the electrically insulating material. The fitting was made from 347H stainless steel tubing and had an outside diameter of 1.5" with a wall thickness of 0.125" and a length of 7.0". The samples were placed in an oven and heated to 1050° F. and cycled through voltages of up to 3.4 kV. The samples were found to viable at all the voltages but could not withstand higher voltages without tripping the hipot tester.

In a second test, samples similar to the ones described above were subjected to a low cycle fatigue-bending test and then tested electrically in the oven. These samples were placed in the oven and heated to 1050° F. and cycled through voltages of 350 V, 600 V, 800 V, 1000 V, 1200 V, 1400 V, 1600 V, 1900 V, 2200 V, and 2500 V. Leakage current magnitude and stability in the samples were acceptable up to voltages of 1900 V. Increases in the operating range of the fitting may be feasible using further electric field intensity reduction methods such as tapered, smoothed, or rounded edges in the fitting or adding electric field stress reducers inside the fitting.

It is to be understood the invention is not limited to particular systems described which may, of course, vary. It is also to be understood that the terminology used herein is for the purpose of describing particular embodiments only, and is not intended to be limiting. As used in this specification, the singular forms “a”, “an” and “the” include plural referents unless the content clearly indicates otherwise. Thus, for example, reference to “a core” includes a combination of two or more cores and reference to “a material” includes mixtures of materials.

In this patent, certain U.S. patents, U.S. patent applications, and other materials (for example, articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A fitting for coupling an end of a first insulated conductor to an end of a second insulated conductor, comprising:

a first splice housing placed over the end of the first insulated conductor and coupled to the first insulated conductor, the first splice housing having an interior volume that tapers from a larger diameter at the end of the first splice housing facing the end of the first insulated conductor to a smaller diameter at or near the end of the first splice housing coupled to the first insulated conductor;

a second splice housing placed over the end of the second insulated conductor and coupled to the second insulated conductor, the second splice housing having an interior volume that tapers from a larger diameter at the end of the second splice housing facing the end of the second insulated conductor to a smaller diameter at or near the end of the second splice housing coupled to the second insulated conductor; and a sleeve located over the end of the second insulated conductor and adjacent to the second splice housing, the sleeve being coupled to at least one of the splice housings;

wherein an interior volume of the fitting is substantially filled with electrically insulating material such that there are substantially no macroscopic voids in the interior volume of the fitting, and wherein the interior volume of the fitting has been reduced after substantially filling the interior volume with electrically insulating material such that the electrically insulating material substantially filling the interior volume is compacted.

2. The fitting of claim 1, wherein the electrically insulating material, after compaction, comprises substantially similar dielectric characteristics to electrical insulation in at least one of the two insulated conductors.

3. The fitting of claim 1, wherein cores of the insulated conductors are coupled together in the interior volume of the fitting.

4. The fitting of claim 1, wherein the interior volume of the fitting has been reduced by forcing the first splice housing and the second splice housing together.

5. The fitting of claim 1, wherein the electrically insulating material has been compacted by a pressure of at least 25,000 pounds per square inch and at most 55,000 pounds per square inch.

6. The fitting of claim 1, wherein the electrically insulating material has been compacted by application of vibration along with reduction of the interior volume of the fitting.

7. The fitting of claim 1, wherein the fitting is centered between the ends of the insulated conductors.

8. The fitting of claim 1, wherein the diameter of the interior volume of the first splice housing at or near the end coupled to the first insulated conductor is less than the outside diameter of the first insulated conductor.

9. The fitting of claim 1, wherein the diameter of the interior volume of the first splice housing at or near the end coupled to the first insulated conductor is substantially the same as the outside diameter of the first insulated conductor.

10. The fitting of claim 1, wherein the interior volume of the fitting has been reduced by applying hydraulic pressure.

11. The fitting of claim 1, wherein the interior volume of the fitting has been reduced using a swaging method.

12. The fitting of claim 1, wherein the electrically insulating material comprises material substantially similar to electrical insulation in at least one of the two insulated conductors.

13. The fitting of claim 1, wherein the sleeve and the splice housings have geometries that reduce electrical field intensity at the interface of the fitting and the insulated conductor when the fitting is coupled to the insulated conductor.

14. The fitting of claim 1, wherein at least one of the insulated conductors is configured to be used to heat a subsurface formation.

15. The fitting of claim 1, wherein at least one of the insulated conductors comprises electrical insulation that tapers at an angle from a jacket of the insulated conductor to a core of the insulated conductor inside the fitting.

16. The fitting of claim 1, wherein the first splice housing is slid over the end of the first insulated conductor.

17. The fitting of claim 1, wherein the second splice housing is slid over the end of the second insulated conductor.

18. A method for coupling an end of a first insulated conductor to an end of a second insulated conductor, comprising:

placing a first splice housing over the end of the first insulated conductor;

placing a second splice housing over the end of the second insulated conductor;

placing a sleeve over the second insulated conductor and the second splice housing such that the sleeve is substantially adjacent to the second splice housing and located over the end of the second insulated conductor;

coupling the first splice housing to the first insulated conductor;

bringing the second splice housing and the sleeve together with the first splice housing such that the splice housings and the sleeve form a fitting with an interior volume;

substantially filling at least a majority of the interior volume of the fitting with electrically insulating material after bringing the second splice housing and the sleeve together with the first splice housing;

reducing the interior volume of the fitting after substantially filling the interior volume with electrically insulating material such that the electrically insulating material substantially filling the interior volume is compacted;

coupling the sleeve to the second splice housing; and coupling the second splice housing to the second insulated conductor.

19. The method of claim 18, wherein the first and second splice housings have interior volumes that taper from larger diameters at or near the ends of the splice housings facing each other to smaller diameters at or near the ends of the splice housings coupled to the insulated conductors.

20. The method of claim 18, further comprising coupling a core of the first insulated conductor to a core of the second insulated conductor.

21. The method of claim 18, further comprising reducing the interior volume of the fitting by forcing the first splice housing and the second splice housing together.

22. The method of claim 18, further comprising reducing the interior volume of the fitting after the second splice housing is coupled to the second insulated conductor.

23. The method of claim 18, wherein the compacted electrically insulating material comprises substantially similar dielectric characteristics to electrical insulation in at least one of the two insulated conductors.

24. The method of claim 18, further comprising installing the insulated conductors and the fitting in a subsurface formation.

25. The method of claim 18, further comprising applying electrical current to the insulated conductors, and providing heat from at least one of the insulated conductors to at least a portion of a subsurface formation.

26. The method of claim 18, further comprising compacting the electrically insulating material with a pressure of at least 25,000 pounds per square inch and at most 55,000 pounds per square inch.

27. The method of claim 18, further comprising sliding the first splice housing over the end of the first insulated conductor, sliding the second splice housing over the end of the second insulated conductor, and sliding the sleeve over the second insulated conductor and the second splice housing.

* * * * *